US009247575B2

(12) United States Patent
Rayavarapu

(10) Patent No.: US 9,247,575 B2
(45) Date of Patent: Jan. 26, 2016

(54) ENB STORING RRC CONFIGURATION INFORMATION AT ANOTHER NETWORK COMPONENT

(75) Inventor: Venkata Ratnakar Rao Rayavarapu, Bangalore (IN)

(73) Assignee: BlackBerry Limited, Waterloo, Ontario (CA)

( * ) Notice: Subject to any disclaimer, the term of this patent is extended or adjusted under 35 U.S.C. 154(b) by 10 days.

(21) Appl. No.: 13/431,647

(22) Filed: Mar. 27, 2012

(65) Prior Publication Data

US 2013/0260811 A1 Oct. 3, 2013

(51) Int. Cl.
*H04B 7/00* (2006.01)
*H04W 76/02* (2009.01)

(52) U.S. Cl.
CPC .................................. *H04W 76/028* (2013.01)

(58) Field of Classification Search
CPC ....... H04W 4/00; H04W 28/00; H04W 68/00; H04W 76/00; H04W 36/08; H04W 36/06
USPC .......... 455/509, 423; 370/331, 230, 221, 332, 370/252
See application file for complete search history.

(56) References Cited

U.S. PATENT DOCUMENTS

| | | | |
|---|---|---|---|
| 7,016,321 B1 | 3/2006 | Park et al. | |
| 8,238,281 B2 | 8/2012 | Pelletier et al. | |
| 8,335,183 B2 | 12/2012 | Nguyen | |
| 8,514,732 B2 | 8/2013 | Gholmieh et al. | |
| 8,514,735 B1* | 8/2013 | Vargantwar | 370/252 |
| 2003/0093535 A1 | 5/2003 | Choi et al. | |
| 2004/0192309 A1* | 9/2004 | Watanabe et al. | 455/439 |
| 2007/0213061 A1 | 9/2007 | Kim | |
| 2008/0039092 A1 | 2/2008 | Kitazoe | |
| 2008/0043623 A1 | 2/2008 | Franceschini et al. | |

(Continued)

FOREIGN PATENT DOCUMENTS

| | | |
|---|---|---|
| CN | 101483898 | 7/2009 |
| EP | 2061192 | 5/2009 |

(Continued)

OTHER PUBLICATIONS

International Search Report and Written Opinion in International Application No. PCT/EP2012/065552 dated Nov. 23, 2012; 12 pages.

(Continued)

*Primary Examiner* — Wesley Kim
*Assistant Examiner* — Raj Chakraborty
(74) *Attorney, Agent, or Firm* — Fish & Richardson P.C.

(57) ABSTRACT

On suspension of an RRC connection, RRC connection information may be stored and used to re-establish the suspended RRC connection. The RRC connection information can be stored at the UE and/or the RAN node or some other network element. In order to re-establish the RRC connection, the mobile device (101) in one example sends a connection re-establishment request message to the RAN (102) to have the suspended RRC connection re-established. The RAN node may need to attempt to retrieve the RRC connection data (either from memory or if from another network element if stored elsewhere/if the RRC connection was suspended by another RAN node) and verifies whether the RRC connection is valid. When verified, the mobile device (101) receives, in response to the connection re-establishment request message, a connection re-establishment command message from the RAN (102).

30 Claims, 34 Drawing Sheets

(56) References Cited

U.S. PATENT DOCUMENTS

| | | | |
|---|---|---|---|
| 2008/0233963 A1 | 9/2008 | Alanara et al. | |
| 2008/0242292 A1* | 10/2008 | Koskela | H04W 76/028 455/423 |
| 2009/0129339 A1* | 5/2009 | Young | H04W 72/02 370/331 |
| 2009/0137258 A1 | 5/2009 | Nguyen | |
| 2009/0238098 A1 | 9/2009 | Cai et al. | |
| 2010/0074246 A1 | 3/2010 | Harada et al. | |
| 2010/0111039 A1 | 5/2010 | Kim et al. | |
| 2010/0130205 A1 | 5/2010 | Jung et al. | |
| 2010/0184438 A1 | 7/2010 | Wu | |
| 2010/0195621 A1* | 8/2010 | Kekki et al. | 370/332 |
| 2010/0220689 A1 | 9/2010 | Hu et al. | |
| 2010/0254348 A1 | 10/2010 | Prakash et al. | |
| 2010/0255835 A1 | 10/2010 | Suzuki et al. | |
| 2011/0009075 A1 | 1/2011 | Jantunen et al. | |
| 2011/0019532 A1 | 1/2011 | Jung et al. | |
| 2011/0038347 A1 | 2/2011 | Patil et al. | |
| 2011/0039552 A1 | 2/2011 | Narasimha et al. | |
| 2011/0117908 A1 | 5/2011 | Huang et al. | |
| 2011/0159880 A1 | 6/2011 | Kumar et al. | |
| 2011/0194441 A1 | 8/2011 | Jung et al. | |
| 2011/0195668 A1 | 8/2011 | Lee et al. | |
| 2011/0199898 A1* | 8/2011 | Cho et al. | 370/230 |
| 2011/0269463 A1 | 11/2011 | Wang et al. | |
| 2011/0292790 A1 | 12/2011 | Iwamura et al. | |
| 2011/0306345 A1* | 12/2011 | Wu | 455/436 |
| 2012/0002637 A1 | 1/2012 | Adjakple et al. | |
| 2012/0069732 A1* | 3/2012 | Xu et al. | 370/221 |
| 2012/0270545 A1 | 10/2012 | Zhao et al. | |
| 2012/0281561 A1 | 11/2012 | Shukla et al. | |
| 2013/0039287 A1 | 2/2013 | Rayavarapu et al. | |
| 2013/0039339 A1 | 2/2013 | Rayavarapu et al. | |
| 2013/0215772 A1 | 8/2013 | Kaur et al. | |
| 2013/0223267 A1 | 8/2013 | Jung et al. | |
| 2013/0223268 A1 | 8/2013 | Jung et al. | |
| 2013/0260740 A1 | 10/2013 | Rayavarapu et al. | |
| 2013/0260810 A1 | 10/2013 | Rayavarapu et al. | |

FOREIGN PATENT DOCUMENTS

| | | |
|---|---|---|
| EP | 2252127 | 11/2010 |
| TW | 201318463 | 5/2013 |
| TW | 201320679 | 5/2013 |
| WO | 2012/034580 | 3/2012 |

OTHER PUBLICATIONS

3GPP TS 36.331 (V10.2.0) 3rd Generation Partnership Project; Technical Specification Group Radio Access Network; Evolved Universal Terrestrial Radio Access (E-UTRA) Radio Resource Control (RRC); Protocol Specification (Release 10); Jun. 2011.
Extended Search Report in EP Application No. 12161618.9 dated Sep. 11, 2012; 8 pages.
Extended Search Report in EP Application No. 12161620.5 dated Sep. 14, 2012; 8 pages.
3GPP TS 36.300 (V8.12.0) 3rd Generation Partnership Project; Technical Specification Group Radio Access Network; Evolved Universal Terrestrial Radio Access (E-UTRA)and Evolved Universal Terrestrial Radio Access Network (E-UTRAN); Overall Description; Stage 2 (Release 8); Mar. 2010.
International Search Report and Written Opinion in International Application No. PCT/GB2013/050792 dated May 7, 2013; 12 pages.
3GPP 3rd Generation Partnership Project; Technical Specification Group Radio Access Network; Evolved Universal Terrestrial Radio Access (E-UTRA) Radio Resource Control (RRC); Protocol Specification (Release 8; R2-081378; Feb. 22, 2008.
ETSI TS 36.331 (V10.4.0) LTE: Evolved Universal Terrestrial Radio Access (E-UTRA) Radio Resource Control (RRC); Protocol Specification (Release 10); Jan. 2012.
International Search Report and Written Opinion in International Application No. PCT/GB2013/050781 dated Jul. 4, 2013; 13 pages.
HTC Corporation "Performance Enhancement in the RRC Connection Re-Establishment Procedure" R2-093997; Los Angeles; Jun. 29-Jul. 3, 2009.
Extended Search Report in EP Application No. 12161621.3 dated Nov. 14, 2012; 7 pages.
Extended Search Report in EP Application No. 12161622.1 dated Aug. 21, 2012; 8 pages.
LTE; Evolved Universal Terrestrial Radio Access (E-UTRA); Radio Resource Control (RRC); Protocol specification (3GPP TS 36.331 version 10.4.0 Release 10).
3rd Generation Partnership Project; Technical Specification Group Radio Access Network; Evolved Universal Terrestrial Radio Access (E-UTRA) Radio Resource Control (RRC); Protocol Specification (Release 8).
International Search Report and Written Opinion in International Application No. PCT/EP2012/065632 dated Nov. 14, 2012; 10 pages.
Office Action issued in U.S. Appl. No. 13/431,618 on Jan. 30, 2014.
Office Action issued in U.S. Appl. No. 13/431,799 on Nov. 29, 2013.
Office Action issued in U.S. Appl. No. 13/431,779 on Feb. 21, 2014.
International Preliminary Report on Patentability issued in International Application No. PCT/EP2012/065632 on Feb. 27, 2014; 7 pages.
International Search Report and Written Opinion in International Application No. PCT/EP2012/065634 dated Nov. 6, 2012; 7 pages.
International Preliminary Report on Patentability issued in International Application No. PCT/EP2012/065634 on Feb. 27, 2014; 5 pages.
Communication Pursuant to Article 94(3) EPC issued in EP Application No. 12161621.3 dated Mar. 17, 2014; 7 pages.
Extended Search Report in EP Application No. 12161619.7 on Nov. 14, 2012; 7 pages.
Communication Pursuant to Article 94(3) EPC issued in EP Application No. 12161619.7 on Mar. 17, 2014; 8 pages.
Communication Pursuant to Article 94(3) EPC issued in EP Application No. 12161620.5 on Mar. 17, 2014; 9 pages.
Communication Pursuant to Article 94(3) EPC issued in EP Application No. 12161618.9 on Jun. 2, 2014.
Office Action issued in U.S. Appl. No. 13/431,618 on May 29, 2014.
Office Action issued in U.S. Appl. No. 13/431,777 on May 20, 2014.
Office Action issued in U.S. Appl. No. 13/431,799 on Jun. 25, 2014.
Office Action issued in U.S. Appl. No. 13/431,779 on Jul. 1, 2014.
Office Action issued in Taiwanese Application No. 102111011 on Sep. 11, 2014.
Office Action issued in Taiwanese Application No. 101129146 on Sep. 16, 2014.
Office Action issued in Taiwanese Application No. 102111013 on Oct. 23, 2014; 14 pages.
Office Action issued in Taiwanese Application No. 101129145 on Oct. 7, 2014; 13 pages.
Office Action issued in Taiwanese Application No. 102111014 on Nov. 13, 2014; 15 pages.
Office Action issued in U.S. Appl. No. 13/431,777 on Nov. 17, 2014.
European Communication Pursuant to Article 94(3) EPC in European Application No. 12161619.7, dated Mar. 9, 2015, 7 pages.
European Communication Pursuant to Article 94(3) EPC in European Application No. 12161618.9, dated Mar. 5, 2015, 6 pages.
European Communication Pursuant to Article 94(3) EPC in European Application No. 12161620.5, dated Mar. 5, 2015, 7 pages.
European Communication Pursuant to Article 94(3) EPC in European Application No. 12161621.3, dated Mar. 5, 2015, 5 pages.
United States Office Action in U.S. Appl. No. 13/431,777, dated Apr. 3, 2015.
United States Office Action in U.S. Appl. No. 13/431,799, dated May 13, 2015, 19 pages.
United States Office Action in U.S. Appl. No. 13/431,779, dated Apr. 21, 2015, 27 pages.
Office Action issued in U.S. Appl. No. 13/431,618 on Nov. 14, 2014.

* cited by examiner

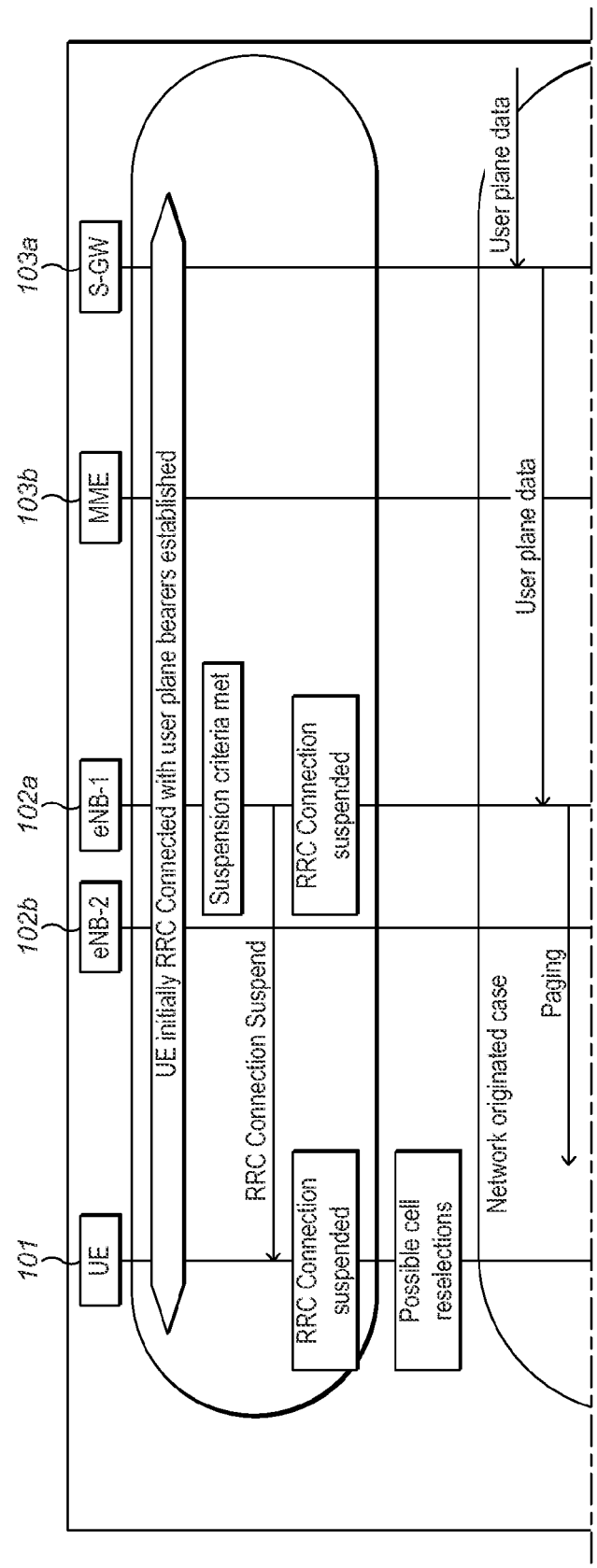

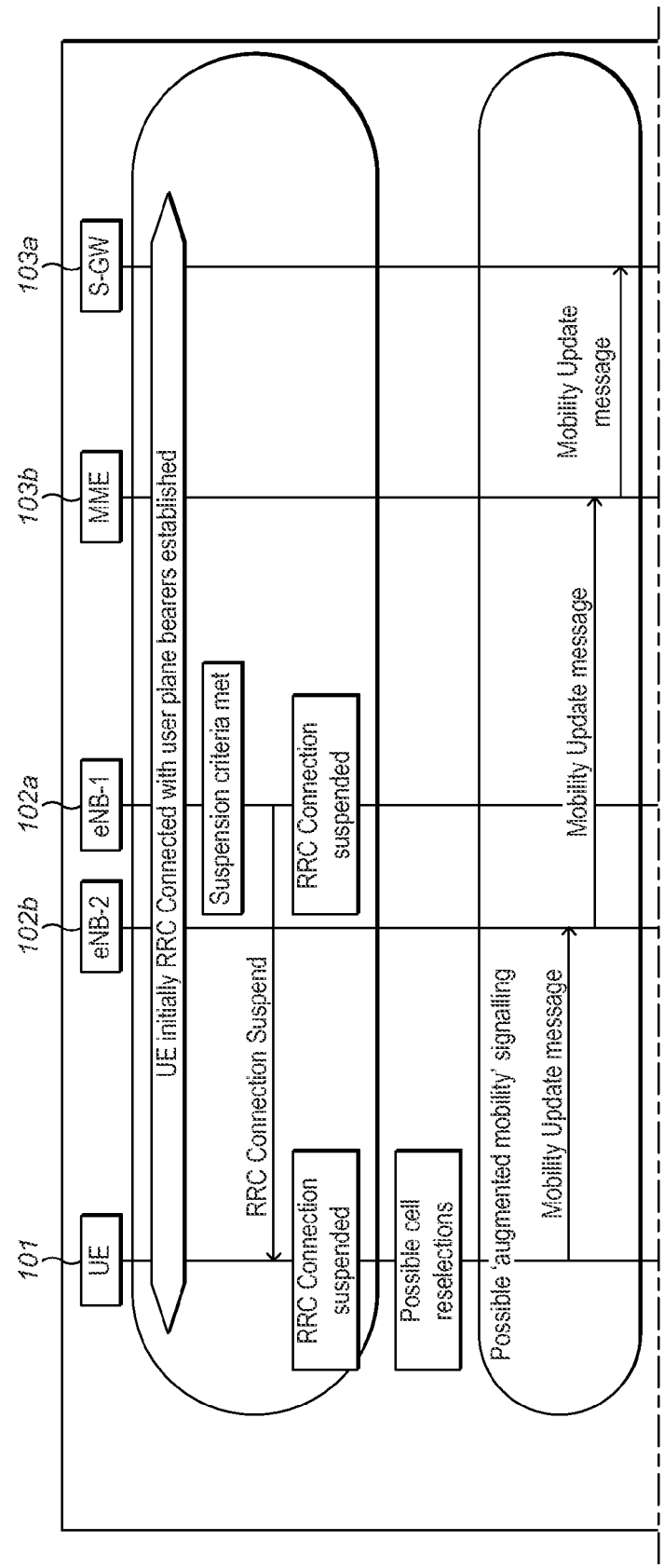

ENB STORING RRC CONFIGURATION INFORMATION AT ANOTHER NETWORK COMPONENT

TECHNICAL FIELD

The present disclosure relates to a wireless communication system and in particular the handling of connections between nodes in a wireless communication system.

BACKGROUND

Wireless communications systems are known that enable wireless data transfer between one or more user equipment (UE) and one or more Base Stations (BS) arranged to provide nodes of a cellular RAN. An increase in the prevalence of UEs operating on wireless cellular communications systems requires that such networks carry and support a wide variety of data traffic types and services. UEs can be viewed as generic computing platforms with wireless connectivity, capable of running a wide-ranging variety of applications and services that are either pre-installed by the device manufacturer or are installed/downloaded by the user according to the user's specific usage requirements. The applications themselves may originate from a correspondingly wide-ranging group of software houses, manufacturers and 3$^{rd}$ party developers. Such UE platforms may include mobile devices such as mobile telephones, 'smartphones', personal digital assistants, handheld or laptop computers, tablet computers and similar mobile devices having wireless communications connectivity, or similarly the UE referred to herein could include fixed devices that are relatively immovable in normal use, such fixed devices having wireless connectivity to enable them to communicate using the wireless communications system. The UE platforms may also include other device types comprising embedded communications connectivity, such as household appliances, utility meters and security and surveillance equipment, or consumer electronics devices such as still or video cameras, audio/visual entertainment equipment and gaming platforms.

Wireless communication networks often distinguish between user-plane traffic (which may be considered as carrying application-level user data) and control-plane traffic (which may be considered as signalling used to enable or support transfer of the user plane data via the wireless communication network, including for example mobility control and Radio Resource Control (RRC) functionality). Examples of user plane traffic and services carried by wireless communication networks include voice, video, internet/web browsing sessions, upload/download file transfer, instant messaging, e-mail, navigation services, RSS feeds and streaming media. Examples of control plane traffic include core-network mobility and attachment control (so-called Non-Access Stratum (NAS) signalling), radio access network control (such as Radio Resource Control (RRC)), and session control signalling.

Outside of (or "above") the radio and core network communication layers, applications may utilise or combine a multitude of internet-based (or other proprietary) protocols to achieve a desired result when provisioning for a specific service. For example, a navigation application may utilise TCP for file transfer of mapping data from a server to a device but may also employ protocols to support periodic or aperiodic keep-alive signalling towards the navigation server to maintain the application-level connection in the presence of intermediary network nodes such as stateful firewalls. Similarly, an e-mail application may employ particular synchronisation protocols to align the mailbox contents on the UE with those in an e-mail server, but may also employ periodic or aperiodic server polling mechanisms to check for new e-mail. The present disclosure concerns operating wireless communication systems to provide UEs with connectivity to support such applications.

For a more complete understanding of this disclosure, reference is now made to the following detailed description that sets out certain embodiments, taken in connection with the drawings, which can be briefly described as follows.

DETAILED DESCRIPTION

Figure 1:
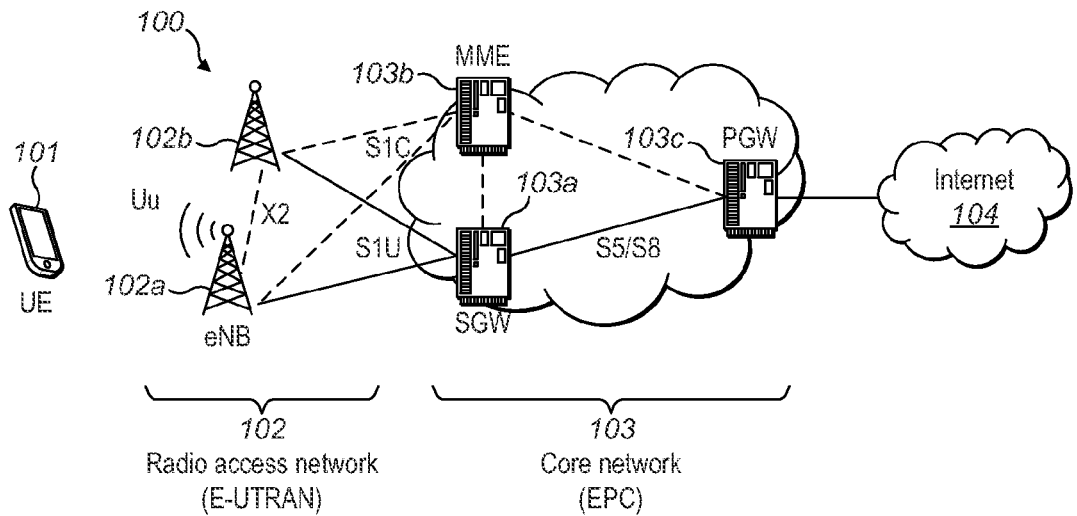
FIG. 1 shows a wireless communication system including an LTE Radio Access Network coupled to an Evolved Packet Core Network, further coupled to an external packet data network such as the public internet.

Many UE applications require or benefit from so-called always-on connectivity, such that a seamless and continuous connection experience is delivered to the user when using the UE and the applications running thereon. Whist the appearance of seamlessness is presented to the user at the service level, this may in fact be accomplished without permanent or continuous connectivity at all protocol levels beneath the application layer. Instead, it may be the case that connections are established and released on a regular or as-needed basis in order to deliver the user data when required but to allow for certain power efficiency or system efficiency savings in the UE during the intervening periods of time. However, a frequent establishment and release of these connections may also entail significant use of system resources or result in additional signalling loads within the network, and the associated system resource and control overheads may become large. For some application traffic, this may counteract the power or system efficiency benefits of employing such an "as-needed" connection establishment strategy. Systems and methods which are able to reduce these system resource and control overheads are therefore desirable such that overall system and power efficiencies are improved when attempting to deliver a seamless user or service experience at the application level via the communications network.

The prevalence of a plethora of application types, services, and means of service delivery in wireless communications systems results in a corresponding plethora of data traffic distributions and statistics that are presented to the wireless communication networks for delivery. Wireless communication networks are therefore less able to predict traffic profiles and distributions, and must be designed to adapt the connections and the assigned transmission resources to the dynamically varying (potentially "bursty") traffic loads.

In order to do so, wireless radio access networks can include dynamic scheduling such that a quantity of assigned shared radio resources may be varied in rapid response to data demand (e.g. data buffer status). Such dynamic scheduling typically operates on a time scale of one to a few milliseconds. At a time-scale above this (operating in the region of 100 ms to a few seconds), wireless communication networks often also employ a state-machine-oriented process to adapt a radio connection state or sub-state to the degree of observed traffic activity. Radio connection states or sub-states may differ in numerous ways, including; the degree of connectivity offered, the quantity of system resources that are reserved or used for the connection, and the amount of UE battery power consumed.

The connectivity level can be characterised as a combination of various connectivity attributes such as:

Location granularity: The accuracy to which the wireless communication network tracks the current location of the UE (e.g. to the cell level for more active UEs, or to only a group of cells for less active UEs)

Mobility control: The decision to change the cell to which the UE is associated may be taken by the network (network controlled mobility) or by the UE (UE controlled mobility). In the case of network controlled mobility a UE may be instructed to perform measurements and report measurement results to the network in order to assist the network in making the decision to perform a handover. Once a handover decision is made the network will typically prepare any necessary resources in the target cell before instructing the UE to change cell by sending a handover command. In the case of UE controlled mobility, the UE will perform measurements on neighbouring cells and use these measurements in making a decision to perform a cell reselection. The network can control the decision process by sending various cell reselection parameters (e.g. threshold, offsets, etc) in broadcast system information. Network controlled mobility (handover) requires more over the air signalling, network internal signalling, and network processing resource than UE controlled mobility.

Assigned resources: The presence, absence, type or amount of radio transmission resources available to the UE for performing communication, as a function of expected activity level Tx/Rx Readiness: The power consumed by UEs is often a function of their "readiness" to transmit or receive. For example, a UE must permanently activate its receiver in order to receive downlink communication from a basestation if the data may arrive at any given instant, resulting in high power consumption and battery drain. To save power, discontinuous reception (DRX) is often employed, allowing the UE to "sleep" and turn off its receiver at certain times. The basestation (BS) must take the UE's DRX pattern into account when determining the times at which it will be able to successfully deliver data to the UE. The activity cycle of a DRX pattern often varies as a function of the assigned radio connection state or sub-state.

Interfaces or bearers established: End-to-end communications (for example from a UE to a core network gateway or egress node towards external networks such as the internet) may require that user-specific connections (or bearers) are established between all participating network nodes or entities. The establishment of some of these interfaces may be associated with the radio connection state or sub-state as a function of the current activity level.

Disclosed herein are methods, apparatuses and software for use in a wireless communications system to suspend and handle the reactivation of a Radio Resource Control (RRC) connection for carrying user-plane and control plane data between a UE and a RAN. Also disclosed herein are methods, apparatuses and software for handling mobility control and downlink data for a UE for which an RRC connection is suspended.

In the context of this disclosure the terms "suspending", "suspend" or "suspension" in relation to an RRC connection mean storing a context relating to the RRC connection (or storing RRC connection data) and one or more of:

inhibiting the transmission of user plane data between a mobile device and a RAN node but the mobile device still able to receive paging from the RAN node and/or to receive notifications of downlink data from the RAN node;

a RAN node instructing a mobile device to perform functions (for example, paging and mobility procedures that may differ from those used in a normal or non-suspended RRC connected mode) that are the same as or similar to idle mode functions; and releasing the air interface or radio link(s) or radio resources associated with the RRC connection between the RAN node and the mobile device but the mobile device still being able to receive paging from the RAN node and/or to receive notifications of downlink data from the RAN node.

The RRC connection data or information (which can alternatively be referred to as RRC context data) may include parameters or other information related to an RRC connection or more general parameters related to the RRC layer or other layers. For example, it may include parameters relating to the current configuration of radio bearers, radio resources, temporary cell identifiers, security parameters or keys, MAC configuration, physical layer configuration and measurement and reporting configuration. It may also include data related to the RRC layer or other layers such as the physical layer, MAC layer, RLC layer, and PDCP layer. The security parameters or keys may, for example, include the $K_{asme}$, $K_{enb}$, $K_{RRCenc}$, $K_{RRCint}$, $K_{RRCUPenc}$, integrity algorithm, encryption algorithm, and radio bearer COUNT values.

In accordance with a first aspect there is provided a method, implemented in a mobile device for use with a Radio Access Network (RAN), comprising:

the mobile device sending an indicator to the RAN in respect of a radio resource control (RRC) connection with the RAN;

wherein the indicator indicates the preference of the mobile device to have the RRC connection either suspended or released.

In accordance with a second aspect there is provided a mobile device for use with a Radio Access Network (RAN), the mobile device being configured to:

send an indicator to the RAN in respect of a radio resource control (RRC) connection with the RAN;

wherein the indicator indicates the preference of the mobile device to have the RRC connection either suspended or released.

Typically, the indicator is a preference to have the RRC connection either suspended or released.

The indicator may be included in a request message sent by the mobile device to a RAN node in the RAN. Alternatively, or in addition, the indicator could be included in a capabilities message sent by the mobile device to a RAN node in the RAN.

Preferably, the mobile device receives a command message from the RAN; and the mobile device in response to the command message does at least one of:

releasing the RRC connection; and suspending the RRC connection.

The command message may be received in response to the sending of the indicator.

Preferably, the suspending of the RRC connection includes the mobile device storing RRC connection data for the RRC connection. The stored RRC connection data is usable by the mobile device to re-establish the suspended RRC connection.

The stored RRC connection data may comprise data representing one or more of:

the configuration of radio bearers in the RRC connection;

security parameters relating to the RRC connection and/or to the RRC layer generally and not necessarily specific to the RRC connection that is suspended;

temporary cell identifiers;

MAC configuration;

Physical Layer configuration; and

Measurement and reporting configuration.

In one example, the indicator may be sent in response to a RRC connection suspension criterion being met at the mobile device.

Typically, the RRC connection suspension criterion comprises at least one of:

the expiry of a timer at the mobile device;

no user plane data having been received from or sent to the RAN for a time period;

no user plane data being expected to be received from or sent to the RAN for a period of time;

a status of an input function or output function of the mobile device;

a status of one or more applications of the mobile device; and a higher layer indication to an RRC layer at the mobile device.

The higher layer indication may be from an application layer or from a non-access stratum (NAS) layer.

Preferably, the mobile device initiates re-establishment of the suspended RRC connection in response to:

the mobile device generating uplink data via the user plane of an RRC connection; or reception at the mobile device of paging; or reception at the mobile device of a notification that the RAN or a core network (CN) has downlink data buffered to send to the mobile device.

The mobile device may be configured to communicate with the RAN in accordance with an LTE or LTE Advanced protocol.

The RAN may be configured to communicate with the mobile device in accordance with the LTE or LTE Advanced protocol.

The RAN node or nodes may be eNode B(s).

In accordance with a third aspect there is provided a method, implemented in a node of a Radio Access Network (RAN) for use with a mobile device, the method comprising:

receiving at the RAN node a request from the mobile device for re-establishment of a radio resource control (RRC) connection suspended by another RAN node;

the RAN node attempting to retrieve RRC connection data relating to the suspended RRC connection; and the RAN node doing one of:

if the RRC connection is valid, sending a connection re-establishment command message to the mobile device; and if the RRC connection is invalid, sending a connection re-establishment reject message to the mobile device.

In accordance with a fourth aspect there is provided a node of a Radio Access Network (RAN) for use with a mobile device, the RAN node being configured to:

receive a request for re-establishment of a radio resource control (RRC) connection suspended by another RAN node;

attempt to retrieve RRC connection data relating to the suspended RRC connection;

if the RRC connection is valid, sending a connection re-establishment command message to the mobile device; and if the RRC connection is invalid, sending a connection re-establishment reject message to the mobile device.

In some examples, the connection re-establishment command message may be one of a RRC Connection Reestablishment Command message or a RRC Connection Reconfiguration message. Other new or existing 3GPP messages are also possible. Similarly, the connection re-establishment reject message may be a RRC Connection Reestablishment Reject message. Other new or existing 3GPP messages are also possible.

Typically, the RAN node determines whether or not the suspended RRC connection is valid by reference to the RRC connection data.

The RAN node may determine whether or not the suspended RRC connection is valid by at least one of:

determining that a timer has not expired; and whether the RRC connection data is retrieved.

In one example, the RRC connection data is retrieved from another network component. The other network component is a RAN network component, such as a RAN node, or a core network (CN) network component, such as a mobility management entity (MME). However, other CN network components could possibly used, such as a serving Gateway (S-GW).

In another example, the RRC connection data could have been stored, by the other RAN node, in a memory device in the RAN node and the RAN node retrieves it from the memory device.

The RAN node may retrieve the stored RRC connection data and re-establish the suspended RRC connection in response to the mobile device responding to a paging request or a notification of downlink data.

The RAN node may retrieve the stored RRC connection data and re-establish the suspended RRC connection in response to receiving a re-establishment request message from the mobile device for re-establishment of the suspended RRC connection.

The RAN node or nodes may be configured to communicate with the mobile device in accordance with a LTE or LTE Advanced protocol.

The RAN node or nodes may be eNode B(s).

In accordance with a fifth aspect there is provided a method implemented in a node of a Radio Access Network (RAN) for use with a mobile device, the method comprising:

a RAN node transmitting radio resource control (RRC) connection data, relating to a RRC connection with a mobile device, to at least one other network component; and the RAN node suspending the RRC connection with the mobile device.

In accordance with a sixth aspect there is provided a node of a Radio Access Network (RAN) for use with a mobile device, the RAN node being configured to:

transmit radio resource control (RRC) connection data, relating to a RRC connection with a mobile device, to at least one other network component; and suspend the RRC connection with the mobile device.

The at least one other network component may be a RAN network component, such as a RAN node, or CN network component such as MME. However, it is possible that the other network component could be another CN network component, such as a S-GW.

The RRC connection data may also be stored at the RAN node.

Preferably, the RRC connection data transmitted to the other network component is usable by the RAN node or another RAN node to re-establish the suspended RRC connection.

The RRC connection data may comprise data representing one or more of:

the configuration of radio bearers in the RRC connection;

security parameters, either relating to the RRC connection or not specific to the RRC connection;

temporary cell identifiers;

MAC configuration;

Physical Layer configuration; and

Measurement and reporting configuration.

The RRC connection data may be marked to indicate the suspension of the RRC connection.

Preferably, the RAN node transmits the RRC connection data to the other network component and suspends the RRC connection, in response to a suspension criterion being met.

The suspension criterion comprises at least one of:

the expiry of a timer at the RAN Node;

transmission of a message by the RAN node to the mobile device to instruct release of the established RRC connection;

receiving at the RAN node a suspension request message from the mobile device;

no user plane data having been received from or sent to the mobile device for a time period;

no user plane data being expected to be received from or sent to the mobile device for a period of time; and a higher layer indication to a RRC layer The higher layer indication may be from an application layer or a non-access stratum (NAS) layer.

Typically, the RRC connection data comprises an identification of the mobile device.

The RRC connection data may comprise an identification of a cell serving the mobile device when the RRC connection is suspended.

Typically, the RAN node may send a message to inform any other RAN node or a Core Network (CN) node that the RRC connection has been suspended and the RRC connection data stored in the other network component.

Preferably, the RRC connection data is transmitted to the other network component for storage at the other network component.

The RAN may be configured to communicate with the mobile device in accordance with a LTE or LTE Advanced protocol.

The RAN node or nodes may be eNode B(s).

In accordance with a seventh aspect there is provided a method in a network component, the method comprising:
  receiving radio resource control (RRC) connection data from a first radio access network (RAN) node, the RRC connection data relating to a RRC connection between the first RAN node and a mobile device, the RRC connection being suspended or to be suspended by the first RAN node; and storing the RRC connection data.

In accordance with an eighth aspect there is provided a network component configured to:
  receive radio resource control (RRC) connection data from a first radio access network (RAN) node, the RRC connection data relating to a RRC connection between the first RAN node and a mobile device, the RRC connection being suspended or to be suspended by the first RAN node; and
  store the RRC connection data.

Preferably, the network component may be a RAN network component or a CN network component. For example, where the network component is a RAN network component, it may be a RAN node and where the network component is a CN network component, it may be a MME. However it is possible that the CN network component may be a S-GW.

The first RAN node may be in a validity area of the MME where the other network component is an MME.

Typically, the stored RRC connection data can be retrieved by a RAN node to re-establish the suspended RRC connection with the mobile device.

The RRC connection data can be retrieved by the first RAN node, the second RAN node or another RAN node (or third RAN node) to re-establish the suspended RRC connection with the mobile device.

Preferably, the RRC connection data comprises data representing at least one of:
  the configuration of radio bearers in the RRC connection;
  security parameters relating to either the RRC connection or non-specific to the RRC connection;
  temporary cell identifiers;
  MAC configuration;
  Physical Layer configuration; and
  Measurement and reporting configuration.

Typically, the RRC connection data comprises an identification of the mobile device.

The RRC connection data may comprise an identification of a cell serving the mobile device when the RRC connection is suspended.

In accordance with a ninth aspect, there is provided a method, implemented in a node of a Radio Access Network (RAN) for use with a mobile device, the method comprising:
  the RAN node sending a connection suspend command message to a mobile device to suspend a RRC connection with the mobile device.

In accordance with a tenth aspect, there is provided a Radio Access Network (RAN) node for use with a mobile device, the RAN node being configured to:
  send a connection suspend command message to a UE to suspend a RRC connection with the UE.

In one example, the connection suspend command message may be sent in response to a suspension criterion being met at the RAN node.

The suspension criterion may be at least one or:
  the expiry of a timer at the RAN Node;
  receiving at the RAN node a suspension request message from the mobile device;
  no user plane data having been received from or sent to the mobile device for a time period;
  no user plane data being expected to be received from or sent to the mobile device for a period of time; and
  a higher layer indication to a RRC layer. The higher layer may be an application layer or non-access stratum (NAS) layer.

The RAN node may receive from the mobile device, in response to the connection suspend command message, an acknowledgement message. The acknowledgement message may include an acknowledgement from at least one of a RRC layer or a medium access control (MAC) layer of the mobile device.

The RAN node may release mobility control of the mobile device to the mobile device, while the RRC connection is suspended.

The RAN node may also store RRC connection data for the RRC connection.

The RAN node may be an eNodeB.

According to an eleventh aspect, there is provided a method, implemented in a mobile device for use with a Radio Access Network (RAN), the method comprising:
  the mobile device receiving a connection suspend command message from the RAN instructing the mobile device to suspend a RRC connection with the RAN; and
  the mobile device, in response to the connection suspend command message, suspending the RRC connection.

According to a twelfth aspect, there is provided a mobile device for use with a Radio Access Network (RAN), the mobile device being configured to:
  receive a connection suspend command message from the RAN instructing the mobile device to suspend a RRC connection with the RAN; and
  suspend the RRC connection in response to the connection suspend command message.

The mobile device may send a connection suspend request message to the RAN requesting suspension of the RRC connection; and receive the connection suspend command message from the RAN in response to the connection suspend request message.

The connection suspend request message may be sent in response to a suspension criterion being met at the mobile device.

The suspension criterion may be at least one of:
  the expiry of a timer at the mobile device;
  no user plane data having been received from or sent to the RAN for a time period;
  no user plane data being expected to be received from or sent to the RAN for a period of time;
  a status of an input function of the mobile device;
  a status of an output function of the mobile device;
  a status of one or more applications of the mobile device; and
  a higher layer indication to an RRC layer at the mobile device.

The higher layer may be an application layer or non-access stratum (NAS) layer of the mobile device.

The mobile device may, in response to the connection suspend command message, send to the RAN node an acknowledgement message.

The acknowledgement message may include an acknowledgement from at least one of a RRC layer or a medium access control (MAC) layer of the mobile device.

The mobile device may control mobility while the RRC connection is suspended.

The mobile device may be configured to communicate with the RAN in accordance with a LTE or LTE Advanced protocol.

According to a thirteenth aspect, there is provided a method, implemented in a node of a Radio Access Network (RAN) for use with a mobile device, the method comprising:
the RAN node receiving from a mobile device a connection re-establishment request message to have a suspended RRC connection re-established;
in response to the connection re-establishment request message the RAN node sending a connection re-establishment command message to the mobile device; and
the RAN node receiving in response to the connection re-establishment command message a connection re-establishment complete message from the mobile device.

According to a fourteenth aspect, there is provided a Radio Access Network (RAN) node for use with a mobile device, the RAN node being configured to:
receive from a UE a connection re-establishment request message to have a suspended RRC connection re-established;
send a connection re-establishment command message to the UE, in response to the connection re-establishment request message; and
receive, in response to the connection re-establishment command message, a connection re-establishment complete message from the UE.

The connection re-establishment command message may be one of a RRC Connection Reestablishment command message and a RRC Connection Reconfiguration message.

The connection re-establishment complete message may be one of a RRC Connection Reestablishment Complete message and a RRC Connection Reconfiguration Complete message.

The RAN node may be an eNodeB.

According to a fifteenth aspect, there is provided a method, implemented in a mobile device for use with a Radio Access Network (RAN), the method comprising:
the mobile device sending a connection re-establishment request message to a RAN to have a suspended RRC connection re-established;
the mobile device receiving, in response to the connection re-establishment request message, a connection re-establishment command message from the RAN; and
the mobile device, in response to the connection re-establishment command message, re-establishing the RRC connection with the RAN and sending a connection re-establishment complete message to the RAN;

According to a sixteenth aspect, there is provided a mobile device for use with a Radio Access Network (RAN), the mobile device being configured to:
send a connection re-establishment request message to a RAN to request re-establishment of a suspended RRC connection;
receive, in response to the re-establishment request message, a connection re-establishment command message from the RAN; and
re-establish the RRC connection with the RAN and send a re-establishment complete message to the RAN, in response to the connection re-establishment command message.

The connection re-establishment request message may be sent in response to a re-establishment criterion being met at the mobile device.

The re-establishment criterion may include at least one of:
the mobile device generating uplink data via the user plane of an RRC connection;
reception at the mobile device of a page;
reception at the mobile device of a notification that the RAN or a core network (CN) has downlink data buffered to send to the mobile device; and
the mobile device reselecting to another cell.

The connection re-establishment command message may be one of a RRC Connection Reestablishment command message and a RRC Connection Reconfiguration message.

The connection re-establishment complete message may be one of a RRC Connection Reestablishment Complete message and a RRC Connection Reconfiguration Complete message.

The mobile device may be configured to communicate with the RAN in accordance with an LTE or LTE Advanced protocol.

Preferably, one or more of the above aspects can be combined as desired. In addition, features of any aspect may be combined with another aspect where appropriate.

Long Term Evolution (LTE) is a Third Generation Partnership Project (3GPP) standard for wireless communication network technology. An illustrative example of a wireless communication system 100 supporting communications in accordance with LTE is shown in FIG. 1.

The following detailed description is set out in the context of a wireless communication system supporting LTE, but it should be understood that the applicability of the present disclosure is in no way limited to LTE. Indeed the broad concepts of UE-RAN RRC connection suspension and handling thereof disclosed herein are equally applicable in other wireless communication systems supporting other technologies and protocols, whether currently known or not yet envisaged. In this respect, the disclosure should in no way be limited to the following illustrative implementations, drawings and techniques, but may be modified and used in other wireless communication systems without departing from the scope of the appended claims, due regard being given to all equivalents.

LTE describes a plurality of requirements for wireless communications systems in evolved or advanced cellular broadband technologies. Such requirements include providing an Evolved Universal Mobile Telecommunications System (UMTS) Terrestrial Radio Access Network (E-UTRAN)—i.e. RAN 102. As shown in FIG. 1, RAN 102 provides a high-speed radio access technique to support wireless communications between UE 101 and one or more BS acting as nodes of the RAN 102 to meet the increased network demands, including improving user throughputs and network capacity, reducing latency, and increasing mobility. The LTE RAN 102 shown in FIG. 1 comprises one node type acting as the node base stations (BS)—i.e. evolved Node Bs (eNB) 102a,b, . . . n, advanced LTE equipment that supports an E-UTRAN air interface, and which can provide at least some of the functionalities of the BS, wireless access points, and other systems and devices some of which may be more evolved than the equivalent equipment in a traditional wireless telecommunications system. The term eNB or access device may be used herein to refer to any device, existing or advanced, that may be used to gain access to a network. Such advanced or next generation equipment may be referred to herein as long-term evolution (LTE) equipment.

An eNB may support communications with UEs via one or more cells. A communication between an eNB and a UE may comprise communication via a single cell of the eNB or may comprise simultaneous or non-simultaneous communication via more than one cell.

In some implementations, the functionality of an eNB may be self-contained within one physical node or entity, whilst in other implementations, said functionality may be distributed between more than one physical node or entity with interconnections therebetween.

As can be seen in FIG. 1, the LTE wireless communication network 100 provides a Uu radio interface between the UE 101 and the eNB 102a of the RAN 102 to facilitate radio communications therebetween.

LTE uses an Evolved Packet Core (EPC) network architecture for the Core Network (CN) 103 to support the RAN 102 (in the LTE case, the E-UTRAN). Thus, as shown in FIG. 1, the eNB RAN nodes 102a,b... n form connections with one or more nodes in the EPC CN 103 (described below). The EPC network architecture transports protocols such as Transmission Control Protocol (TCP)/internet Protocol (IP) for supporting IP based services, such as voice, video, other media, and messaging, with end-to-end Quality of Service (QoS). The EPC network architecture also enables improved connections and hand-over to other fixed-line and wireless access technologies with improved mobility.

The LTE Radio Access Network 102 (E-UTRAN) coupled to an EPC CN 103 may be further coupled to an external packet data network such as the public internet 104.

The EPC CN 103 shown in FIG. 1 comprises three node types—the Serving Gateway (SGW) 103a routes user-plane data within the core network, the Mobility Management Endpoint (MME) 103b handles mobility and connection control between the UE and the core network, and the Packet Gateway (PGW) 103c ingress/egress node routes data between the core network and external networks. During a communications session between the UE 101, eNB 102a and CN 103 an 'S1' network interface between the RAN 102 and CN 103 is formed, including a control plane bearer connection 'S1-MME' (sometimes referred to as 'S1c') 'S1-MME' between the eNB 102a and MME 103b, and a user plane bearer connection 'S1u' between the eNB 102a and SGW 103a. An 'S5/S8' interface between the SGW 103a and PGW 103c provides user plane communications therebetween. MME 103b may be connected to SGW 103a, for example via an 'S11' interface.

Figure 2:
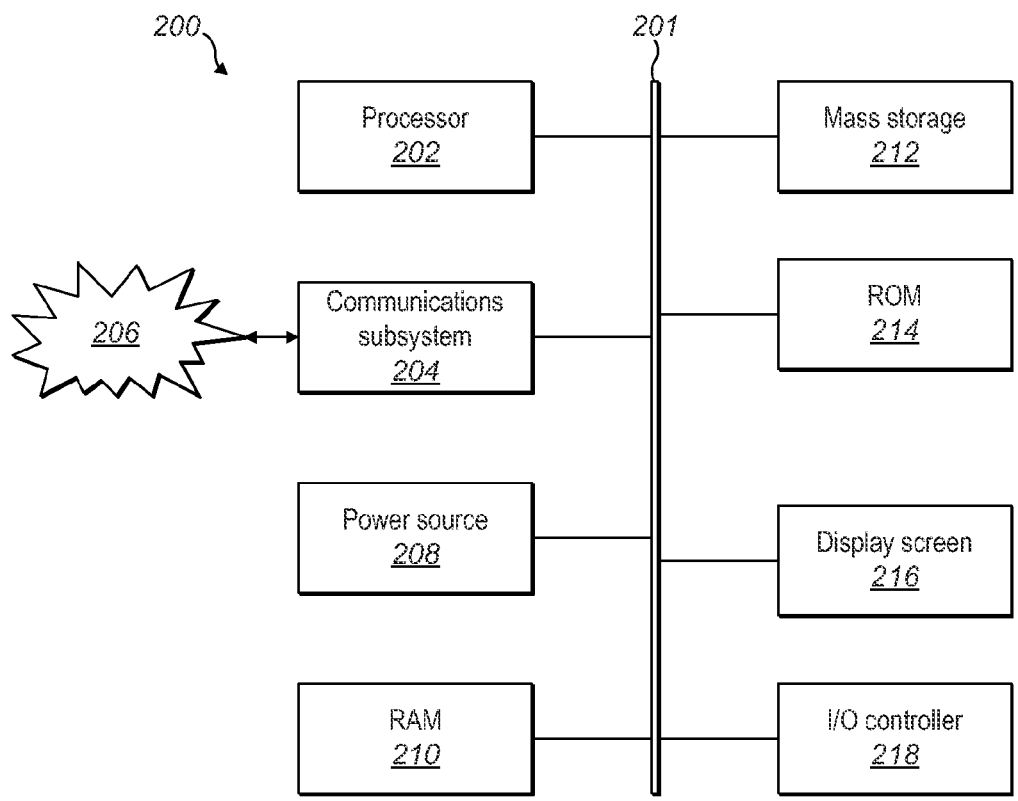
FIG. 2 shows a block diagram of selected components of an example UE for use in a wireless communication system in accordance with the present disclosure.

FIG. 2 shows a block diagram illustrating some example components comprised in an example UE 200 that can be used in the LTE-enabled wireless communications system as shown in FIG. 1. The UE 200 may be a wireless device and its associated Universal Integrated Circuit Card (UICC) that includes a Subscriber Identity Module (SIM) application, a Universal Subscriber Identity Module (USIM) application, or a Removable User Identity Module (R-UIM) application or the UE 200 might be the device itself without such a card.

UE 200 includes multiple components linked by a communications bus 201. A processor 202 controls the overall operation of the UE 200. Communication functions, including data and voice communications, are performed through a communication subsystem 204. The communication subsystem 204 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. The communication subsystem 204 may enable the processor 202 to communicate with the Internet or one or more telecommunications networks or other networks from which the processor 202 might receive information or to which the processor 202 might output information. In the context of FIG. 1, the communication subsystem 204 receives messages from and sends messages to wireless network 206 which may be the RAN 102 shown in FIG. 1 for voice communications or data communications or both. A power source 208, such as one or more rechargeable batteries or a port to an external power supply, powers the UE 200.

The processor 202 interacts with other components of the electronic device including Random Access Memory (RAM) 210, mass storage 212 (including but not limited to magnetic and optical disks, magnetic tape, solid state drives or RAID arrays), Read Only Memory (ROM) 214 and display screen 216, which may be, for example, a Liquid Crystal Display (LCD). An i/o controller 218 sends and receives signals relative to one or more user control devices, such as a touch sensitive overlay on the display screen 216 to enable user interaction with the UE 200.

The processor 202 executes instructions, code, software or computer programs it may access from communications subsystem 204, RAM 210, mass storage 212 or ROM 214. The processor 202 may comprise one or more data processing units or CPU chips. The processor 202 may execute the instructions solely by itself, or in concert with other locally or remotely provided data processing components or other components not shown in FIG. 2. In particular, the processor 202 is capable of carrying out instructions such that the UE 200 is operable to perform wireless communications in an LTE network in accordance with the disclosure set out below.

Figure 3:
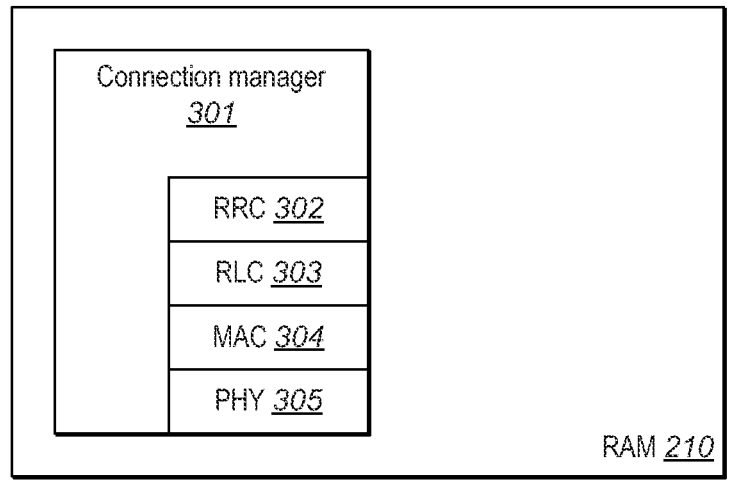
FIG. 3 shows an illustration of a control manager in a RAM of the UE shown in FIG. 2 for facilitating communications with a wireless communication system in accordance with the present disclosure.

For example, referring to FIG. 3, the processor 202 may carry out instructions to instantiate and maintain a communications manager 301 in RAM 210 that in use operates the communications subsystem 204 to perform signalling to interact with RAN 102.

The communications manager 301 may instantiate, for example in the RAM 110 of UE 201, an LTE protocol stack to provide, at the Access Stratum layers of LTE, one or more of a Radio Resource Control (RRC) signalling layer 302 that is typically responsible for the control of radio related functions, a Radio Link Control (RLC) signalling layer 303 that is typically responsible for the retransmission of lost data, a Medium Access Control (MAC) signalling layer 304 that is typically responsible for controlling access to the Physical Layer (PHY) 305. Of course, layers of the protocol stack may be implemented elsewhere, for example the MAC and PHY signalling may be provided in the UE by firmware or hardware and so not maintained in RAM 110. Indeed, the implementation of the protocol stack in the UE shown in FIG. 3 is only one example of many possibilities within the scope of the present disclosure, and is provided for explanatory purposes only.

The LTE Physical Layer (PHY) uses advanced technologies, including Orthogonal Frequency Division Multiple Access (OFDMA), multiple-input and multiple-output (MIMO) data transmissions, and smart antennas to meet the network demands above. The LTE PHY uses OFDMA for downlink transmissions, for instance from a BS to a UE, which can communicate by transmitting signals throughout a geographical region known as a cell. Additionally, Within one carrier, the LTE PHY uses Single Carrier Frequency Division Multiple Access (SC-FDMA) for uplink transmissions, for instance from the UE to the BS. The OFDMA and SC-FDMA technologies facilitate an increase in the system capacity and throughput when performing communications via an associated spectrum or bandwidth.

As mentioned above, the LTE system includes protocols such as a Radio Resource Control (RRC) protocol, which is responsible for the assignment, configuration and release of connections and radio resources between the UE 101 and the eNBs 102*a,b,* . . . *n* of RAN 102 or other access or LTE equipment. The RRC protocol is described in detail in the 3GPP TS 36.331 specifications. According to the RRC protocol, the two basic RRC connection modes for the UE in LTE are defined as "idle mode" and "connected mode."

During the connected mode or state, the UE 101 may exchange signals with the network and perform other related operations, including the ability to perform user-plane communications with the network, while during the idle mode or state, the UE 101 may shut down at least some of its abilities and operations, and is no-longer able to perform user-plane communications with the network. Idle and connected mode behaviours are described in detail in the Third Generation Partnership Project (3GPP) specifications TS 36.304 and TS 36.331.

Figure 4:
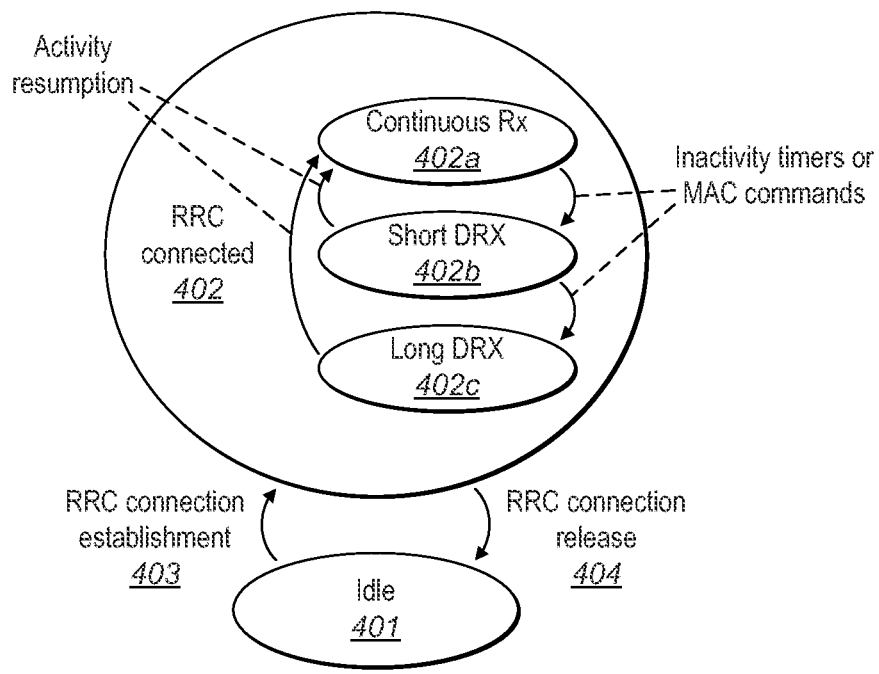
FIG. 4 illustrates the RRC connection states, DRX sub-states and the transitions therebetween in LTE.
Figure 5:
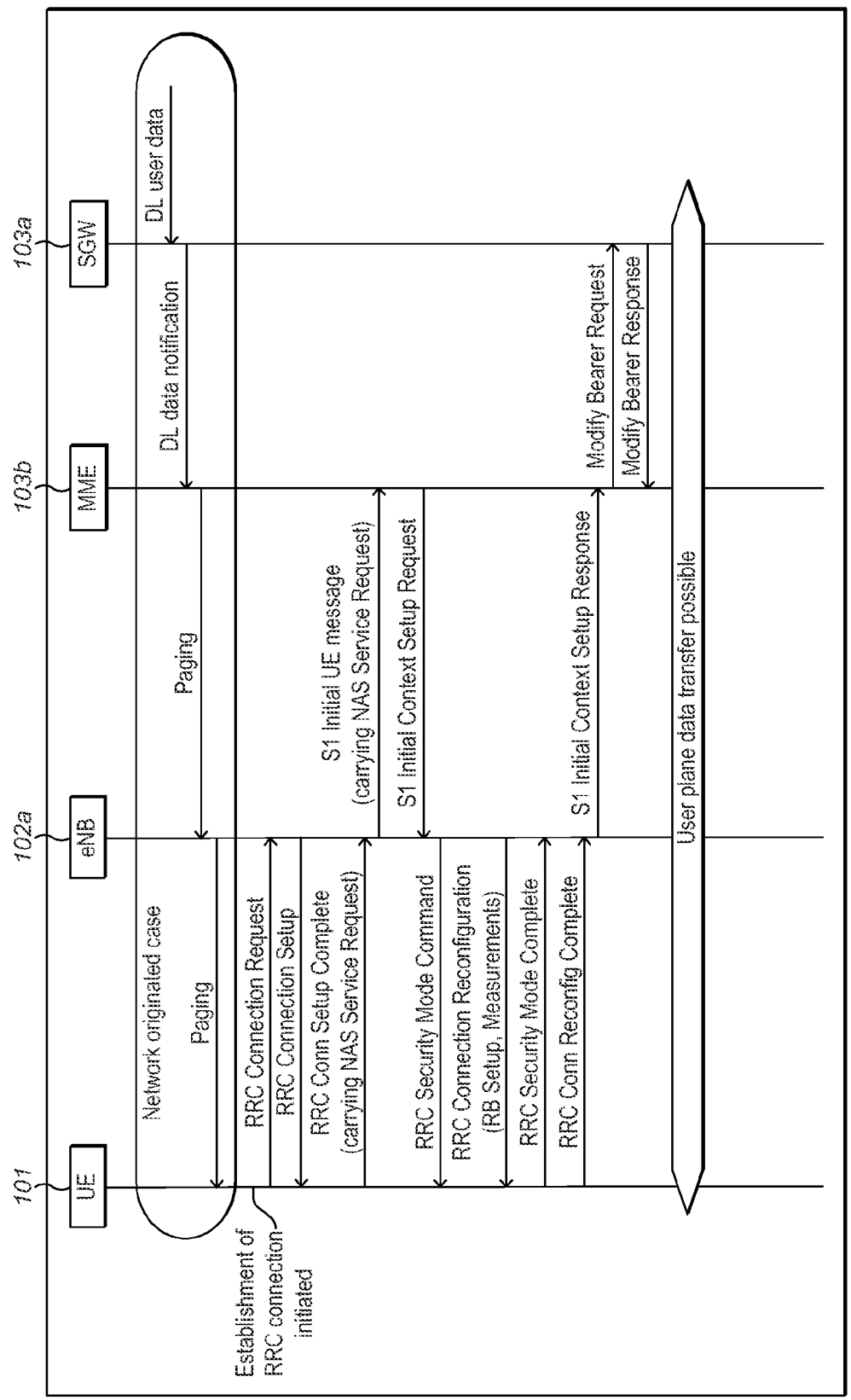
FIG. 5 is a message sequence chart illustrating a normal RRC connection procedure in a wireless communication system in which no RRC connection suspension functionality is provided.

FIG. 4 illustrates the RRC state transitions for LTE. Transitions between idle mode 401 and connected mode 402 in LTE are effected via explicit RRC connection establishment 403 (or setup) and release 404 procedures and involve associated signalling overheads. During normal idle mode procedures, should a need for user plane communications arise, an RRC connection is established via the currently-camped cell. The sequence of messages exchanged during a normal RRC connection establishment to transition between idle mode and connected mode in LTE is shown in FIG. 5. If the connection is UE-originated, an RRC connection request message is sent (initiated using the PRACH random access channel) by UE 101. Conversely, if the connection is network-originated, the MME 103*a* first requests for all eNBs 102*a,b* . . . *n* within the known tracking area to send a paging message to the UE 101 in order to stimulate the UEs sending of an RRC connection request message.

Within the Connected Mode 402, UE 101 may implement DRX procedures, these being controlled within the Medium Access Control (MAC) layer. The DRX pattern is defined via the use of multiple timers and processes that may be triggered by data activity or other events. However, the overall degree of DRX may be conceptualised to exist in one of three predominant modes, wherein one of these modes may be in use at any one time. It is therefore possible to consider these DRX modes as MAC sub-states of the RRC connected mode 402, each associated with a DRX level:

Continuous Reception 402*a*: No DRX—the receiver of UE 101 is always on and ready to receive user plane data over the RRC connection.

Short DRX 402*b*: The UE is allowed to turn off its receiver (sleep, or DRX) for all but M out of N sub-frames (where a sub-frame is a 1 ms unit of transmission time in the LTE system), where M is a small value, such a 1 or 2, and N is a relatively small value, such as 8.

Long DRX 402*c*: The UE is allowed to turn off its receiver (sleep, or DRX) for all but M out of N sub-frames, where M is a small value, such a 1 or 2, and N is a relatively large value, such as 256.

For correct system operation it is important that both the eNB 102*a* and the UE 101 are synchronised as to which sub-frames are categorised as DRX (the UE 101 may sleep) and which are not (the UE 101 may not sleep). To enable such co-ordination, inactivity timers may be configured (in both the UE 101 and the eNB 102*a*) in order to implicitly control (i.e. without signalling commands or orders) transitions towards Connected-Mode DRX sub-states with increased DRX. In addition, MAC commands may also be used by the network (sent from eNB 102*a* to the UE 101) in order to explicitly direct a transition to an increased DRX sub-state.

When in the connected mode 402, any communication of new user plane data typically results in a transition to the continuous reception sub-state 402*a* for a period of time determined by the ongoing packet data activity and an inactivity timer known as the DRX-InactivityTimer. Each new data packet resets the DRX-InactivityTimer to a preconfigured value and when the timer expires, a transition from continuous reception 402*a* to one of the DRX sub-states 402*b*, 402*c* is made.

In the LTE system, the mechanisms used to control UE mobility between cells of the network differs between the idle 401 and connected 402 modes:

In idle mode 401, mobility is UE-controlled (i.e. the UE 101 performs cell selection and reselection procedures as per 3GPP Technical Specification 36.304 and in accordance with related configuration parameters set by the network). Following selection or reselection of a new cell by the UE 101, the UE 101 will inform the network of its new location only if the new cell belongs to a tracking area that is different from the tracking area of the previous camped cell. A tracking area is a group of cells—which cells belong to which tracking area is dependent upon network configuration. Thus, in idle mode 401, mobility reports are only seldom sent by the UE 101, and the network is aware of the UE's location with relatively coarse granularity (tracking area level as opposed to cell level).

In connected mode 402, the UE 101 performs measurements of other cells (on the same or other frequencies) according to the configuration sent to the UE 101 by the network in measurement control messages. The measurements are reported by the UE 101 to the network wherein they are used by the network to make handover decisions. Subsequent to a handover decision by the network, the UE 101 is instructed to move to another cell or frequency. Thus, in connected mode 402, measurement reports may be sent relatively frequently and the network is aware of the UE's location with finer granularity (to the cell level).

The RRC and MAC/DRX sub-states for LTE are summarised in Table 1 below.

TABLE 1

| LTE RRC/MAC State/substate | Radio Access Bearers Established (Uu, S1) | Core Network Bearers Established (S5/S8) | Radio Resources Available | Location Accuracy | Mobility Control | DRX |
|---|---|---|---|---|---|---|
| Connected, Cont. Rx | Yes | Yes | Yes | Cell | Network | No |

TABLE 1-continued

| LTE RRC/MAC State/substate | Radio Access Bearers Established (Uu, S1) | Core Network Bearers Established (S5/S8) | Radio Resources Available | Location Accuracy | Mobility Control | DRX |
|---|---|---|---|---|---|---|
| Connected, Short DRX | Yes | Yes | Yes (return to continuous) | Cell | Network | Short sleep |
| Connected, Long DRX | Yes | Yes | Yes (return to continuous) | Cell | Network | Long sleep |
| Idle | No | Yes | No | Tracking Area | UE | Long sleep |

As will be evident from the description below, the present disclosure sets out a method, usable in, for example, an LTE wireless communication network, of suspending an RRC connection such that at least user plane communications between the UE and eNB are disabled (i.e. not able to be transmitted or received by the UE and the eNB), but in which the suspended RRC connection can be efficiently reactivated such that communications between the UE and eNB are resumed across the same 'established' RRC connection, without a new RRC connection having to be created. This provides significant advantages for wireless communications systems for the following reasons.

Some applications running on UEs may generate traffic that requires the provision of transmission resources only infrequently or for short periods of time. Traffic of this nature may be characterised as 'bursty' or 'sporadic' and may involve extended periods of time with little or no data activity. When handling such traffic within the system, frequent RRC state transitions from idle mode 401 to connected mode 402 for the UE 101 would each involve significant signalling exchanges between the UE 101 and the RAN 102, and/or between the RAN 102 and the CN 103. The signalling may for example be needed to:

1. establish or reconfigure Radio Bearers (e.g. over the Uu interface between the UE 101 and the RAN 102),
2. establish or reconfigure other bearers, bearer segments, or communication paths (e.g. the S1 bearer(s) between an LTE eNB 102a,b . . . n and the SGW 103a, or the S5/8 bearer(s) between the SGW 103a and PGW 103c),
3. carry out security procedures to establish secure communications,
4. establish or reconfigure physical radio resources to be used for or during the connection and/or,
5. configure other parameters related to operation within the RRC connected mode.

If, for reasons of network efficiency, the UE 101 were kept always in RRC connected mode 402 while handling such traffic, such that repeated state transitions and the related network messaging overhead described above were avoided, this could lead to high power usage and shorter battery life for the UE 101 due to the relatively high power requirements of being always on in RRC connected mode 402. This is partly because in RRC connected mode 402 mobility is always network controlled at the cell level (which involves measurement reporting from the UE). In addition, although DRX cycles (controlled by the MAC layer) may be employed to reduce UE power consumption during times of data inactivity, mobility still remains network controlled and also, the connected-mode DRX configuration is set by the network and may not provide the UE with power consumption comparable to that of idle mode 401. Furthermore, some radio transmission resources may be assigned, reserved or used by the UE for control signalling purposes when in connected mode even though there may be no immediate user-plane data for transmission. The connected mode DRX sub-state may thus exhibit excessive power consumption for the UE 101 or inefficient use of system resources for the RAN 102, whilst a transition to idle mode 401 (and subsequently back to connected mode 402 on resumption of data activity) may incur significant signalling overheads to execute.

As will be evident from the following description, suspending the RRC connection, as set out in the present disclosure, provides advantages over these two techniques of controlling wireless communication systems particularly during so-called 'bursty' or sporadic data transfer to UEs (i.e. repeated state transitions or of holding the UE in a DRX sub-state of connected mode 402), such that, in the present disclosure, network traffic and power consumption can be relatively low, and battery life can be relatively high.

In the present disclosure, rather than a UE 101 that is in a connected mode 402 but which is temporarily inactive (i.e. due to no immediate data transfer being needed during an inactive time period of bursty or sporadic communications) transitioning to an idle mode 401 or to a connected mode DRX sub-state 402a, 402b, the UE 101 instead is configured to perform UE controlled mobility (UE autonomous cell selection/reselection) and DRX procedures as if it were in idle mode (the idle mode configuration is reused thereby obviating the need for a new RRC state definition or configuration). However, whilst behaving as if in idle mode, the RRC connection for the UE may be considered to be "suspended" (as opposed to released). The difference between an RRC suspension and an RRC release is that some or all of the RRC connection information or RRC context is not discarded but is instead stored at a network component in either the radio access network (RAN) or the core network (CN), such as at one or more eNBs 102 and/or mobility management entity (MME) 103b and/or stored at the UE 101.

The stored (suspended) RRC connection information may comprise, for example, one or more of: parameters relating to the current configuration of radio bearers, radio resources, temporary cell identifiers, security parameters or keys, MAC configuration, physical layer configuration and measurement and reporting configuration. The RRC connection information or RRC context information) may also consist of data related to the RRC layer or other layers such as the physical layer, MAC layer, RLC layer, and PDCP layer. The security parameters or keys may, for example, include the $K_{asme}$, Kenb, KRRCenc, KRRCint, KRRCUPenc, integrity algorithm, encryption algorithm, and radio bearer COUNT values. Thus one or more components of a radio connection "context" still exist in memory within a network component and UE 101, but these may be labelled as 'inactive', 'dormant' or 'suspended'. This may mean that one or more of the stored RRC connection parameters may not be used for immediate user plane communications between the UE 101 and the eNB 102a without first executing one or more of: a step of determining their current validity, a step of reactivating or re-establishing the connection via a cell of the radio access network in order to return to the normal connected mode from the suspended state.

When a RRC connection is suspended, components of the RRC context data may be stored or maintained in the UE and/or network. The criteria for triggering or initiating a connection suspension, may be linked to the activity or profile of the data resulting from one or more applications running, open or in use on the device. This may include estimations, predictions or measurements of the data volume or data rates required by the radio connection or by one or more applications, It may further comprise estimations, predictions or measurements of packet arrival or inter-arrival times.

The criteria for triggering may also be linked to a status of the UE or of a mobile device connecting to the RAN via the UE. Aspects of the UE status may include one or more of:
- A degree of user interaction with the device, for example whether a keyboard of the device has been recently touched, the status of a screen or screen backlight, whether a touchscreen has been recently touched, the status of other user input devices or devices responding to user input gestures
- The execution status of running applications, including whether or not the applications are open, running in the foreground or background, stored in a suspended or hibernated state in memory
- The protocol status of running applications, including whether or not acknowledgements or replies from a peer entity are pending and whether further data exchange is expected for example within a time period In yet further alternatives, the criteria for triggering may be linked to an application activity, application type, application label, or application identifier, The criteria for triggering may further be linked to an application status or characterisation, such as whether or not the application is running in a background mode of communication. A background mode of communication may comprise a state wherein the current Quality of Service (QoS) requirements may be relaxed from a normal QoS level for example due to an absence of recent user interaction with the device, or due to a latency tolerance of the application data.

The criteria for triggering may also be linked to a mobility condition of the UE, for example, to a speed of motion or to a recent, current or expected number of cell changes per unit of time. At higher speeds it may be desirable to trigger (or to more readily trigger) a transition to the RRC suspended state in order to avoid the need for network-controlled handover procedures and the signalling overheads associated therewith, Received or reported radio conditions such as signal to noise or signal to interference ratios, signal power or quality estimates, or the pathloss between a node within the RAN and the UE may also form part of the criteria used to initiate a suspension of an RRC connection.

The decision to initiate the suspension of the connection can be made either at a higher layer such as an application manager, operating system controller or manager function, the NAS (non-access stratum) level or at an AS (access stratum) level such as the RRC, MAC or physical layer level with inputs from user plane entities, or from device input/output functions, from radio receiver or signal processing functions or from applications.

The eNB is typically in control of connection suspension although the suspension may be initiated by either the UE or the eNB. In the UE initiated case, the eNB may take a decision to suspend a connection following a request for suspension received from the UE. However, the eNB could also decide not to suspend the RRC connection following a request for suspension from the UE or decided to release the RRC connection. This could occur, for example, because the eNB is aware of something that the UE is not aware of, such as downlink user plane data for the UE. In the eNB initiated case, the eNB may decide to suspend the UE's connection without receiving a suspension request from the UE.

RRC connection suspension can happen in one of two ways,
- a. Implicitly by associating a suspension with another event or trigger, this usually (but not necessarily) being commonly known to both the UE and the eNB. The suspension may occur at the same time as the other event, or may occur at a time linked to the other event, for example by means of a timer or timer expiry. The implicit suspension may occur in either the UE and/or the eNB or
- b. By using explicit signalling exchanged between the UE and the eNB (or vice versa)

In some embodiments, should a need for user plane communications arise for a UE with a suspended RRC context, the RRC connection may only be used (by the network or UE as appropriate) following a precursory check as to whether the suspended RRC connection or associated suspended RRC context is currently valid. A valid suspended RRC context is one which may potentially be freed from suspension (i.e. 'reactivated' or re-established) without the need to release the RRC connection and establish a new one. Thus, if the RRC context is deemed 'valid', the UE 101 or eNB 102a may initiate reactivation or re-establishment procedures instead of procedures that establish a new RRC connection (and which would not utilise the stored RRC context data). A valid RRC context that has been freed from suspension is again ready for use such that user plane communications between the UE 101 and eNB 102a may be resumed without the need for extensive RRC release, establishment or setup procedures. The set of cells on which the RRC context is deemed 'valid' is termed a validity area. Within the validity area, the UE or network may initiate or attempt reactivation or re-establishment procedures for a previously-suspended RRC connection.

The set of cells in which the UE deems the RRC context is valid may be the same as or different from the set of cells in which the network deems the RRC context to be valid. Thus the UE's validity area may be the same as or different from the networks validity area. If either the UE or the eNB attempts to reactivate or re-establish the suspended RRC context in a cell where the peer entity (eNB or UE) does not deem the RRC context to be valid, then the reactivation or re-establishment may not be successful and the a new RRC connection may be established.

An "RRC-reactivation" or "re-establishment" message or procedure is required to reactivate a previously-suspended RRC connection and to allow user plane data to be transferred (using part or all of the previously-stored RRC connection configuration). This procedure may be carried out either within the cell in which the RRC connection was previously suspended (the 'suspension cell'), or within a new cell. Similarly, the procedure may be carried out in communication with an eNB to which the UE was connected when the RRC connection was previously suspended (the 'suspension eNB'), or in communication with a new eNB.

In some cases, a suspended RRC connection may be reactivated (or re-established) without modification to the RRC context, its configuration or its parameters. In this case, the RRC connection may be reused in order to continue to handle the user plane communications. This scenario may be more likely if the reactivation or re-establishment procedure is carried out within the suspension cell, or within a cell controlled by the suspension eNB. This is particularly useful when handling bursty-type data traffic, and can conserve power and keep control plane traffic associated with RRC connection handling low. In other cases, one or more components of the stored RRC context may need to be updated during the reactivation or re-establishment procedure. This scenario may be more likely if the reactivation or re-establishment procedure is carried out within a cell other than the suspension cell, or within a cell that is not controlled by the suspension eNB.

In yet further cases, it may not be possible or allowed to reactivate or re-establish a suspended RRC context. The criteria that govern whether a suspended RRC context may be reactivated or re-established may be pre-established within a standard or may be provided via a configuration step to the UE, an eNB or to another network entity. A decision may also be taken not to reactivate or re-establish a suspended RRC context if it is determined that many components of the stored RRC connection would require updating. In this case, normal RRC connection establishment procedures may be followed as in the case of a normal idle mode UE (i.e. RRC connection setup following either a random access or paging procedure).

Figure 7:
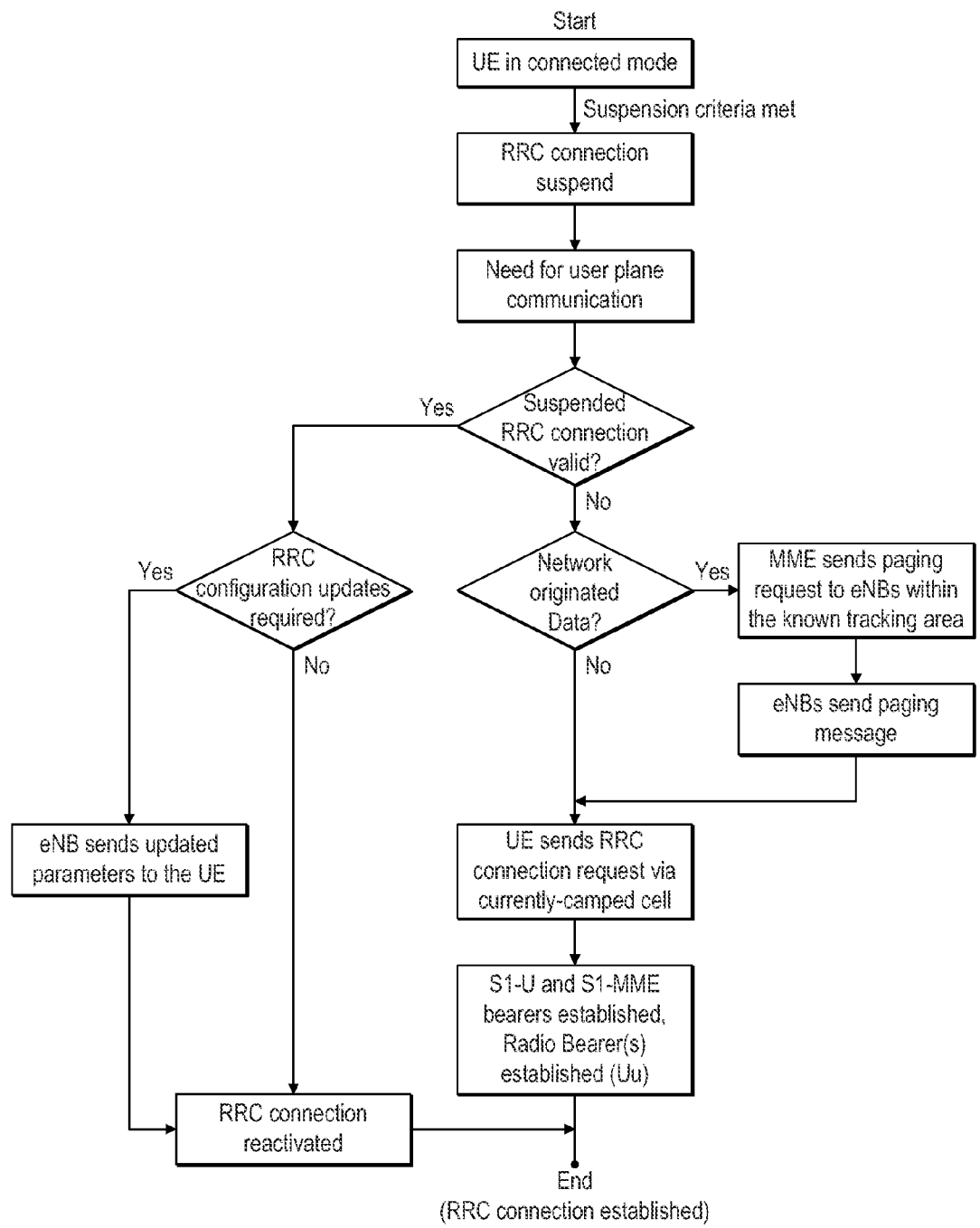
FIG. 7 is a flow diagram illustrating a simplification of the RRC connection reactivation process in a wireless communication system in which RRC connection suspension functionality is provided in accordance with the present disclosure.

A simplified view of this RRC reactivation process is shown in the flow chart of FIG. 7.

Figure 6:
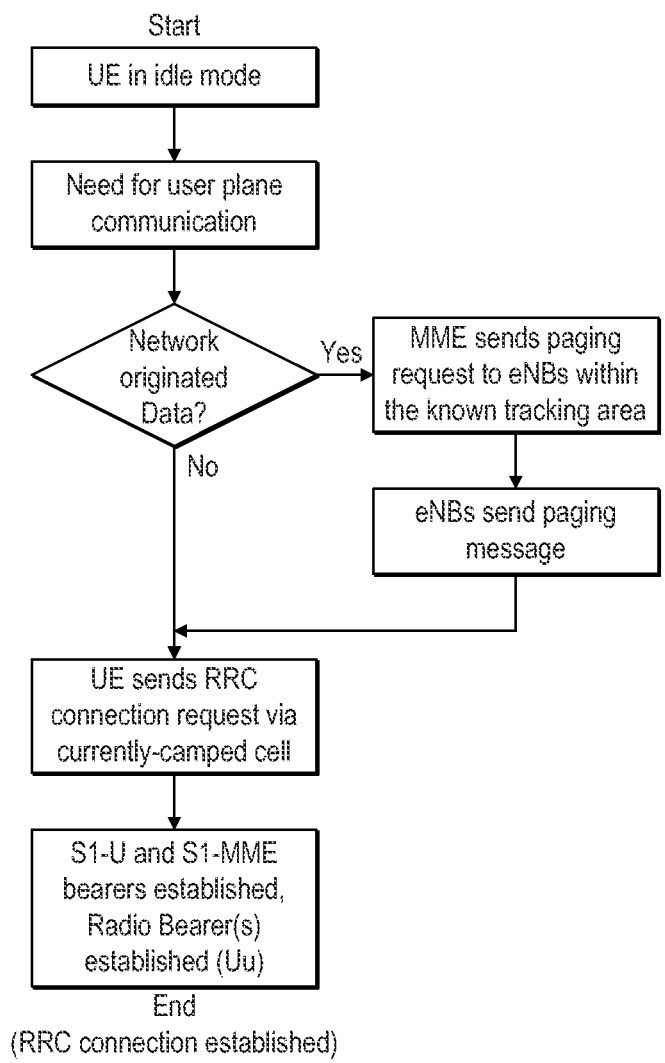
FIG. 6 is a flow diagram illustrating a simplification of the RRC connection process in a wireless communication system in which no RRC connection suspension functionality is provided.

This may be contrasted to the normal RRC connection setup procedures from idle mode shown in FIG. 6, where no RRC suspension functionality is provided in the wireless communication network. By comparing the flow chart of FIG. 7 with FIG. 6 it can be seen that, in accordance with the present disclosure, subsequent to the suspension of an RRC connection, when a need for user plane data communication arises and it is determined that a suspended RRC connection or associated suspended RRC context is 'valid', the RRC connection can be successfully reactivated by an RRC connection reactivation or re-establishment process before the user plane data may be transferred. Optionally, various RRC connection/context validity criteria may first be checked in the UE 101 or the eNB 102a or in both before the RRC connection reactivation or re-establishment process is triggered. Also due to the fact that a valid S1 interface must also exist prior to communication of user plane data, nodes of the CN 103 (such as the MME 103b) may also be involved in checking the validity status of the suspended RRC connection when reactivation is required. Examples of validity criteria that may be employed as inputs to the decision process are listed below:

Whether the UE 101 is currently camped on the same cell as the cell to which it was connected when the RRC context was suspended. Typically, an RRC configuration applies on a per cell basis and it may be the network policy that the context only remains valid if the cell hasn't changed. Note that this does not exclude the possibility for the UE 101 to have moved out of the cell in which the RRC context was suspended, and back in again to the same cell. In these cases the RRC context may still be reactivated and is considered a valid suspended RRC context.

Whether the UE 101 is currently camped on the same group of cells as the group of cells to which it was connected when the RRC context was suspended. An eNB 102a, b, . . . , n would typically support multiple cells, allowing for significant co-ordination between those cells at the radio resource management and RRC level without the need for standardised interfaces. Thus a UE's RRC context information may be visible to a group of cells (such as in the same eNB 102a,b . . . n) and an operator or network vendor may choose to coordinate some aspects of the RRC configuration between them. This could enable an RRC connection that was suspended within one cell under an eNB 102a to be reactivated or re-established under another cell of the same eNB 102a. In scenarios such as this, knowledge of whether a UE 101 is still attached to the same eNB 102a,b . . . n (or other defined group of cells) may be useful when checking whether such a reactivation is possible or allowable. The group of cells may alternatively comprise a tracking area. In a further alternative, each of the group of cells in which the RRC context is deemed valid may not be controlled by the same eNB 102a,b . . . n. In this case, there may be a need for the RRC context information to be transferred from an 'old eNB' (the eNB responsible for the previous suspension) to a 'new eNB' (the eNB controlling the cell in which the UE is located at the time of the attempted reactivation or re-establishment). This transfer of RRC context information would be needed in order to complete the reactivation or re-establishment process with the new eNB.

Whether an elapsed period of time since the RRC connection was suspended is lower than a predetermined timer expiry threshold. The system may wish to restrict the length of time for which an RRC connection may be retained in the suspended state. Suspended connections with an age beyond a preconfigured value are no longer considered valid.

As described above, in accordance with the present disclosure a UE 101 in a temporarily-inactive connected mode (i.e. having a 'suspended' RRC connection) performs UE-controlled mobility (UE autonomous cell selection/reselection) and DRX procedures as if it were in idle mode, and during this time the RRC connection for this UE may be considered to be "suspended" (as opposed to released). However, the condition or state of the UE during this time may of course be viewed in different ways, for example:

1. The UE 101 may be viewed as being in idle mode (as it performs UE-controlled mobility and idle mode DRX procedures) but with some or all of the configuration associated with its most recent RRC connection remaining stored to allow quick and efficient reactivation or re-establishment of the old RRC connection under certain circumstances.
2. The UE 101 may be viewed as remaining in the RRC connected mode but being configured to perform UE-controlled mobility and DRX procedures similar to idle mode. All or most of the RRC connection information remains stored in the UE 101 while some parts of the RRC configuration may be released.
3. The UE 101 may be viewed as remaining in the RRC connected mode but being placed in a new state or sub state or mode in which it performs UE-controlled mobility and DRX procedures similar to idle mode. All or most of the RRC connection information remains stored in the UE 101 while some parts of the RRC configuration may be released.

Indeed, it is not intended that the present disclosure is limited to the UE being considered in the connected mode but with the RRC connection 'suspended'. Rather the present disclosure sets out a methodology of handling RRC connections between a UE and a RAN, and the UE-related connections between the RAN and the CN such that transfer of user plane data between the UE and RAN is disabled and the data representing the RRC connection is stored such that user plane data transfer can later be resumed (on the same cell/eNB or on a different cell/eNB) using the same 'established' RRC connection without that RRC connection being 'released' (i.e. abandoned) and without a new RRC connection needing to be created. This methodology can be utilised not just in wireless communication systems supporting LTE, but also in other wireless communications protocols.

The methods associated with implementing and supporting the RRC Connection suspension and reactivation procedures of the present disclosure will now be described in more detail, including some alternatives and variants that are possible. The procedures associated with RRC Connection suspension and reactivation can be divided into four aspects which are described in the following sections:

RRC Connection Process

Processes handling mobility (i.e. procedures as the UE moves) during RRC Connection Suspension Processes handling receipt of downlink (DL) data during RRC connection suspension Processes handling a suspended RRC Connection to resume Uu data transfer The methods and other modes of operation described herein of the UE 101, eNB 102*a,b* . . . *n*, SGW 103*a*, MME 103*b* and other CN nodes within the scope of the present disclosure may be provided at least in part by one or more processors within the UE 101, eNB 102*a,b* . . . *n*, SGW 103*a*, MME 103*b* and other CN nodes executing machine readable instructions to configure them to function accordingly to carry out said methods. The instructions may be provided as computer software products. Each computer software product may be provided in, on or supported by a computer readable medium which could be provided as all possible permanent and non-permanent forms of computer readable medium either transitory in nature, such as in a data transmission signal for example sent over the internet, or non-transitory in nature such as in a RAM or other, non-volatile storage. On the other hand the computer readable medium may be a non-transitory computer readable medium comprising all computer-readable media, with the sole exception being a transitory, propagating signal.

RRC Connection Suspension Process

In the UE 101, when the RRC Connection suspension occurs the UE 101 may be configured to perform idle mode mobility and paging reception procedures while keeping stored for possible re-use some or all of its RRC context information. The stored RRC context information may include the following:

The configuration of Established Data Radio Bearers (DRBs) and Signalling Radio Bearers (SRBs) including, for each radio bearer, the PDCP configuration and current state (e.g. counter values, etc) and the RLC configuration and status (e.g. counter values, etc).

Security configuration and state (e.g. cipher and integrity algorithm, counter values, etc)

Measurement reporting configuration.

Last used cell identity and cell specific user identity (C-RNTI—"Cell Radio Network Temporary Identifier")

In addition, the stored RRC context may also include other information such as (but not limited to) configuration information or parameters relating to any allocation of radio resources, MAC configuration, physical channel configuration or physical layer configuration data.

In the network, when the RRC Connection Suspension occurs, one or more eNB's such as eNB's 102*a* and 102*b* and/or an MME 103*b* store for possible re-use some or all of the UE's RRC context information. The RRC context information stored in the network should correspond to that stored in the UE 101. In addition, there are two main alternatives to the network side suspension procedure depending on whether the eNB informs the CN about the suspension at the time it occurs:

RRC Connection Suspension Alternative A—CN not Informed of Suspension

If the CN 103 is not informed of the suspension (by either the UE 101 or the eNB 102*a*), the S1 user plane between the S-GW 103*a* and the eNB 102*a* will remain active and any inbound network-originated data will be forwarded by the S-GW 103*a* over the S1 to the corresponding eNB 102*a* where it would need to be buffered pending delivery to the UE 101. It is then the responsibility of the eNB 102*a* to contact and deliver the data to the suspended UE 101. If the suspended UE RRC context is found to be invalid at this time (e.g. because the UE has moved or reselected to another cell without informing the network), the eNB 102*a* would need to initiate additional procedures (involving other eNBs such as eNB 102*b* and/or the CN 103) to locate the UE 101 and to route the data to the correct eNB 102*b* . . . *n* and onward to the UE 101 (procedures for contacting the UE 101 in this situation are discussed below). Alternatively, rather than routing data on towards the correct eNB 102*b* . . . *n* once the UE 101 is located, the data may be discarded and higher layer protocols (for example, TCP/IP) may instead be relied upon to ensure eventual delivery.

RRC Connection Suspension Alternative B—CN Informed of Suspension

If the CN 103 is informed of the suspension (e.g. by either the UE 101 or the eNB 102*a*), it may optionally take action to also suspend the S1 user plane between the S-GW 103*a* and the eNB 102*a*. The S1 user plane suspension may only affect the way that the S-GW 103*a* treats DL user data arriving in the S-GW 103*a*. Hence, in this case it may be considered as just a DL S1 user plane suspension such that any inbound network-originated data is buffered at the S-GW 103*a* pending delivery to the UE 101. It is then the responsibility of the CN 103 (i.e. MME 103*b* and/or S-GW 103*a*) to identify the location of the UE and to subsequently contact and deliver the data to the suspended UE 101. It is also possible that the CN 103 does not suspend the S1 user plane for a UE 101 upon having been informed of a suspension of the UE's RRC Connection.

The CN 103 would typically be notified of a suspension through receipt of a notification message from the eNB 102*a*. It is also possible that the UE 101 could inform the CN 103 of a connection suspension (e.g. following its receipt of a suspend message from the eNB 102*a*), although this may be less preferable due to the fact that this would involve additional signalling over the air interface.

A CN node (e.g. MME 103*b* and/or S-GW 103*a*) may maintain a validity indicator for each UE (effectively this may relate either to whether an active S1 user plane exists for the UE, or to the current validity status of a suspended S1 user plane for the UE). This indicator may be set based upon one or more separate sub-criteria such as location-based criteria or timer-based criteria. The location-based validity criteria may involve for example recording a cell or eNB 102*a, b* . . . *n* from which the RRC suspend notification was initially received and setting the location validity indicator to TRUE if the currently-known location of the UE 101 matches the validity criteria, and setting the location validity indicator to FALSE otherwise. The timer-based validity criteria may involve setting a timer-based validity indicator to TRUE if an elapsed time since the RRC connection suspension (or S1 connection suspension) is lower than a threshold value and to FALSE otherwise. By means of example, the overall validity criteria may comprise setting an overall validity indicator to TRUE if both the location validity indicator and the timer-based validity indicator are TRUE, and setting the overall validity indicator to FALSE otherwise.

Figure 8:
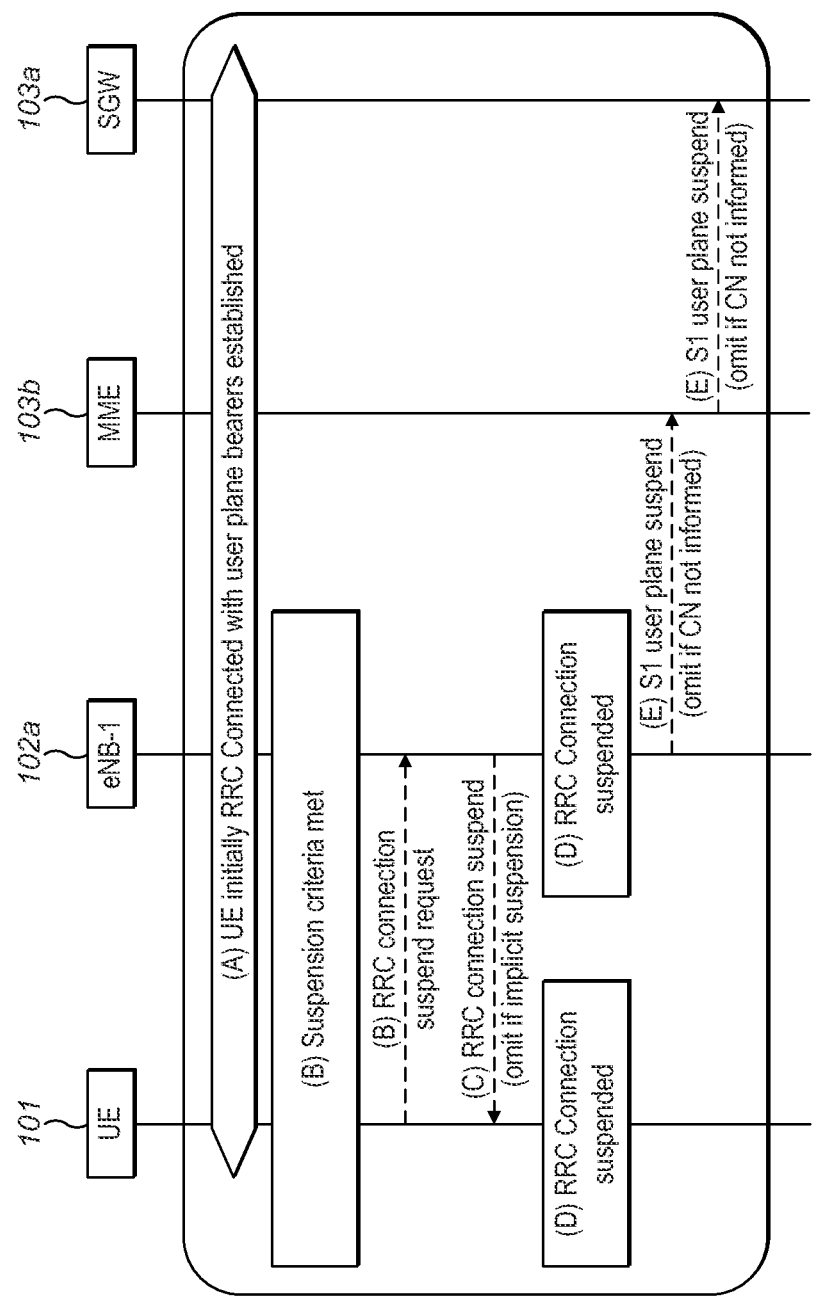
FIG. 8 is a message sequence chart illustrating an exemplary RRC connection suspension process in a wireless communication system in accordance with the present disclosure.

An example message sequence chart of events related to an RRC Connection suspension is shown in FIG. 8. Steps E-G of the process described below (but not all shown in FIG. 8) are only carried out if the CN 103 is informed of the suspension (otherwise these steps are omitted). The steps of the RRC connection suspension process shown in FIG. 8 can be described as follows:

A. A UE 101 is in connected mode.

B. Criteria triggering a suspension of the UE's RRC Connection are determined to have been met. The determination may be made either by the UE 101 or by the eNB 102a, or by both the UE and the eNB. If the determination is made by the UE 101, the UE may send an RRC connection suspend request message to eNB 102a.

C. The UE's RRC Connection is suspended. This may be achieved via implicit mechanisms such as the expiry of an inactivity timer in both the eNB 102a and the UE 101, or via explicit mechanisms such as the sending of a message or command from the eNB 102a to the UE 101 to instruct the suspension of the RRC Connection. In the implicit case, the eNB 102a and UE 101 enter the suspend state at approximately the same time but no suspend message need be sent.

D. The UE 101 and eNB 102a suspend the RRC connection. The Uu connection is effectively 'deactivated' such that no user plane data is transferred between the eNB 102a and UE 101 but RRC connection information is stored by both the UE 101 and the eNB 102a. In some cases (not shown), the RRC connection information may also be forwarded by eNB 102a to another eNB within RAN 102, or to a node within the core network 103, such as MME 103b. The UE 101, however, continues to monitor for paging or notification of downlink data (see below).

E. The eNB 102a may optionally send an S1 user-plane suspend message to the MME 103b and/or SGW 103a (possibly via the MME) to inform the CN 103 of the RRC suspension. The message may include fields to identify the one or more UEs and possibly bearer identifiers that have been suspended.

F. The MME 103b may deactivate (but store in memory) the existing S1-MME (S1c) bearer context associated with the UE 101. 'Deactivating' is understood here to mean that data ceases to be transferred over the bearer.

G. The SGW 103a deactivates (but stores in memory) existing S1-u user plane bearer contexts associated with the UE. Again, 'deactivating' is understood here to mean that data ceases to be transferred over the bearer.

Specific actions taken by the CN 103 in response to receipt of an S1 suspend may therefore include:

Deactivating (but storing, pending reactivation) one or more S1 user plane and/or S1-MME bearer contexts in the SGW 103a and MME 103b respectively, or in eNB 102a Buffering of any network-originated user data at the SGW 103a pending resumption of the S1 user plane Monitoring for inbound tracking area or other location/cell updates at the MME 103b from the UE who's RRC connection has been suspended (in order to assist with determining validity status in the event of a need for reactivation)

In order for the RRC Connection suspend process above to be used, both the UE 101 and the network of the wireless communication system need to be configured to support this functionality. An RRC Connection suspension support indicator may be included in a UE capabilities message that is transferred from the UE 101 to the network. Alternatively, support for RRC connection suspension in the UE may be implicitly inferred by the eNB as the result of the UE indicating support for another (but associated) feature or UE capability within the UE capability message. As a further alternative the support for RRC connection suspension in the UE may be implicitly inferred by the eNB as the result of the reception of an RRC Connection Suspend Request message. If the eNB determines that the UE supports the RRC Connection suspend functionality then the eNB 102a can choose to configure the UE 101 with appropriate parameters to trigger implicit suspension (e.g. via configuration of a suspension timer value) or the eNB 102a can choose to send the explicit RRC Connection suspend message. eNB 102a may also choose to configure the UE 101 such that RRC suspension procedures or components of the RRC suspension behaviours are either allowed or disallowed.

Processes Handling Mobility During RRC Connection Suspension

On suspension of a UE's RRC connection, the UE 101 performs cell selection and reselection in a similar manner to that of a normal idle mode UE 101 (i.e. the UE 101 follows the general mobility procedures of 3GPP TS 36.304). However, if location-based validity criteria are used, then the UE 101 can be aware when the UE 101 selects/reselects a cell in which its suspended RRC Connection is not valid (e.g. a cell where the suspended RRC context may not be reactivated or re-established).

Figure 9:
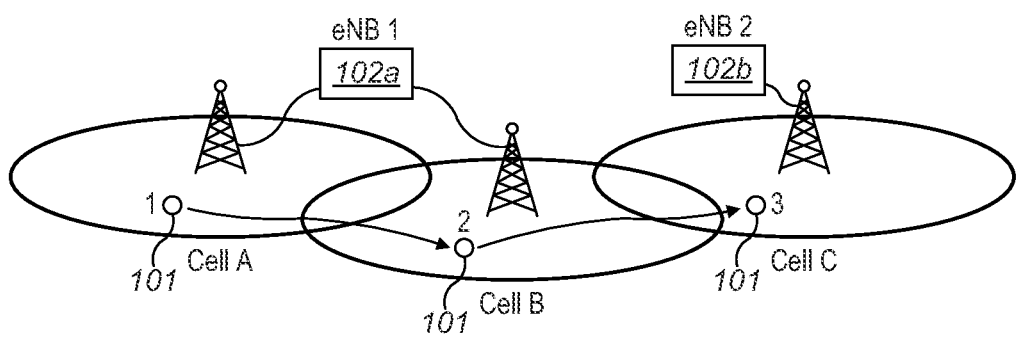
FIG. 9 is an illustration of an exemplary mobility scenario for handling by the mobility handling process signalling variants during RRC connection suspension in accordance with the present disclosure.

An example is shown in FIG. 9 where the UE 101 is initially on Cell A under eNB1 102a (point 1). The RRC Connection is suspended. The UE 101 reselects from Cell A, under eNB1 102a, to Cell B, also under eNB1 102a (point 2). It is possible that cells A and B lie within the validity area, and cell C lies outside the validity area. As the UE moves from cell A to cell B, from the location based validity criteria, the UE 101 knows that its suspended RRC Connection is still valid and hence need take no action. The UE 101 then reselects from Cell B to Cell C which is under a different eNB, i.e. eNB2 102b (point 3). From the location based validity criteria, the UE 101 knows that its suspended RRC Connection is no longer valid at point 3. At this point (crossing a validity area boundary), there are two main alternative mobility handling processes for how the UE 101 acts during RRC connection suspension. The UE 101 may be configured to only perform one of the following methods, or selectively perform either method.

Mobility Alternative A—do not Inform the Network that the UE is Outside of the Area where its Suspended RRC Connection is Valid Although at point 3 the UE 101 is aware that it is outside the area where it knows its suspended RRC Connection is valid, the UE 101 does not initiate any signalling towards the network. Instead, the UE 101 continues to perform UE-based mobility and paging reception procedures and continues to keep its stored RRC Context Information. In mobility alternative A, as long as the UE 101 remains within a registered tracking area (TA) of cells then cell reselections do not trigger any signalling towards the network (i.e. the network is not made aware of the reselections). However, the UE 101 would still need to perform a Tracking Area Update (TAU) if it moved outside of its registered TA(s), just as it would have to do if it were in idle mode. A TA would typically cover many cells and many eNBs 102*a,b,* . . . *n*. The RRC Context Information remains stored in the UE 101 and one or more RAN or CN nodes such as eNB 102, eNB 102*b*, or MME 103*b*, so that parts or all of it can potentially be used if, at the time that data activity is resumed, the UE 101 has returned to a cell where the suspended RRC Connection is valid. Depending on the validity area, the cell or eNB on which the suspended RRC connection is reactivated may be the same or different to the cell or eNB on which the RRC connection was last suspended.

Mobility Alternative B—Inform the Network that the UE is Outside the Area Where its Suspended RRC Connection is Valid When, at point 3, the UE 101 is aware that it is outside the area where it knows its suspended RRC Connection is valid, the UE 101 in this alternative initiates some signalling to inform the network. Under mobility alternative B, the signalling procedures adopted by the UE 101 can, for example, be one of the following three variants:

Signalling Variant 1—Discard suspended RRC connection, perform NAS procedure and return to idle.

On the new cell under eNB2 102*b*, in this variant the UE 101 discards its suspended RRC connection and performs signalling by initiating a Non Access Stratum (NAS) procedure (e.g. an LTE 'TAU' procedure). This may be an unmodified TAU procedure or may be a TAU procedure modified to include a cause value indicating the reason for sending the TAU (i.e. the UE has identified that the suspended RRC connection is no longer valid). This TAU procedure causes the MME 103*b* to release the S1 connection to eNB1 102*a* and the eNB1 102*a* to release the suspended RRC Connection. At completion of the TAU procedure the UE 101 is placed into idle mode and hence has no RRC Connection with any eNB 102*a,b* . . . *n*.

Signalling Variant 2—Discard suspended RRC connection, perform NAS procedure and remain RRC connected.

On the new cell under eNB2 102*b*, in this variant the UE 101 discards its suspended RRC connection and performs signalling by initiating a NAS procedure (e.g. TAU or Service Request). This may be an unmodified TAU or Service Request or may be a modified TAU or service request modified to include a cause value indicating the reason for initiating the procedure (i.e. the UE has identified that the suspended RRC connection is no longer valid). This TAU/Service Request causes the MME 103*b* to release the S1 connection to eNB1 102*a* and causes eNB1 102*a* to release the suspended RRC Connection. The MME 103*b* initiates new access stratum security and establishment of data radio bearers (DRBs) and establishment of an S1 user plane connection to eNB2 102*b*. At completion of the TAU/Service Request, the UE 101 remains in RRC Connected with eNB2 102*b*. The eNB2 102*b* may choose to suspend the RRC Connection as described above, such that the new RRC connection between the UE 101 and eNB2 102*b* is suspended. If so, the state of the UE 101 at point 3 in FIG. 9 would then be the same as it was at point 1 but with an RRC Connection with eNB2 102*b* instead of eNB1 102*a*.

Signalling Variant 3—Maintain suspended RRC connection, perform signalling to inform CN of mobility On the new cell under eNB2 102*b*, in this variant the UE 101 maintains its suspended RRC context and performs signalling by initiating a procedure in order to inform the CN 103 that the UE 101 has a currently-invalid suspended RRC Connection. This procedure could be a NAS procedure—for example, it could be an unmodified TAU or a TAU containing a new indication that the UE 101 has an invalid suspended RRC Connection, or it could be a new NAS message such as "NAS Mobility Update" message. Alternatively, this could be an access stratum (AS) procedure that in turn triggers the eNB2 102*b* to inform the CN 103 that the UE 101 has a suspended-but-currently-invalid RRC connection—for example it could be an new "RRC Mobility Update" message sent from UE to eNB2 102*b*, or it could be an existing RRC message containing a new "Mobility Update Indicator", then followed by an "S1 Mobility Update" message from eNB2102*b* to MME 103*b*. Whatever form the signalling takes the purpose of the procedure is that it will cause the S-GW 103*a* to suspend the S1 user plane. At completion of the procedure the UE 101 remains with its suspended RRC connection but is camped on eNB1 102*a*. Note that in order to perform the TAU procedure the UE may or may not have had to create an RRC Connection with eNB2 102*b* and an S1 connection with the MME 103*b*. If such connections do need to be created, this may be considered as a temporary RRC Connection that gets discarded at the completion of the TAU or other update message. If the MME 103*b* were to establish access stratum security and establish DRBs then this temporary RRC Connection would become the 'permanent' RRC Connection and the suspended RRC Connection would be discarded.

Mobility within the Validity Area

Mobility alternatives A and B describe example procedures associated with UE mobility events that cross the validity area boundary (i.e. as the UE transitions in or out of the validity area). Other procedures are possible. There are also a set of possible mobility alternatives associated with the UE's mobility between cells within a validity area. These 'intra-area mobility procedures' may optionally be employed in addition to the procedures concerned with mobility across validity area boundaries.

Figure 23:
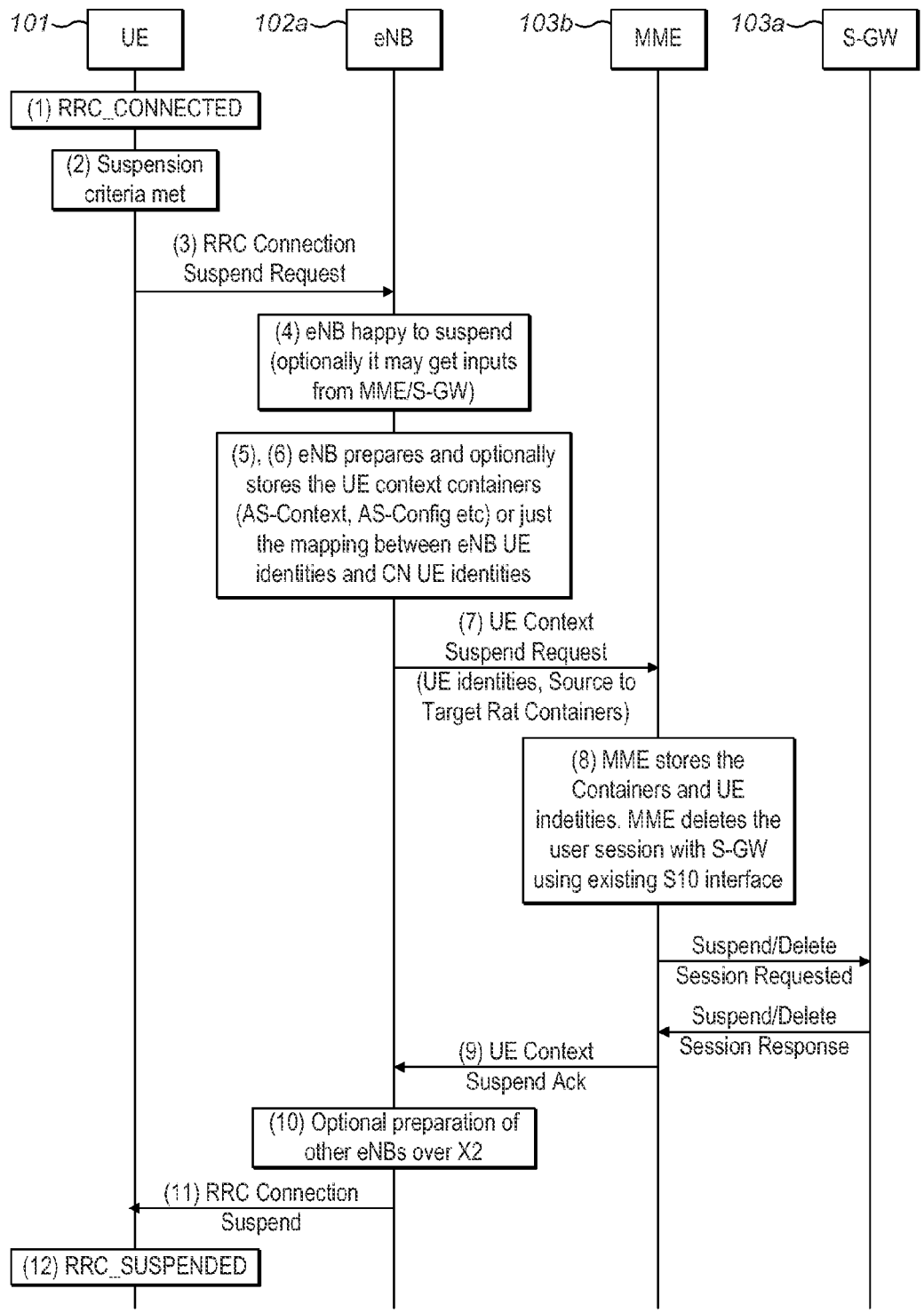
FIG. 23 shows a message sequence chart illustrating the method of handling an RRC connection suspension in Example Scenario 4.
Figure 28:
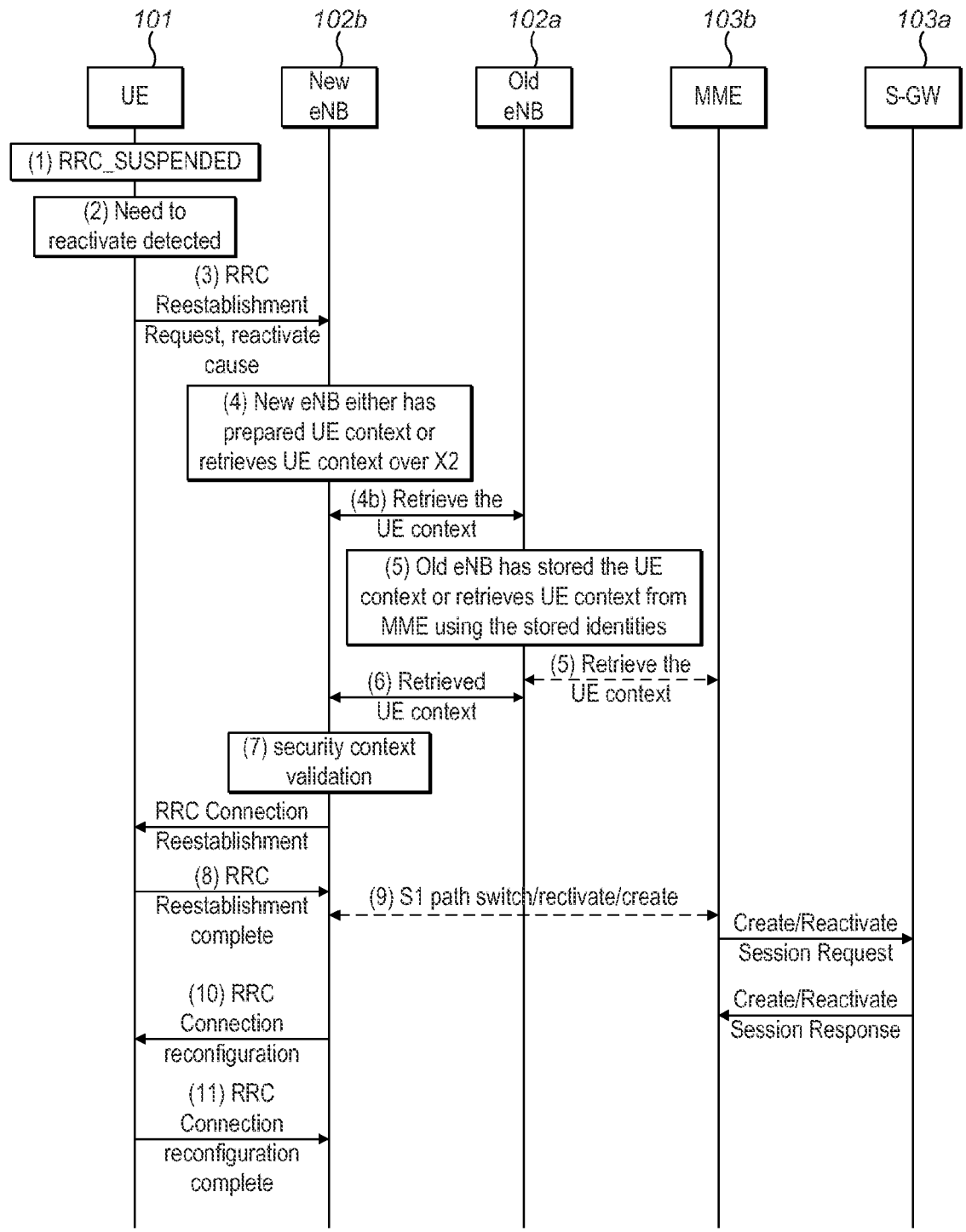
FIG. 28 shows a message sequence chart illustrating the method of handling an RRC connection suspension in Example Scenario 10.

In a first intra-area alternative, the UE performs signalling to inform the RAN and/or CN of the UE's mobility within the validity area. This can be used to allow a previously-suspended RRC connection to be migrated between an old and a new cell in accordance with the UE's mobility from the old cell to the new cell. The old and new cells may be controlled by the same eNB and MME, or they may be controlled by different respective old and new eNBs, or different respective old and new MMEs. With further reference to FIG. 9, it is possible that cells A, B and C all lie within the validity area. In this case, and when operating according to the first intra-area mobility alternative, when the UE reselects to Cell C (under eNB2 102*b*) the UE 101 communicates with eNB2 102*b*, informing it of the UE's presence within the cell. This may take the form of an RRC re-establishment procedure or may comprise a new mobility update procedure, or a modified version of an existing mobility procedure, for example procedures based on or comprising handover-related signalling. Although eNB2102*b* lies within the validity area, it may or may not yet be in possession of RRC context data related to the suspended RRC context for UE 101. This will depend on whether eNB1 102*a* has forwarded the RRC context data to eNB2 102*b* prior to the UE's reselection to Cell C. This forwarding of the RRC context data from eNB1 102*a* to eNB2 102*b* may be achieved through the use of handover preparation signalling such as Handover Request (from eNB1 to eNB2) and Handover Request Acknowledge (from eNB2 to eNB1) messages (and this is shown in FIG. 23 step (10) and FIG. 26 step (8) as the optional preparation of other eNBs over X2). If eNB2 102*b* is not in possession of the RRC context data for UE 101, it may attempt to retrieve the RRC context data from another node within the RAN 102 (such as eNB1 102*a*) or from a node within CN 103 (such as MME 103*b*). Signalling procedures between eNB2 102*b* and the other node(s) such as eNB1 102*a* or MME 103*b* are used to retrieve the RRC context data for UE 101 via network interfaces between those RAN and CN nodes. The retrieval of the RRC context from eNB1 102*a* by eNB2 102*b* may be achieved through the use of context retrieval signalling such as the RLF Indication message (from eNB1 to eNB2), the Handover Request message (from eNB1 to eNB2) and Handover Request Acknowledge message (from eNB2 to eNB1). An example of context retrieval signalling between eNBs is shown in FIG. 28 steps (4b) and (6) and an example of context retrieval signalling between an eNB and an MME is shown in FIG. 28 step (5). as eNB2102*b* may also communicate with CN nodes such as MME 103*b* and/or S-GW 103*a* in order to switch the path of an active or suspended S1 connection associated with UE 101 such that it now terminates at eNB2 102*b* instead of at eNB 102*a*. If eNB2 102*b* wishes to accept the connection with the UE, eNB 102*b* communicates with UE 101 either to command or confirm reactivation or re-establishment of the RRC connection within Cell C (in this case the RRC connection resumes from suspension), or to simply confirm or acknowledge the mobility event to UE 101 (in which case the RRC connection may thereafter return to a suspended state following the successful transfer of the UE context to Cell C under eNB2102*b*).

In the first intra-area mobility alternative, the RAN is informed each time the UE reselects another cell within the validity area. This carries the advantage that the network may switch the S1 connection (from the core network to the RAN) to the correct RAN node (eNB) in order to track the UE's mobility. Thus, inbound downlink data destined for the UE may always be routed (via S1) to the correct eNB and delivered to the UE, thereby avoiding the need to first page the UE across a wider area to determine its current cell or location. In a second intra-area mobility alternative the UE may not inform the RAN or CN at the time of a cell reselection within the validity area. Instead, the UE may wait until there is a need for user plane data before communicating with the eNB controlling the cell on which the UE is currently camped. In such cases, the UE may attempt to reactivate or re-establish a suspended RRC connection on the currently-camped cell if it lies within the validity area. If the eNB in control of the currently-camped cell is not in possession of the stored RRC context data for UE 101, it would again need to invoke procedures for RRC context retrieval from another node, in a similar manner to those described for the first intra-area mobility alternative. Whilst this second intra-area mobility alternative carries some advantage in that mobility signalling (to move the suspended RRC connection to a new cell) may be avoided at each cell reselection event, it also carries the disadvantage that in the event of inbound downlink data destined for the UE, the network may not have up-to-date information regarding the current cell or location of the UE. Thus, the UE may need to be paged in other cells before the data can be delivered.

Figure 10:
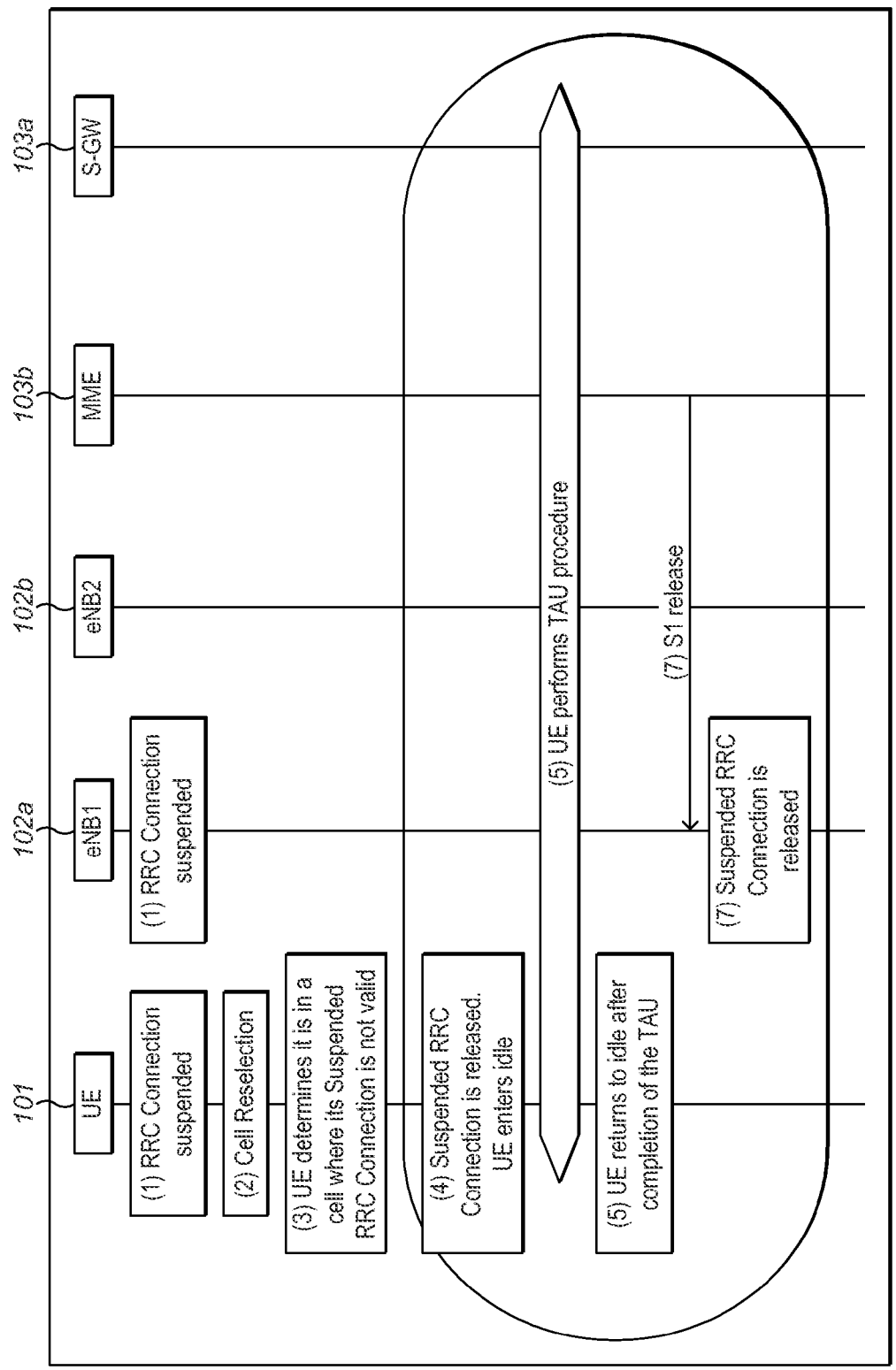
FIG. 10 is a message sequence chart illustrating an example of signalling variant 1 in mobility processing alternative B in a wireless communication system in which a UE has a suspended RRC connection.
Figure 11:
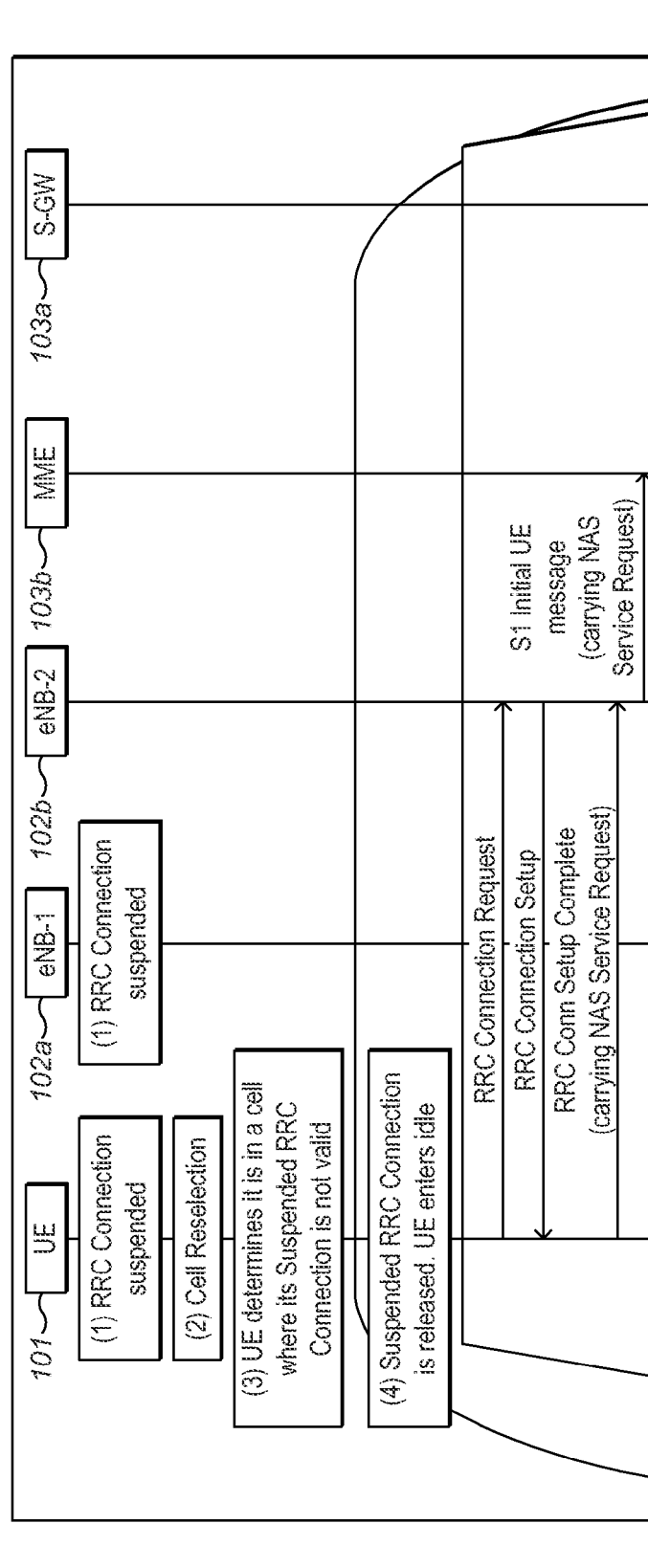
FIG. 11 is a message sequence chart illustrating an example of signalling variant 2 in mobility processing alternative B in a wireless communication system in which a UE has a suspended RRC connection.
Figure 11:
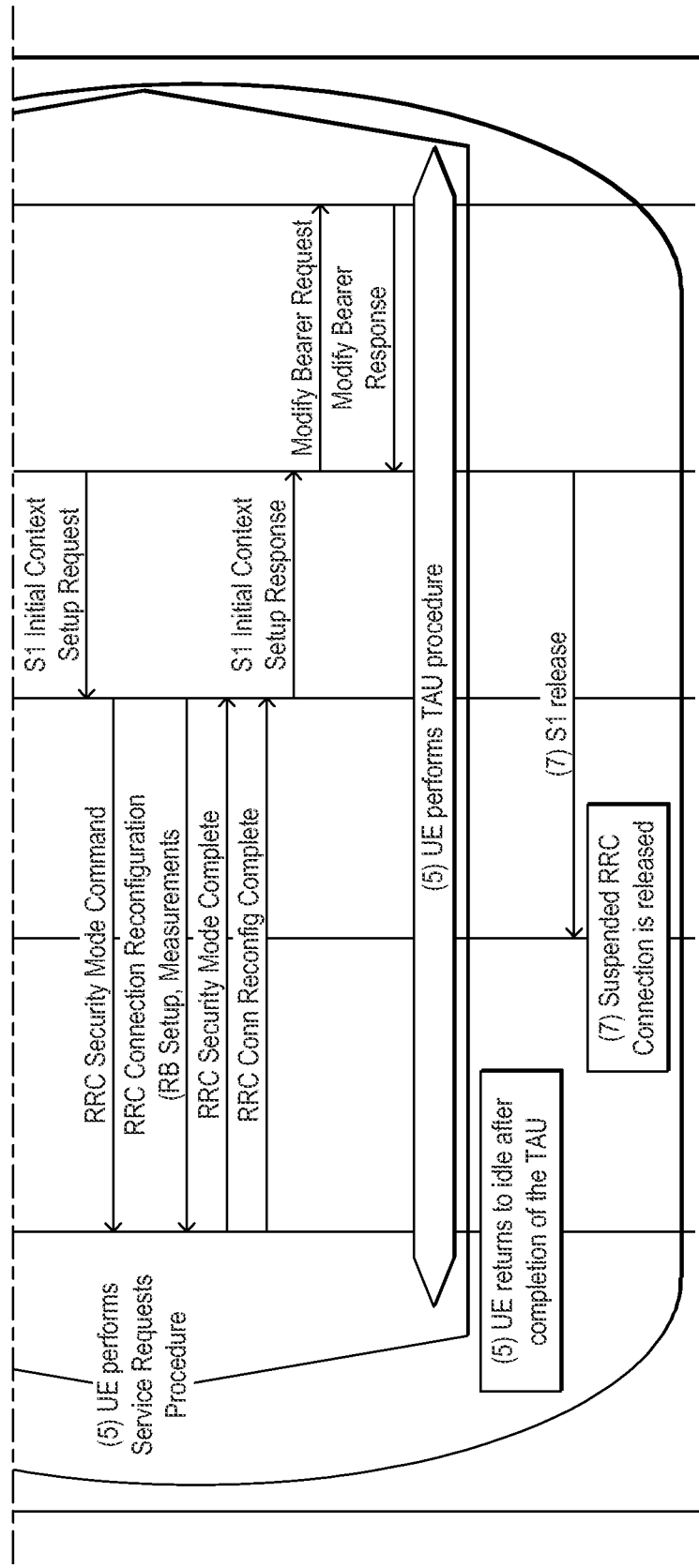
Figure 12:
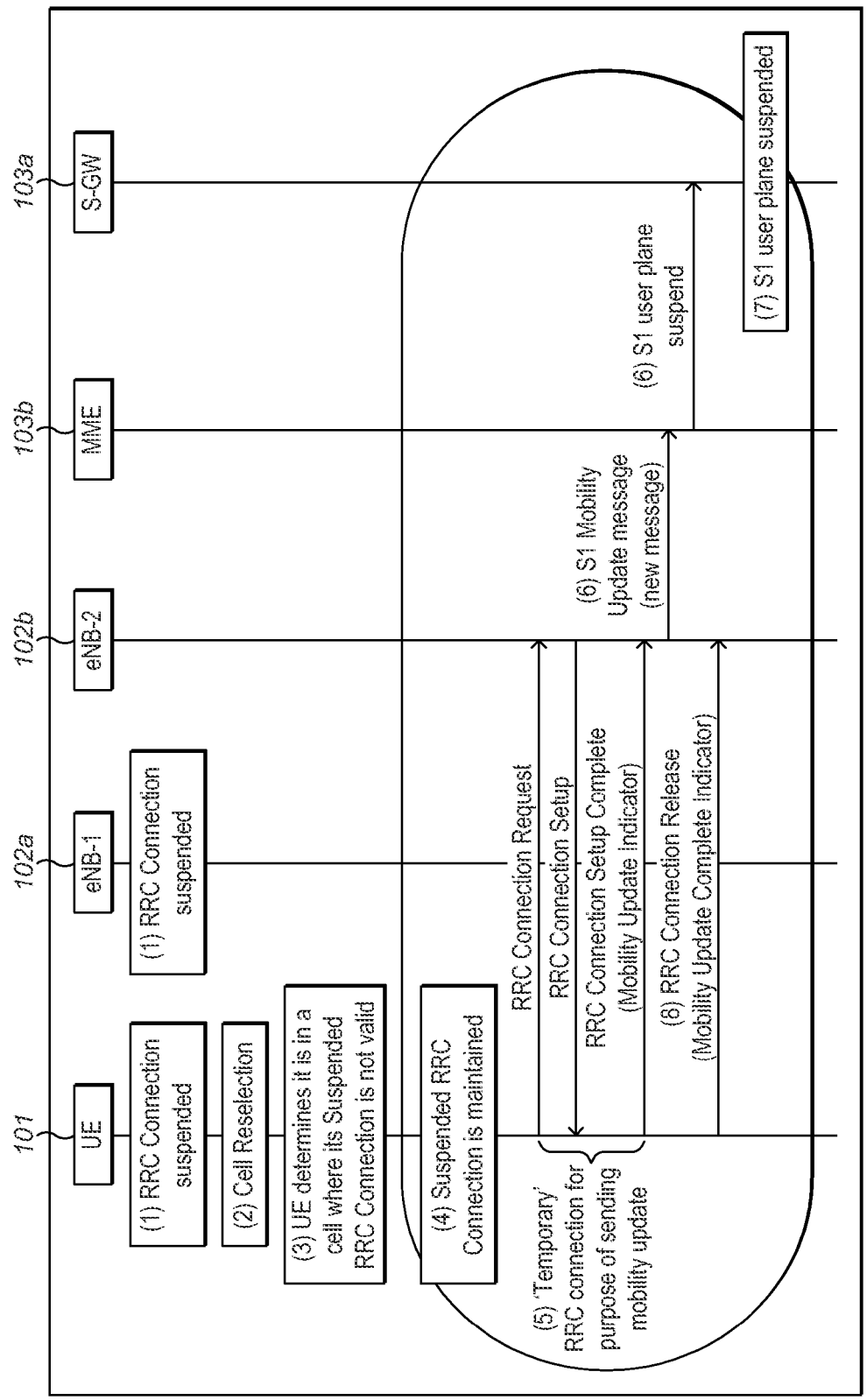
FIG. 12 is a message sequence chart illustrating an example of signalling variant 3 in mobility processing alternative B in a wireless communication system in which a UE has a suspended RRC connection.

Example message sequence charts for the three signalling variants (1, 2, 3) for mobility across a validity area boundary are shown in FIG. 10, FIG. 11, and FIG. 12 respectively. The initial steps of these charts are the same with the differences between the three variants occurring within the areas identified by rectangles having rounded ends.

Signalling variant 1, shown in FIG. 10, can be described as follows.

1. The UE 101 initially has a suspended RRC Connection with eNB1 102*a*.
2. UE 101 performs cell reselection to a cell under the control of eNB2 102*b*
3. Following cell reselection the UE 101 determines that it is now in a cell where its suspended RRC Connection may not be valid.
4. The UE 101 releases its suspended RRC Connection for eNB1 102*a*. UE 101 enters idle mode.
5. The UE 101 initiates a TAU. To perform the TAU the UE 101 first establishes an RRC Connection with eNB2 102*b* and then sends the Tracking Area Update Request. The MME 103*b* responds with a Tracking Area Update Accept.
6. Following the completion of the TAU procedure, the UE 101 returns back to idle mode.
7. The MME 103*b* also sends an S1 release command to eNB1 102*a* to inform it that it can release its suspended RRC Connection for the UE 101 and/or release any active or suspended S1 connections for the UE 101.

Signalling variant 2, shown in FIG. 11, can be described as follows.

1. The UE 101 initially has a suspended RRC Connection with eNB1 102*a*.
2. UE 101 performs cell reselection to a cell under the control of eNB2 102*b*.
3. Following the cell reselection, the UE 101 determines that it is now in a cell where its suspended RRC Connection may not be valid.
4. The UE 101 releases its suspended RRC Connection for eNB1 102*a*. UE 101 enters idle mode.
5. The UE 101 initiates a TAU or Service Request procedure. To perform the TAU or Service Request procedure the UE 101 first establishes an RRC Connection with eNB2 102*b* and then sends the Tracking Area Update Request or Service Request. The MME 103*b* responds by triggering the establishment of access stratum security and the establishment of the DRBs and the S1 user plane with eNB2 102*b*. The figure shows the Service Request procedure although the TAU procedure would be quite similar. Note the figure does not label the individual messages that make up the overall procedure.
6. Following the completion of the TAU or Service Request procedure, the UE remains in RRC Connected with eNB2 102*b*.
7. The MME 103*b* also sends an S1 release command to eNB1 102*a* to inform it that it can release its suspended RRC Connection for the UE 101 and/or release any active or suspended S1 connections for the UE 101.

Signalling variant 3, shown in FIG. 12, can be described as follows.

1. The UE 101 initially has a suspended RRC Connection with eNB1 102*a*.
2. UE 101 performs cell reselection to a cell under the control of eNB2 102*b*.
3. Following the cell reselection, the UE 101 determines that it is now in a cell where its suspended RRC Connection may not be valid.

4. The UE 101 maintains its suspended RRC Connection for eNB1 102*a*.
5. The UE 101 initiates signalling to inform the CN 103 that the UE 101 has a suspended RRC Connection but has moved outside the area where its suspended RRC Connection is known to be valid. The example in FIG. 12 shows the UE 101 establishing a 'temporary' RRC Connection and in the RRC Connection Setup Complete message the UE 101 includes a 'Mobility Update Indicator' although other alternatives are possible including the use of a TAU procedure (in which case signalling variant 3 is similar to signalling variant 1 with the exception that the suspended RRC connection is maintained following the UEs reselection to a cell under control of eNB2 102*b* and is not released—i.e. the procedure is as per signalling variant 1 but without execution of steps 4, 6 and 7).
6. From reception of the Mobility Update Indicator the eNB2 102*b* is aware of the purpose of this RRC Connection Establishment and sends an S1 Mobility Update message to the MME 103*b*. In response to this the MME 103*b* sends an S1 user plane suspend message to the S-GW 103*a*.
7. On receipt of the S1 user plane suspend message the S-GW 103*a* knows that DL data for this UE 101 should be buffered, and the UE 101 located before the data can be delivered (i.e. the S-GW 103*a* should not simply forward the DL data over the S1 to eNB1 102*a* as there is a possibility that the UE 101 will not be located under eNB1 102*a*).
8. eNB2 102*b* instructs the UE 101 to release the 'temporary' RRC Connection. The UE 101 still maintains its suspended RRC connection for eNB1 102*a* but is camped on a cell under eNB2 102*b*.

For mobility across a validity area boundary, a consequence of both signalling variants 1 and 2 is that the UE 101 releases the suspended RRC Connection and initiates a signalling procedure as soon as it moves out of the area where the suspended RRC Connection is known to be valid. Whenever data activity resumes, it will be necessary for a new RRC Connection (and Security and DRBs) to be established before data transfer can begin. Therefore signalling variants 1 and 2 may not be very effective at reducing signalling load if the UE is moving.

A benefit of signalling variant 3 compared to variants 1 and 2 is further explained by reference to FIG. 13, which shows a mobility scenario similar to that shown in FIG. 9, in which a UE 101 with a suspended RRC connection moves out of its cell to a point 3 in another cell in which the RRC connection is invalid, but the FIG. 13 scenario additionally shows the UE 101 moving to points 4 and 5. As explained above, with signalling variant 3 at point 3 the UE 101 has a suspended RRC Connection associated with eNB1 102*a* and has signalled to the network that it has moved to out of the area where it knows its suspended RRC Connection is valid. The S-GW 103*a* has suspended the S1 user plane to eNB1 102*a*.

Figure 13:
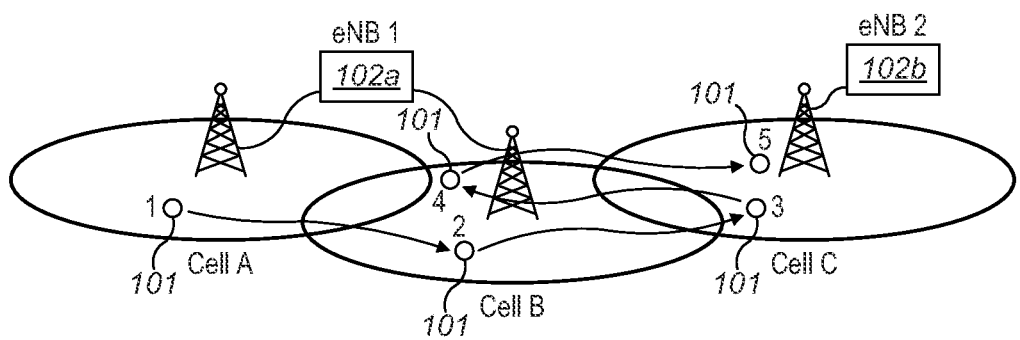
FIG. 13 is an illustration of another exemplary similar to FIG. 9, in which the UE moves back into, and again out of, a cell of the RAN in which the suspended RRC connection is valid.

In the FIG. 13 mobility scenario, after moving to point 4 the UE 101 reselects back to cell B which is under the control of eNB1 102*a*. No signalling needs to be initiated towards the network. If data activity were to resume at this point, then the suspended RRC Connection with eNB1 102*a* could be reactivated. Similarly, the S1 connection between SGW 103*a* and eNB1 102*a* could also be reactivated if it had been previously suspended.

In the FIG. 13 mobility scenario, after moving to point 5 whilst the RRC connection with eNB1 102*a* remains suspended, the UE 101 reselects back to cell C which is under the control of eNB2 102*b*. Although the UE 101 is again moving outside the area where it knows its suspended RRC Connection is valid, there is no need to initiate any signalling. This is because the S1 user plane connection between SGW 103*a* and eNB1 102*a* has already been suspended at the S-GW 103*a* (this having occurred on the transition from point 2 to point 3). If data activity were to resume at this point, then the suspended RRC Connection with eNB1 102*a* would be released and a new RRC Connection would need to be established with eNB2 102*b*.

It can be seen that with signalling variant 3, signalling towards the network is only required the first time that the UE 101 moves out of the area where it knows that its suspended RRC Connection is valid, and whilst the RRC connection remains suspended, subsequent moves in and out of the area can be performed without any signalling. Hence, this approach is effective at reducing signalling that may otherwise be associated with a UE 101 that is located close to a boundary of 2 cells where 'ping-pong' reselections between the cells could occur.

As an extension to signalling variant 3, the UE could be configured to additionally perform signalling towards a RAN or CN node whenever it moves back in to a cell or group of cells for which the suspended RRC connection is again valid (e.g. a cell under the control of eNB1 102*a*). This could enable a suspended S1 connection between SGW 103*a* and eNB1102*a* to be reactivated.

The above procedures may be supplemented with timer based expiry of a suspended RRC connection. For example, a timer may be started at the time of suspension, or at the time of leaving a suspension cell (or group of cells). When the timer expires, the UE 101 (and eNB 102*a,b* . . . *n* and CN 103 nodes) discard any UE 101 context information and the UE 101 returns to normal idle mode operation. If common timers are used within both the UE 101 and the eNB 102*a,b* . . . *n* or CN 103 nodes) this may take place without any signalling between the UE 101 and the any of the RAN or CN nodes. If the timers are implemented only at the eNB 102*a,b* . . . *n* or CN 103 node side, signalling may be required for the RAN or CN nodes to inform the UE that the suspended RRC connection is being released and to instruct a return to idle.

Some possibilities within the signalling variants rely on the use of existing procedures (NAS Service Request and TAU) and hence the UE 101 can assume that these are supported by the network. However, other possibilities within the signalling variants rely on new signalling functionality. In such cases, it may be necessary for the UE 101 to know that the eNB2 102*b* supports the new signalling before it initiates that signalling towards the eNB2102*b*. To address this, eNB2 102*b* may broadcast a support indicator in system information. This could be a general indicator to indicate support for all the RRC Connection suspension functionality or it could just indicate support for the new signalling functionality (such as the Mobility Update signalling option described in FIG. 12 for signalling variant 3). If the UE 101 sees that the eNB2 102*b* does not support the functionality then the UE 101 can fall back to behaving in line with signalling variants that do not require new signalling functionality (e.g. the UE could release its suspended RRC connection and then initiate a TAU or Service Request procedure).

In the present disclosure, 'releasing an RRC connection' may mean simply ignoring the stored RRC context data, or indicating or marking that data as being released or invalid, or scrubbing that data, or deleting the data from memory. Other methods that achieve the same functional effect of releasing an RRC connection are also intended to be within the scope of the present disclosure.

Handling Receipt of Downlink (DL) Data During RRC Connection Suspension

On suspension of a UE's RRC connection, the UE 101 may perform cell selection and reselection in a similar manner to that of a normal idle mode UE 101 (i.e. the UE 101 follows the general mobility procedures of 3GPP TS 36.304). In addition, the UE 101 may monitor the paging channel in exactly the same way as it does in idle mode; i.e. the UE 101 will power on its receiver at the appropriate paging occasions to attempt to receive a paging message and then check that paging message for the UE's identity (e.g. S-TMSI). On reception of a paging message containing the UE's identity, the UE 101 will attempt to resume its suspended RRC Connection as described below.

Figure 14:
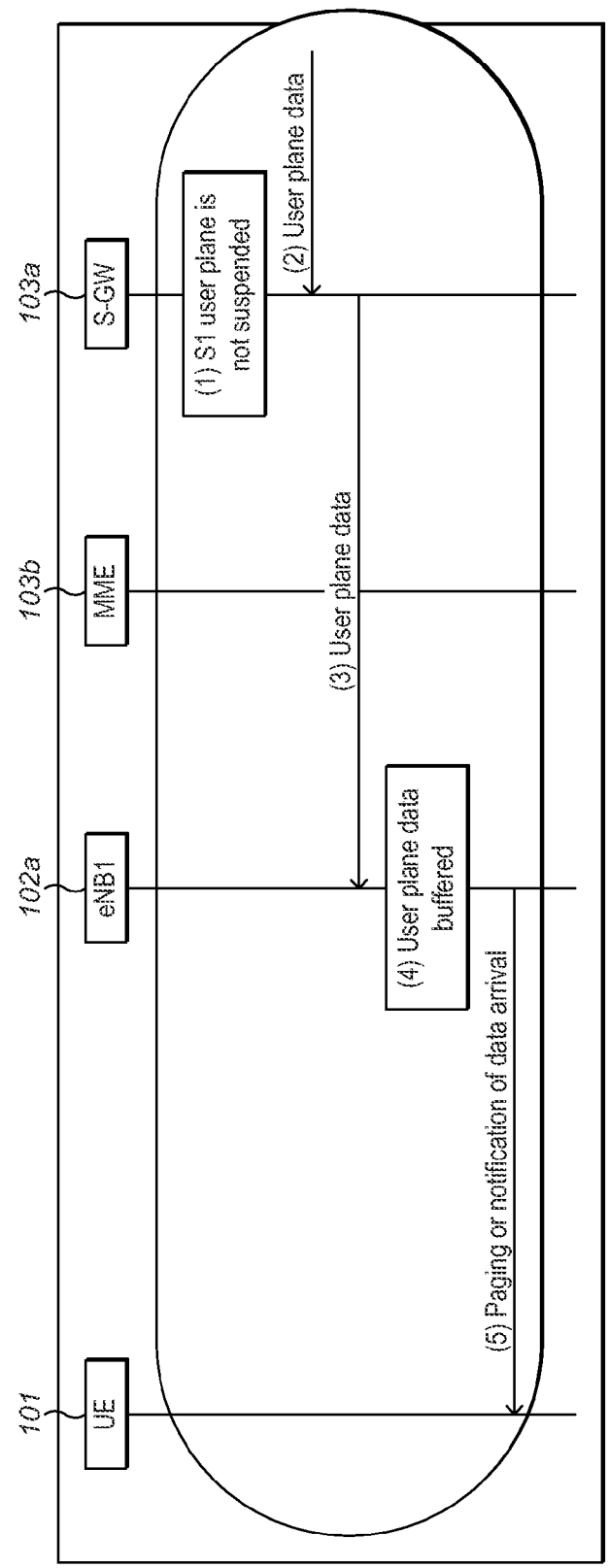
FIGS. 14, 15 and 16 are message sequence charts illustrating example methods for handling downlink (DL) data in the network in different scenarios when the RRC Connection between a UE and a RAN is suspended.
Figure 15:
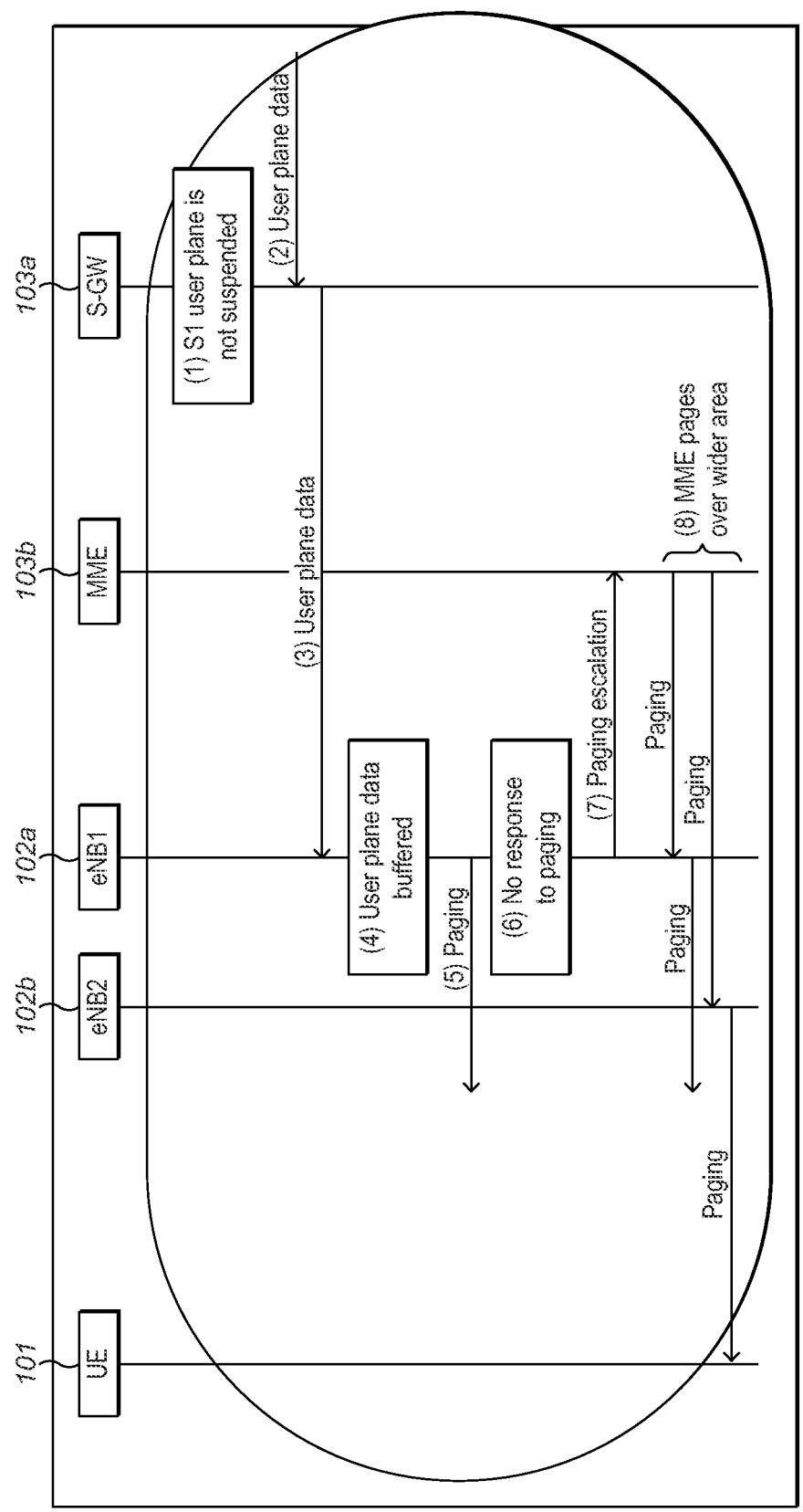

When DL data arrives in the network for a UE 101 that has a suspended RRC Connection, it is necessary that the network can contact or page the UE 101 irrespective of which cell the UE 101 may now be located in. Depending on whether RRC Connection Suspension alternative A or B (described above) is used, and whether Mobility alternative A or B (also described above) is used, then different scenarios for paging the UE 101 when DL data arrives at the S-GW 103a are possible. Three scenarios for handling DL data in the network will thus now be described with reference to FIGS. 14 to 16. FIG. 14 shows a message sequence chart representing a method of handling DL data in the network when the UE 101 has a suspended RRC Connection with eNB1 102a. The UE 101 is currently located on a cell under eNB1 102a and the S1 user plane between SGW 103a and eNB1 102a is not suspended (1). When DL data arrives at the S-GW 103a (2), the S-GW 103a forwards the user plane data directly to eNB1 102a (3). This is normal S-GW 103a behaviour for a UE 101 in RRC Connected state. eNB1 102a buffers the DL data (4) and then sends a paging message or notification of data arrival message to the UE 101 (5). When the UE 101 responds to the paging/notification, (e.g. via the sending of an RRC re-activation request) the suspended RRC Connection may be reactivated and then the eNB1 102a will be able to deliver the DL data. FIG. 15 shows a message sequence chart representing a method of handling DL data in the network when the UE 101 has a suspended RRC Connection with eNB1 102a. The UE is currently located on a cell under a different eNB (i.e. eNB2 102b) and the S1 user plane between SGW 103a and eNB1 102a is not suspended (1). When DL data arrives at the S-GW 103a (2), the S-GW 103a forwards the user plane data directly to eNB1 102a (3). This is normal S-GW 103a behaviour for a UE 101 in RRC Connected. The S-GW 103a is not aware that the UE 101 has moved or may have moved away from eNB1 102a and hence the S-GW 103a is not able to take any alternative action. eNB1 102a buffers the DL data (4) and then sends a paging message or notification of data arrival message to the UE 101 (5). As the UE 101 is no longer located in a cell under eNB1 then no response (in the form of an attempt by the UE to reactivate the suspended RRC Connection) is received (6). eNB1 102a sends a "paging escalation" message to the MME 103b (7) in order to request the MME 103b to page the UE 101 over a wider group of cells (8) (for example the MME 103b could page the UE 101 in all the cells of the tracking area(s) (TA(s)) in which the UE 101 is registered).

Figure 16:
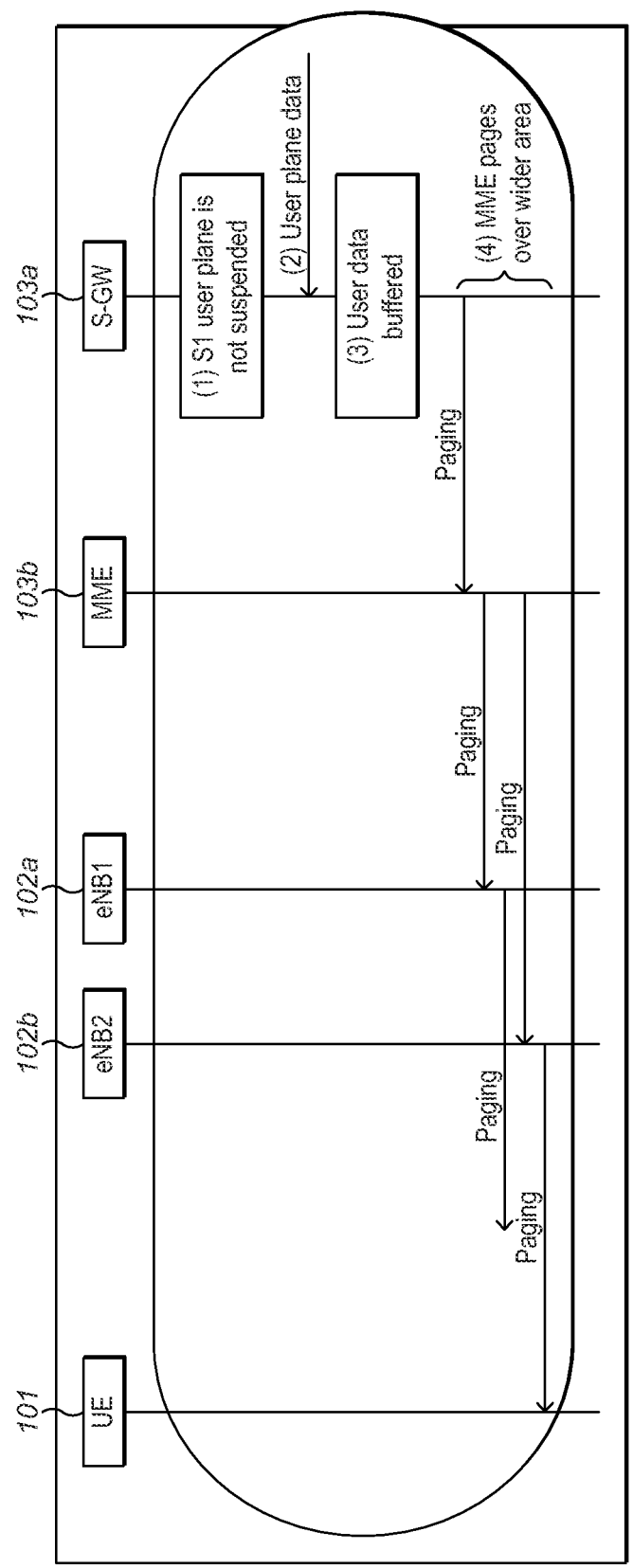

FIG. 16 shows a message sequence chart representing a method of handling DL data in the network when the UE 101 has a suspended RRC Connection with eNB1 102a and the S1 user plane connection between SGW 103a and eNB1 102a is suspended (1). Note that the S1 user plane suspension may have occurred as a result of RRC Connection suspension alternative B or as a result of Mobility alternative B with signalling variant 3. The UE 101 may be located in a cell under eNB1 102a (i.e. the eNB where the RRC Connection was suspended) or it may be located under a cell of a different eNB 102b, . . . n. When DL data arrives at the S-GW 103a (2), the S-GW 103a buffers this user plane data (3). The S-GW 103a then initiates a paging procedure towards the MME 103b to request the MME 103b to page the UE 101 (4). MME 103b then pages the UE 101 over a wider group of cells, for example it could page the UE 101 in all the cells of the TA(s) in which the UE 101 is registered.

Handling a Suspended RRC Connection to Resume Uu Data Transfer

RRC Connection Reactivation can be triggered by UL data being generated in the UE 101, or by the reception of a paging or DL data notification message indicating that the network has DL data waiting to be delivered. When this occurs the UE 101 first determines whether its suspended RRC Connection is valid for the cell in which it is currently located. Depending on whether the suspended RRC Connection is determined to be valid, a number of different options are possible.

Figure 17:
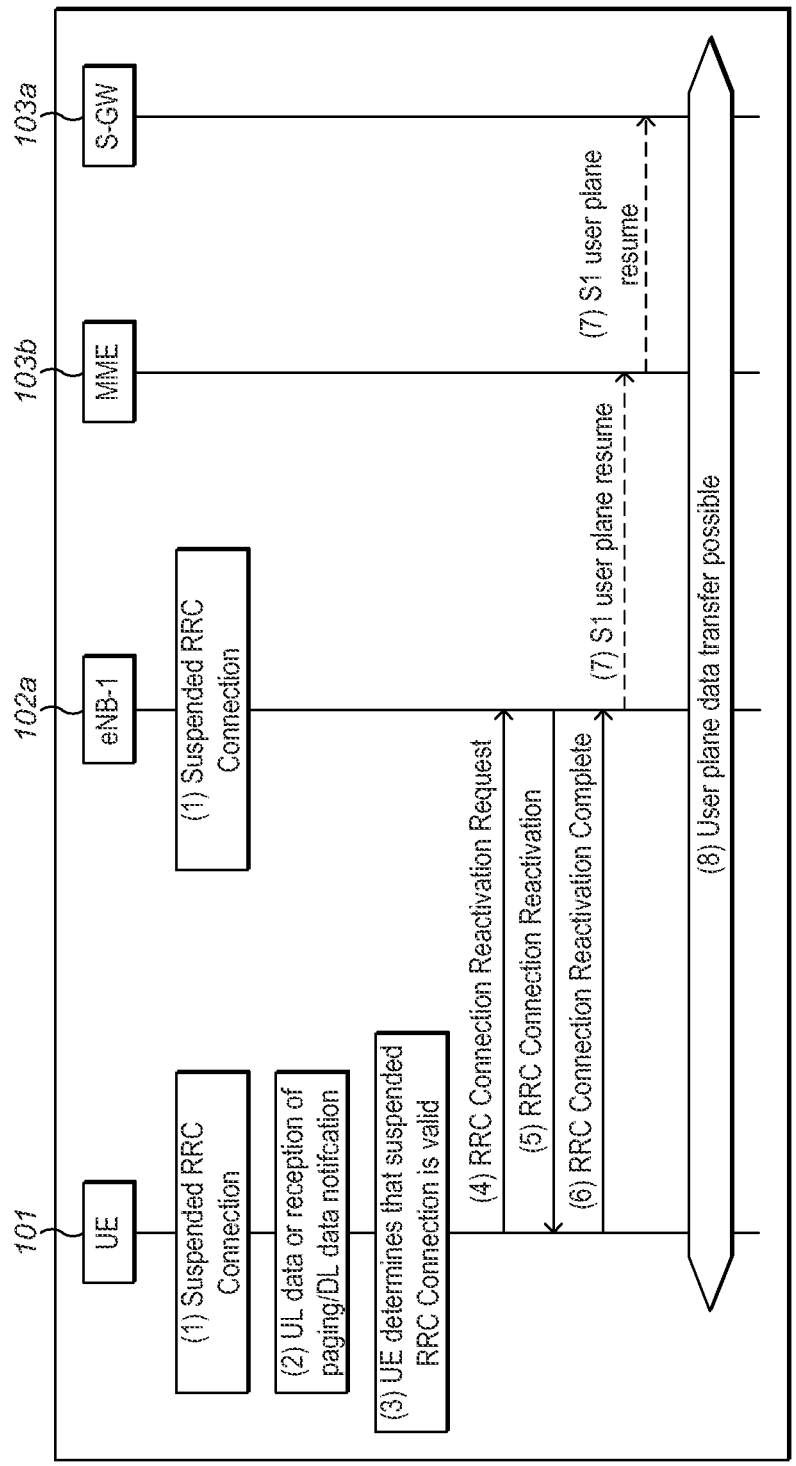
FIGS. 17, 18 and 19 show message sequence charts illustrating example RRC reactivation methods for handling the resumption of user plane data transfer for a UE having a suspended RRC Connection with a RAN.

FIG. 17 shows a message sequence chart representing the RRC reactivation method for a UE 101 with a suspended RRC Connection with eNB1 102a (1). The need for an active RRC Connection is triggered by UL data being generated in the UE 101, or by the reception of a paging or DL data notification message (2). The UE 101 determines that its suspended RRC Connection is valid for the cell on which it is located (3). The UE 101 initiates an RRC Connection Reactivation procedure by sending an RRC Connection Reactivation Request (4). On receipt of this message the eNB1 102a checks that it has a valid suspended RRC Connection for this UE 101. Optionally (and not shown) it may also invoke procedures to retrieve RRC context data for the UE from another node of the RAN 102 or CN 103, and may communicate with other nodes of the RAN or CN to initiate a path switch of the S1. If eNB1 102a has a valid suspended RRC Connection (or has been able to retrieve one from another node) then it sends an RRC Connection Reactivation message to the UE 101 (5) and the UE 101 responds with an RRC Connection Reactivation Complete message (6). The RRC Connection Reactivation message may or may not include configuration updates to one or more of the previously-stored RRC connection parameters for the UE to use following the reactivation. The UE 101 can now start to send any user plane data that it may have buffered (8). If the S1 user plane had been suspended the eNB1 102a may send an S1 user plane resume message to the S-GW 103a (7) (possibly via the MME 103b as shown as optional by the dotted lines in FIG. 17) and on receipt of this the S-GW 103a can resume the S1 user plane and start to forward to the eNB1 102a any DL user plane data that may be buffered in the S-GW 103a (8). As an alternative, and if the S1 connection was suspended only in the DL direction, the reception of UL user plane data from the UE 101 may be used by the S-GW 103a as an implicit S1 user plane resume message.

Figure 18:
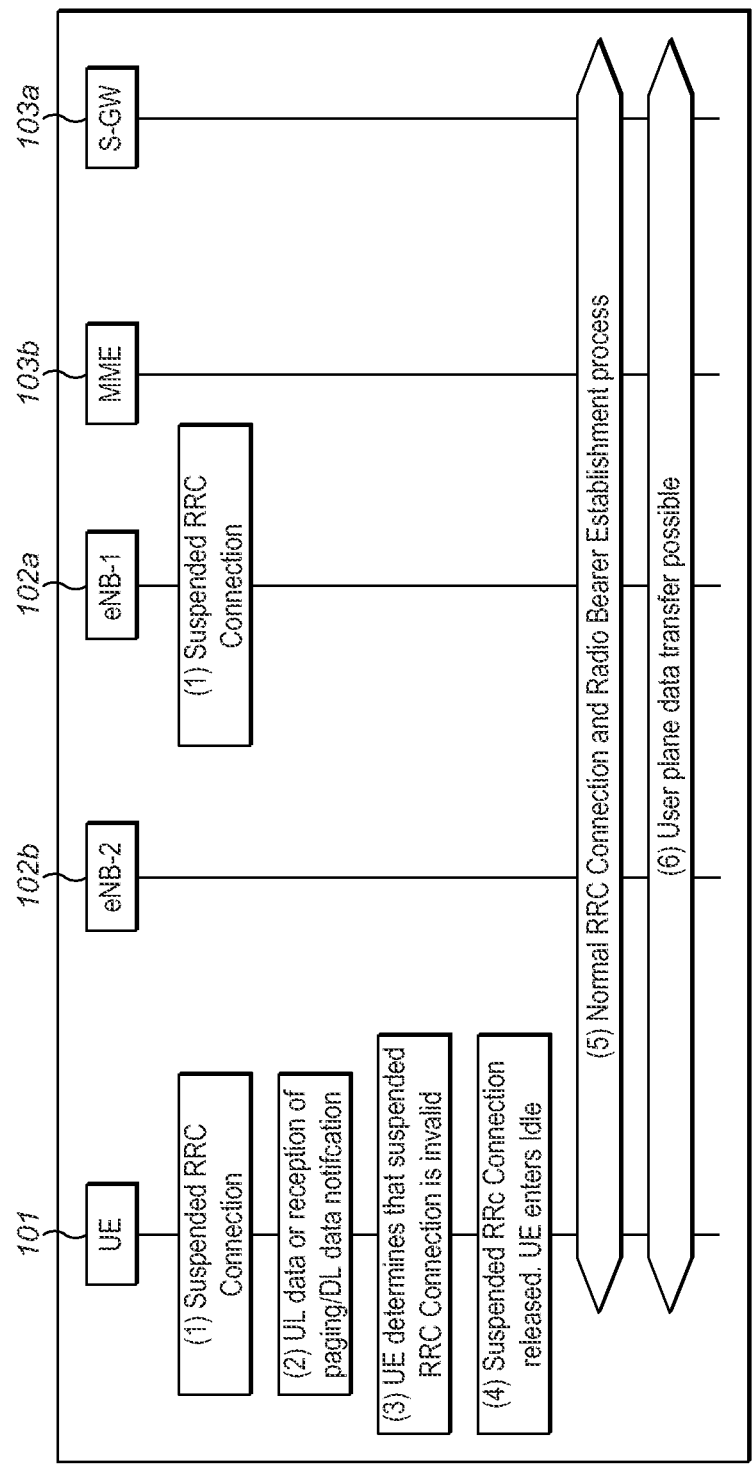

FIG. 18 shows a message sequence chart representing another RRC reactivation method for a UE 101 with a suspended RRC Connection with eNB1 102a (1) but which is no longer valid. The need for an active RRC Connection is triggered by UL data being generated in the UE 101, or by the reception of a paging or DL data notification message (2). In this case, the UE 101 determines that its suspended RRC Connection is not valid for the cell on which it is located (3) (for example, this may be the case if the UE 101 is on a cell that does not lie within a specified validity area, or in the event that a validity timer has expired). The UE 101 releases its suspended RRC Connection and enters the RRC idle state (4). The UE 101 then initiates a normal procedure for establishing an RRC Connection towards eNB2 102*b* and establishing user plane radio bearers (i.e. the UE initiates NAS Service Request procedure) (5) and on completion of this procedure user plane data transfer is possible (6).

Figure 19:
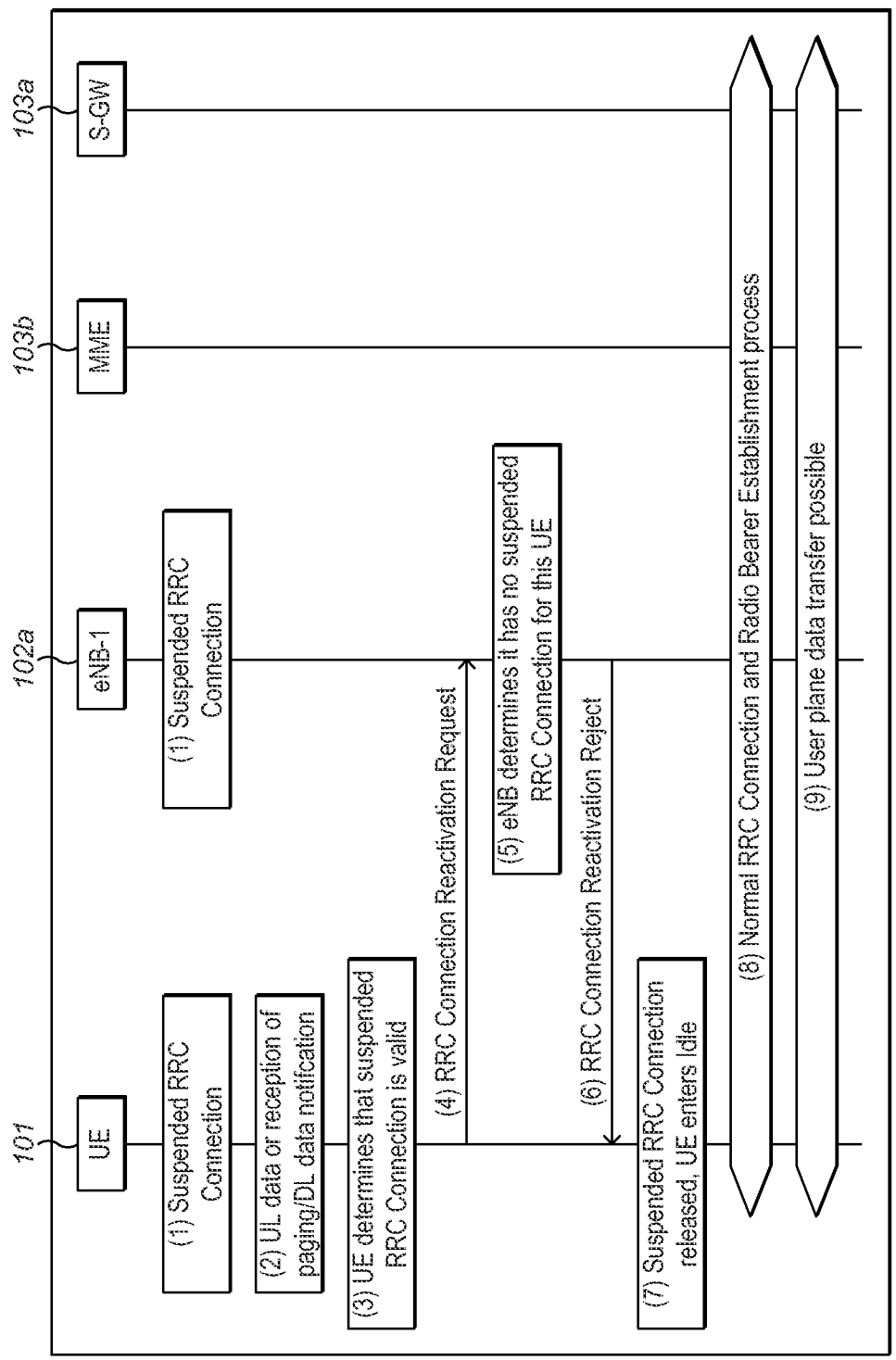

FIG. 19 shows a message sequence chart representing another RRC reactivation method for a UE 101 with a suspended RRC Connection (1), which the eNB1 102*a* determines is invalid. The need for an active RRC Connection is triggered by UL data being generated in the UE 101, or by the reception of a paging or DL data notification message (2). The UE 101 determines that its suspended RRC Connection is valid for the cell on which it is located (3). The UE 101 initiates an RRC Connection Reactivation procedure by sending an RRC Connection Reactivation Request (4). On receipt of this message the eNB1 102*a* checks that it has a suspended RRC Connection for this UE 101 and may also check whether all required parameters of the stored RRC connection remain valid. Optionally (and not shown) eNB1 102*a* may also invoke procedures to retrieve RRC context data for the UE from another node of the RAN 102 or CN 103. In FIG. 19, the eNB1 102*a* determines that it does not have a suspended RRC Connection for the UE 101 or that some of the stored RRC connection parameters are invalid (5). This may be due, for example, to expiry of a validity timer in the eNB1 102*a*. Alternatively, it may be due to eNB1 102*a* having assigned some of the resources associated with the suspended RRC connection to another UE, or due to eNB1 102*a* otherwise determining that for any valid reason, parts or all of the suspended RRC connection are no longer valid. In a further alternative, it may due to the UE 101 accessing an eNB that is different from the one which has the UE's suspended RRC Connection and a failure of eNB1 102*a* to retrieve the RRC context data from the other eNB. The eNB1 102*a* responds with an RRC Connection Reactivation Reject message (6). The UE 101 releases its suspended RRC Connection and enters RRC idle mode (7). The UE 101 then initiates a normal procedure for establishing an RRC Connection and establishing user plane radio bearers (i.e. the UE 101 initiates a NAS Service Request procedure) (8) and on completion of this procedure user plane data transfer is possible (9).

It may be necessary for the UE 101 to know that the eNB 102*a,b* . . . *n* supports the new signalling RRC Connection Reactivation Request/Setup/Reject signalling before it initiates that signalling towards the eNB 102*a,b* . . . *n*. To address this, an eNB 102*a,b* . . . *n* may broadcast a support indicator in system information. This could be a general indicator to indicate support for all the RRC Connection suspension functionality or it could just indicate support for the Request/Setup/Reject signalling. If the UE 101 sees that the eNB 102*a,b* . . . *n* does not support the functionality then the UE 101 would release its suspended RRC connection and then initiate a Service Request procedure.

An alternative to the eNB 102*a,b* . . . *n* broadcasting a support indicator would be for the eNB 102*a,b* . . . *n* that initially suspends the UE's RRC Connection to set the area based validity criteria in a way to ensure that the UE 101 only attempts to reactivate a suspended RRC Connection on a cell/eNB 102*a,b* . . . *n* that is known to support the functionality. In the simplest case the eNB 102*a,b* . . . *n* that suspends the UE's RRC Connection would only include in the validity criteria cells that are located under the same eNB 102*a, b* . . . *n*. However, the validity area may in general span cells controlled by different eNBs.

There are many ways to combine the various RRC Connection Suspension and Mobility scenarios described above. Table 2 below provides four possible combinations but it is to be noted that other combinations or sub-combinations are possible. In the examples of Table 2, combinations of RRC Connection Suspension Alternatives A or B with Mobility Alternatives A or B are discussed. For each combination, Table 2 describes in what status the RRC Connection and the S1 user plane connection would reside at various points in time. The status of the RRC Connection and S1 user plane may be:

idle—no RRC Connection exits, no S1 user plane is established eNB1/2—an RRC Connection exists with eNB1 or eNB2, an S1 user plane is established between S-GW and eNB1 or eNB2

Suspended (eNB1)—a suspended RRC Connection exists with eNB1, the S1 user plane between S-GW and eNB1 is suspended The columns of the table T0-T2 relate to different times/instances and are defined with reference to FIG. 9.

T0—UE 101 in location 1 of FIG. 9, before RRC Connection is suspended

T1—UE 101 in location 1 (or location 2, if the UE 101 has performed cell reselection) of FIG. 9, after RRC Connection is suspended T2—UE 101 in location 3 of FIG. 9.

TABLE 2

| Combination | Connection | T0 | T1 | T2 (move to cell under eNB2 while suspended) |
|---|---|---|---|---|
| 1/ RRC Sus Alt A, Mobility Alt A | S1 | eNB1 | eNB1 | eNB1 |
|  | RRC | eNB1 | Suspended (eNB1) | Suspended (eNB1) |
| 2/ RRC Sus Alt B, Mobility Alt A | S1 | eNB1 | Suspended (eNB1) | Suspended (eNB1) |
|  | RRC | eNB1 | Suspended (eNB1) | Suspended (eNB1) |
| 3/ RRC Sus Alt A, Mobility Alt B | S1 | eNB1 | eNB1 | idle/eNB2/ Suspended (eNB1) |
|  | RRC | eNB1 | Suspended (eNB1) | idle/eNB2/ Suspended (eNB1) |
| 4/ RRC Sus Alt B, Mobility Alt B | S1 | eNB1 | Suspended (eNB1) | idle/eNB2/ Suspended (eNB1) |
|  | RRC | eNB1 | Suspended (eNB1) | idle/eNB2/ Suspended (eNB1) |

In this example, it should be noted that, for combinations 3 and 4 shown in Table 2, three possible cases are shown for the condition of the RRC and S1 connections corresponding to the signalling variants 1/2/3 respectively which may be adopted within Mobility Alternative B.

In addition, it should be noted that combination 4, which corresponds to RRC Connection Suspend alternative B and Mobility alternative B, is shown in the table for completeness. However, with this alternative the S1 user plane is suspended as soon as the RRC Connection is suspended, meaning that any DL data will be buffered at the S-GW 103*a* until the UE 101 has been paged/notified and has reactivated its RRC Connection. Thus there may be little benefit to performing any signalling when the UE 101 moves to a cell under a different eNB 102*a,b*, . . . *n*.

Given that the various possible processes for handling an RRC connection suspension in accordance with the present disclosure have been described above, a number of example scenarios will now be described showing how these various suspended RRC connection handling procedures can operate together.

Example Scenario 1

Figure 20:
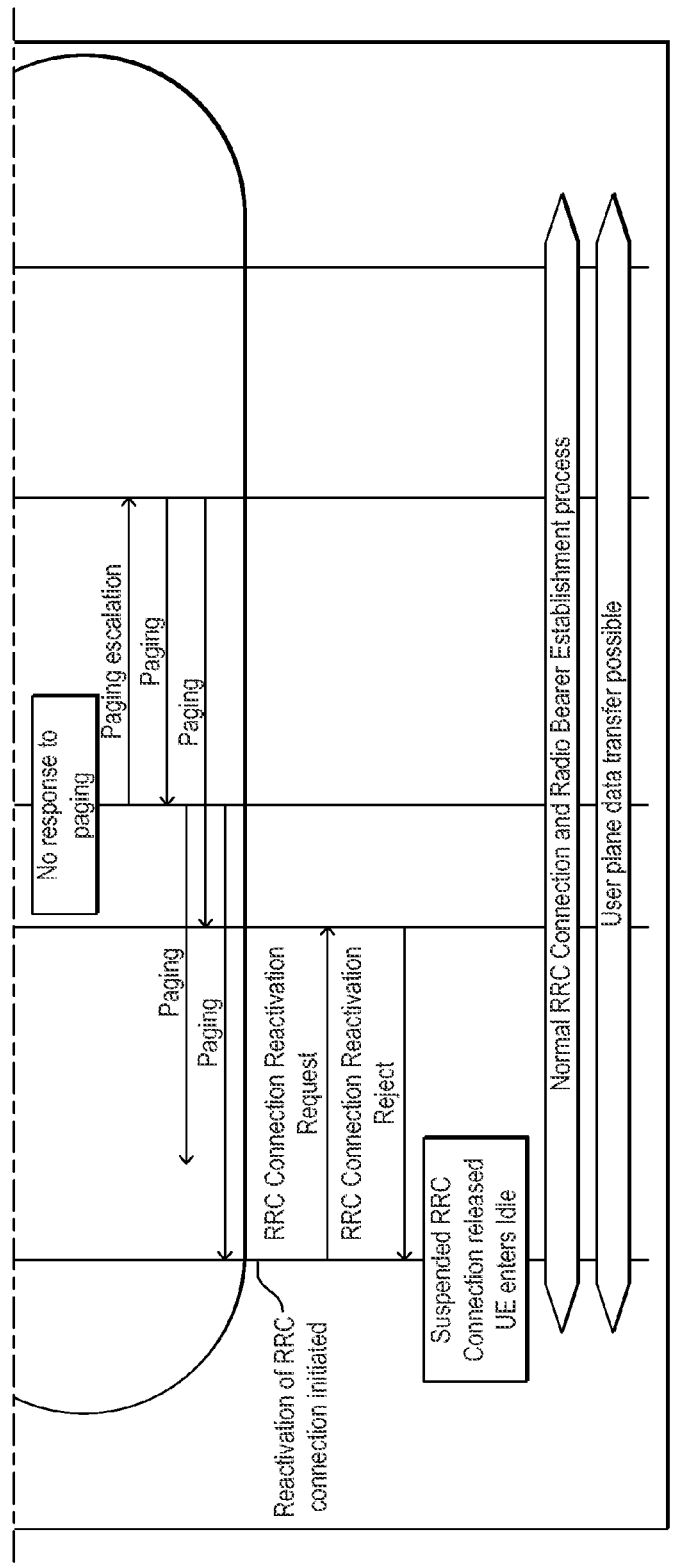
FIG. 20 shows a message sequence chart illustrating the method of handling an RRC connection suspension in Example Scenario 1.

FIG. 20 shows a message sequence chart representing a possible handling of the suspension and later attempted reactivation of an RRC connection between UE 101 and a RAN 102 in which (at the time of the reactivation attempt) the UE 101 has moved out of the cell(s) where the suspended RRC connection is valid in accordance with suspension alternative A (CN not informed of the RRC suspension) and mobility alternative A (network not informed of mobility) described above. Due to this processing, the CN 103 is not aware that the RRC connection is suspended and hence the S1 connection is not suspended. When DL data arrives at the network, the network does not know for certain the cell in which the UE 101 is currently located, nor does it know whether any suspended RRC context is valid. The S1 connection is not suspended and remains active, hence DL data incident at SGW 103a is forwarded via S1 to eNB1 102a. eNB1 102a attempts to contact the UE 101 via transmission of a paging message and in the absence of a response, a paging escalation approach is used in order to contact the UE 101. The suspended RRC Connection is not valid in the cell in which the UE 101 is found and so it is released and a fresh RRC Connection is established for the data to be delivered.

With reference to FIG. 20, the steps of the sequence in this scenario are:

1. UE 101 is initially in RRC connected with user plane bearers established such that it is possible for user data to be transferred between UE 101 and S-GW 103a and then on to the P-GW 103c (not shown in FIG. 20) and beyond.
2. Criteria to trigger suspension are met and eNB-1 102a decides change the UE 101 to UE-controlled mobility and to suspend the RRC connection.
3. eNB-1 102a send a message to the UE 101 to instruct it to enter UE-controlled mobility and to suspend the RRC connection. For example this message may be called RRC Connection Suspend as shown in the Figure, or may be called RRC UE controlled mobility command, or some other suitable name.
4. eNB-1 102a and UE 101 suspend the RRC connection. The UE 101 performs UE-controlled mobility similar to that of idle mode.
5. When the UE 101 has suspended the RRC connection and enters UE-controlled mobility, cell reselections may occur. As long as the UE 101 remains within a registered TA then these reselections do not trigger any signalling towards the network (i.e. the network is not made aware of the reselections in mobility alternative A). Steps 1-5 (excepting the cell reselections) are indicated in FIG. 20 in the upper rectangle having rounded ends.
6. After a period, when an RRC connection with UE 101 is once again needed, in the network-originated case, user plane data arrives in the S-GW 103a. S-GW 103a immediately forwards the data on the S1 user plane interface to the eNB1 102a. On arrival of the user plane data in the eNB1 102a the eNB1 102a sends a paging message to the UE 101 in order to trigger the RRC Connection Reactivation. However, in this case eNB-1 102a does not receive any response to this paging message, and thus eNB-1 102a can conclude that the UE 101 is no longer located in a cell under its control. In order to contact the UE 101 that may be located in a cell under a different eNB 102b, . . . n the eNB-1 102a must escalate the paging, meaning that it must trigger the MME 103b to send paging requests to other eNBs 102b, . . . n to page the UE 101 within the TA(s) in which the UE 101 is currently registered. In this example scenario in FIG. 20 the escalation causes eNB-2 102b to send a page and this is successfully received by the UE 101.
7. The UE 101 sends the RRC Connection Reactivation Request to the eNB-2 102b. As an alternative step 7, the UE 101 may be able to determine prior to sending the RRC Connection Reactivation Request to the eNB-2 102b that the reactivation attempt will not be successful on this cell. For example the UE 101 may be able to determine this from the Cell ID of the cell, or eNB ID of the cell or some additional indicator that may be sent in the paging message. If the UE 101 does determine that the reactivation will not be successful then the UE 101 does not transmit RRC Connection Reactivation Request but jumps directly to step 9.
8. Due to the fact that in this case the eNB-2 102b does not have the UE's suspended RRC Connection (or is not able to successfully retrieve it from another node), the eNB-2 102b responds with a RRC Connection Reject.
9. The UE 101 releases its (suspended) RRC connection and enters RRC idle mode. The UE 101 then performs a normal RRC Connection Establishment procedure in order to setup up a new RRC connection and continue user plane activity.

Example Scenario 2

Figure 21:
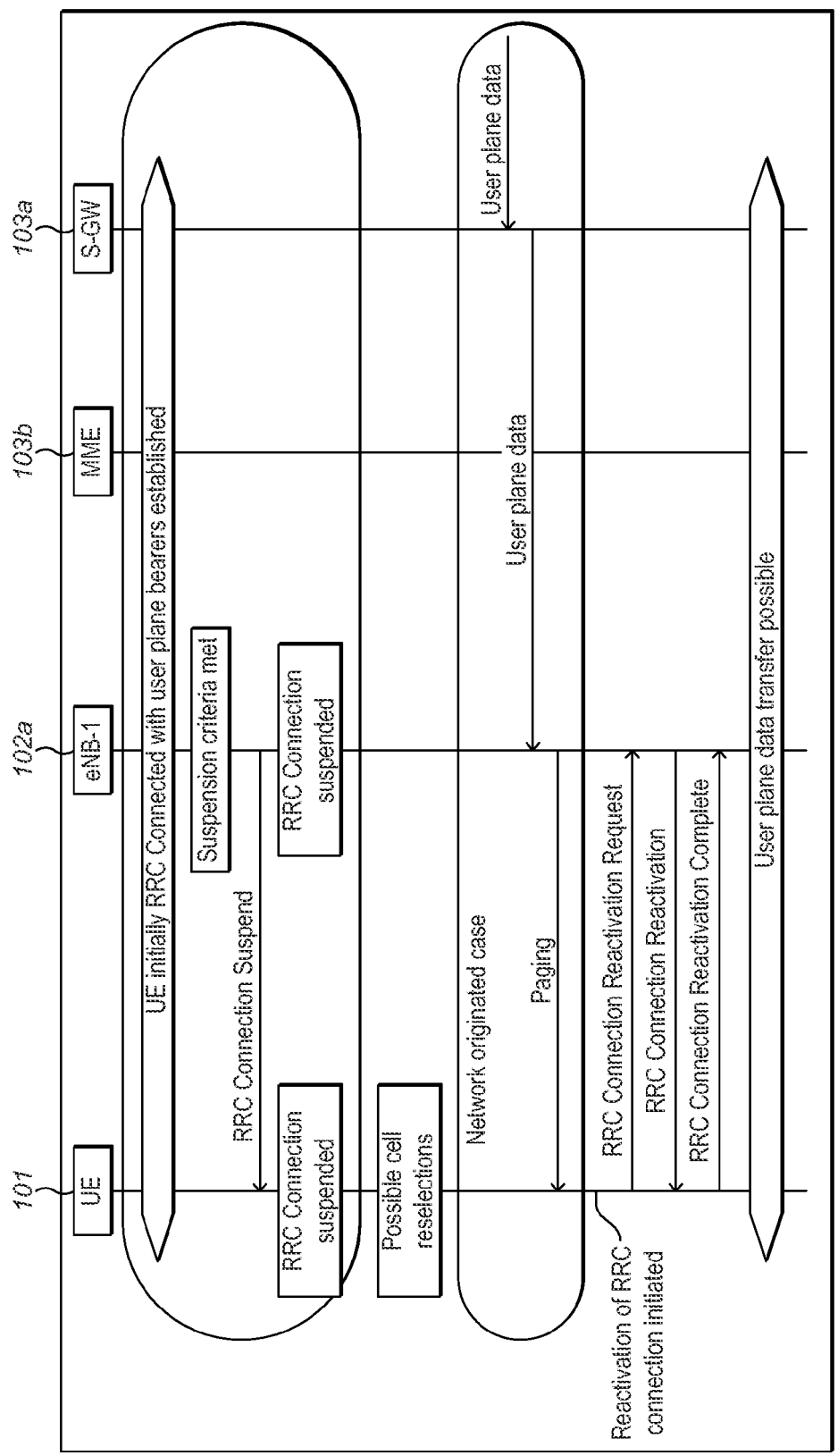
FIG. 21 shows a message sequence chart illustrating the method of handling an RRC connection suspension in Example Scenario 2.

FIG. 21 shows a message sequence chart representing a possible handling of the suspension and later reactivation of an RRC connection between UE 101 and a RAN 102 in which the UE 101 has initially moved out of the cell(s) where the suspended RRC connection is valid (and may have reselected a number of times) but when the data activity is to be resumed the UE 101 is once again camped on a cell where the suspended RRC Connection is valid and hence it can be successfully reactivated in accordance with suspension alternative B and mobility alternative A described above.

In accordance with suspension alternative B (CN is informed of the RRC suspension) and mobility alternative A (network is not informed of mobility), if the UE 101 reselects away from the cell (or cells) on which the suspended RRC connection is valid, the UE 101 does not perform any signalling to inform the network (unless the reselection results in the UE crossing a TA boundary such that a 'normal' TAU is needed). Thus when DL data arrives the network does not know for certain the cell in which the UE is currently located, hence nor does it know whether any suspended RRC context is valid.

The steps of the sequence are:

1. UE 101 is initially in RRC connected with user plane bearers established such that it is possible for user data be transferred between UE 101 and S-GW 103a and then on to the P-GW 103c (not shown in FIG. 21) and beyond.
2. Criteria triggering a suspension are met and eNB-1 102a decides to change the UE 101 to UE-controlled mobility and to suspend the RRC connection.
3. eNB-1 102a sends a message to the UE 101 to instruct it to enter UE-controlled mobility and to suspend the RRC connection. For example this message may be called RRC Connection Suspend as shown in FIG. 21, or may be called RRC UE-controlled mobility command, or some other suitable name.

4. eNB-1 102*a* and UE 101 suspend the RRC connection. The UE 101 performs UE-controlled mobility similar to that of idle mode.
5. eNB-1 102*a* informs the CN 103 (MME 103*b* or S-GW 103*a* or both) about the RRC suspension. The message to inform the CN 103 may be called S1 user plane suspend. On reception of this by the CN 103, the S1 user plane bearers remain established but are suspended (user plane transmission ceases) and the S-GW 103*a*, on reception of downlink user plane data, will not immediately forward that data over the S1 user plane towards the eNB-1 102*a* and will instead buffer the data pending its delivery. The S1 user plane suspension may only affect the way that the S-GW 103*a* treats DL user data arriving in the S-GW 103*a*. Hence, in this case it may be considered as just a DL S1 user plane suspension.
6. When the UE 101 has suspended the RRC connection and enters UE-controlled mobility, cell reselections may occur. As long as the UE 101 remains within a registered TA then these reselection do not trigger any signalling towards the network (i.e. the network is not made aware of the reselections). Steps 1-6 (excepting the cell reselections) are shown in FIG. 21 in the upper rectangle having rounded ends.
7. In the network-originating case for data transfer activation with the UE 101, user plane data arrives in the S-GW 103*a*. Due to the S1 user plane suspension, this user plane data is buffered at the S-GW 103*a* instead of being immediately forwarded on the S1 user plane interface to the eNB-1 102*a*. The S-GW 103*a* then initiates a paging procedure to contact the UE 101 in whichever cell it may be located. This is quite similar (or identical) to the paging procedure used when the UE 101 is idle. The paging indication is sent from the S-GW 103*a* to the MME 103*b* and to one or more eNBs 102*a,b* . . . *n* located within the TA(s) in which the UE 101 is registered. The reception of a paging message in the UE 101 triggers the UE 101 to attempt the RRC Connection Reactivation. This is shown within the lower rectangle having rounded ends. In the UE-originating case the elements in the lower rectangle do not occur and the arrival of user data in at the UE 101 directly triggers the UE 101 to attempts the RRC Connection Reactivation.
8. The remainder of the steps in FIG. 21 represent the sequence of events when the UE 101 attempts the RRC Connection Reactivation on a cell where the associated eNB-1 102*a* does have the UE's suspended RRC Connection (i.e. the eNB does have the stored UE context information). This cell may be the cell the UE 101 was on when the RRC connection was suspended or it may be another cell controlled by the same eNB-1 102*a* or it may be a cell controlled by another eNB but which is in possession of (or able to retrieve) the necessary RRC context data for the UE. The UE 101 sends the RRC Connection Reactivation Request to the eNB-1 102*a*.
9. Due to the fact that in this case the eNB-1 102*a* does have the UE's suspended RRC Connection, the eNB-1 102*a* responds with an RRC Connection Reactivation. This message may contain some new or updated parameter values if the eNB-1 102*a* wishes to change any part of the configuration that was previously suspended, or it may be a very simple 'continue' message (e.g. without any parameter or configuration updates).
10. The UE 101 responds with an RRC Connection Reactivation Complete. This is an optional step, only needed if the eNB-1 102*a* requires extra assurance that the RRC Connection Reactivation has been successful. In the UE-originated case, uplink user data from the UE may start to be transmitted as soon as the RRC Connection Reactivation has been received.
11. The eNB-1 102*a* informs the CN 103 (MME 103*b* or SGW 103*a* or both) that the S1 user plane can continue. This may be an explicit message as shown in FIG. 21. Alternatively, in the UE-originated case, and in the case that only the DL of the S1 was originally suspended, uplink user data from the UE 101 sent from eNB-1 102*a* to S-GW 103*a* may be considered as an implicit 'continue' command by SGW 103*a*.
12. On reception of the indication to continue the S1 user plane, the S-GW 103*a* will stop buffering the downlink user plane data and will forward it over the reactivated S1 user plane to the eNB-1 102*a* for transmission to the UE 101.

Example Scenario 3

Figure 22:
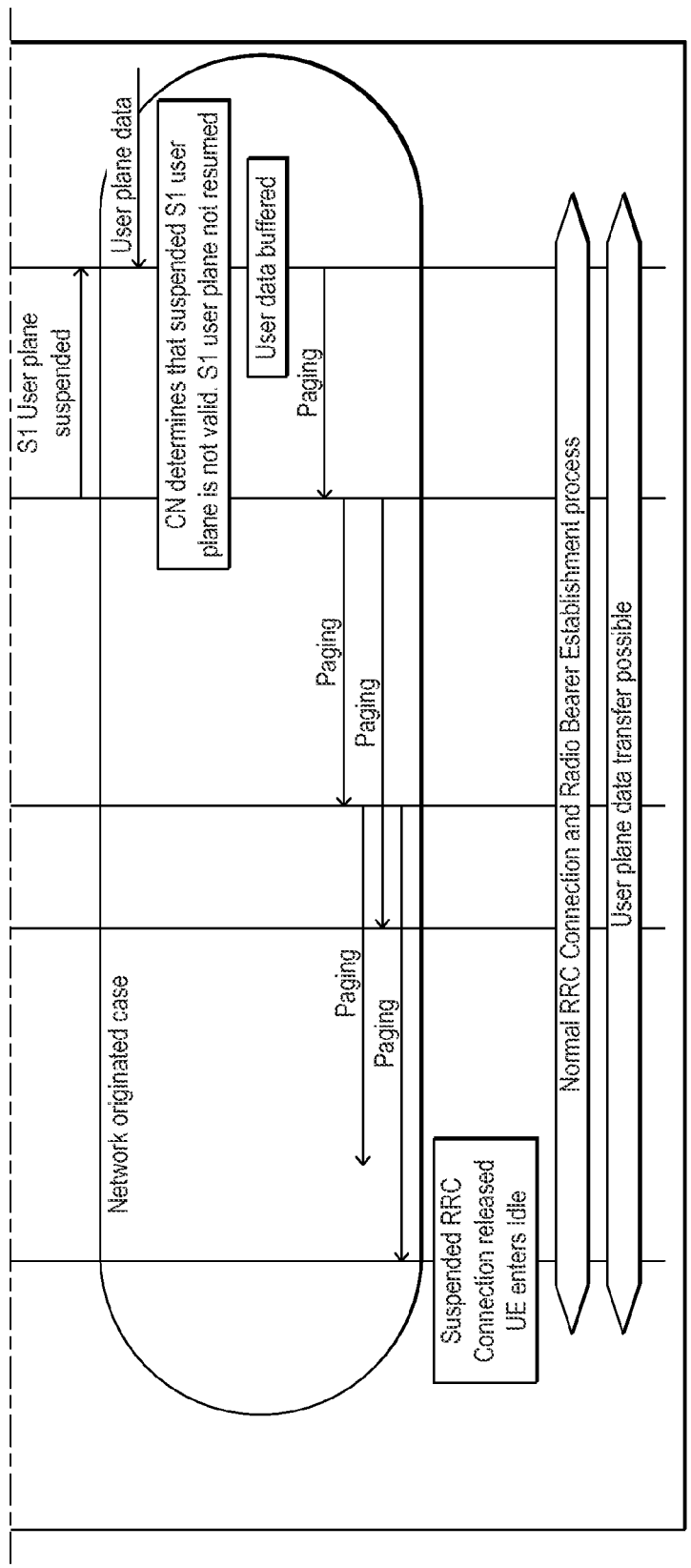
FIG. 22 shows a message sequence chart illustrating the method of handling an RRC connection suspension in Example Scenario 3.

FIG. 22 shows a message sequence chart representing a possible handling of the suspension and later reactivation of an RRC connection between UE 101 and a RAN 102. The CN 103 is not informed of the RRC suspension, but the UE 101 does inform the CN 103 when it moves out of the cell(s) where the RRC connection is valid, in accordance with suspension alternative A and mobility alternative B described above.

In summary this shows the method carried out when the UE 101 has moved out of the cell(s) where the suspended RRC connection is valid, and has informed the CN 103 about moving out of the suspension cells via a mobility update message so that the S1 is then suspended. When DL data arrives at the network the UE 101 is paged, the suspended RRC Connection is not valid in the cell and so it is released and a fresh RRC Connection is established for the data to be delivered.

In this case the CN 103 does not initially know that the UE's RRC connection has been suspended. A validity indicator may however still be maintained in the CN 103 for each connected mode UE 101. This indicator may be set based upon location update information known to the CN 103 (e.g. the MME 103*b*). Whilst in the connected mode, the CN 103 expects that UE 101 mobility events (for example to another cell or eNB 102*b*, . . . n) result in a corresponding handover of the S1-U and S1-MME bearers to that eNB. Tracking area updates are expected only from idle mode UEs. Whilst the validity criteria are met, the CN 103 continues to behave as normal for a connected mode UE 101.

The use of mobility alternative B means that a UE 101 with a suspended RRC connection (and of which the CN 103 may or may not yet be aware) may perform autonomous mobility procedures and may be configured to send a tracking area update (or other location update) message to the CN 103 (e.g. the MME 103*b*) in the event that it leaves or re-enters the cell (or group of cells) for which the suspended RRC connection is valid.

If the CN 103 has not been informed at the time of a suspension, the MME 103*b* initially believes the UE 101 to be still RRC-connected (i.e. not suspended) unless it learns otherwise. If the UE 101 is configured to send the additional/augmented mobility messages of mobility alternative B (e.g. TAU) when suspended, the MME 103*b* may subsequently infer from receipt of a TAU that the UE's RRC connection has in fact been suspended and that the UE 101 is currently camped on a cell (or group of cells) for which the suspended RRC connection is not valid. Thus, the MME 103*b* is simultaneously and indirectly informed both that the UE's RRC connection has been suspended and that it is not currently valid. It will therefore be appreciated that the signalling of additional/augmented mobility messages by the UE 101 may also serve as messages informing CN nodes (such as MME 103b and SGW 103a) of a previous RRC suspension.

The CN 103 (e.g. MME 103b) may choose to subsequently suspend the S1 connection in such a case. The MME 103b may optionally reactivate the S1 in the event that it receives a further TAU or mobility message from the UE 101 indicating that it has re-entered a cell (or group of cells) for which the suspended RRC connection is once again valid.

Within this example scenario 3 a number of different sub-scenarios are possible depending on whether the data activity causing a need for an RRC connection is network- or UE-originating, and whether the suspended RRC connection is still valid at the time a reactivation is required. These different sub-scenarios affect how the wireless communication system handles the processing to resume Uu user plane communications. With reference to FIG. 22, the following describes the processing that occurs when the data activity is network-originated and the suspended RRC connection is invalid at the time of required reactivation. Processing for other sub-scenarios may be derived using logical combinations of previously described processing steps and is within the scope of the present disclosure.

1. During RRC connection suspension (shown in the upper rounded rectangle) the eNB1 102a does not inform the CN 103 of the RRC suspension and the S1 connection is maintained.
2. The UE 101 reselects to a cell assigned to eNB-2 102b in which the RRC connection is not valid.
3. The UE 101 sends an 'augmented' mobility message to MME 103b, possibly via a temporary RRC connection with eNB-2 102b, or via other means not requiring establishment of a temporary RRC connection with eNB2 102b (middle rectangle).
4. On receipt of the mobility message, MME 103b sends a message to S-GW 103a to suspend the existing S1 connection between SGW 103a and eNB1 102a. Thus, the MME 103b and S-GW 103a have been implicitly informed that the RRC connection for UE 101 has been previously suspended and that the suspended RRC connection is currently invalid.
5. Data addressed to the UE 101 arrives from an external network 104 into the PGW 103c (not shown in FIG. 22).
6. The data is forwarded to the UE's SGW 103a via the established S5/8 bearer
7. The SGW 103a and MME 103b are aware that the RRC connection for this UE 101 is suspended and data is not able to be forwarded over the (suspended) S1-U connection. Hence the data is temporarily buffered by the SGW 103a.
8. The CN 103 (e.g. the MME 103b) checks its locally-stored validity status for the suspended RRC connection. For example, this may involve checking a location validity indicator or a timer-based validity indicator as previously described
9. The CN 103 (e.g. MME 103b) determines that the suspended RRC connection is not valid.
10. The MME 103b invokes normal idle-mode RRC connection establishment procedures:
    a. The MME 103b sends a paging request to eNBs 102a,b . . . n within the currently-known tracking area location of the UE 101.
    b. eNBs 102a,b, . . . n in receipt of the paging request send a paging message within cells under their control. The paging message identifies the UE 101 they are attempting to contact.
    c. The UE 101 responds to the page in the cell in which it is currently camped. The UE 101 responds to the page in the normal way by initiating a normal RRC connection establishment procedure.
    d. The eNB-2 102b (in conjunction with the MME 103b) establishes a new RRC connection with the UE 101 and S1-U and S1-MME bearers are set up between eNB2 102b and the SGW 103a and the MME 103b respectively
11. The data is transferred over the newly-established S1-U from the SGW 103a to the eNB-2 102b (note that the previously-stored and suspended S1-U may be released)
12. The user data is communicated from the eNB-2 102b to the UE via the Uu Example Scenario 4

FIG. 23 shows a message sequence chart representing a possible handling of the suspension of an RRC connection between UE 101 and a RAN 102. In this example suspension is requested by the UE 101 and accepted by the network. In this example the possibility of the eNB 102a sending the connection information to other eNBs (not shown) is also envisaged in step 10.

With reference to FIG. 23, the following describes the processing that occurs when the suspension request is made by the UE 101:

1. Initially the UE is assumed to be in RRC_CONNECTED state with security activated.
2. The UE detects that the RRC connection suspension criteria were met (e.g. either at higher layers, NAS or AS (e.g. RRC) based on the inputs from user plane entities or application entities, or based on inactivity timer expiry)
3. The UE RRC sends a newly proposed message RRC Connection Suspend Request (other message names may be used but the intent of the message is the same) to the eNB. In an alternative embodiment the UE sends the request message using MAC CE (control element) signalling.
4. It is acceptable to the eNB to suspend the RRC connection, this is determined either by,
    a. eNB is independently maintaining a suspension criteria which is met. This criteria may be based on aspects such as but not restricted to the following;
        The traffic activity and trends related to each UE and/or based on the traffic characteristics per Radio bearer or application as supported by the UE.
        Also alternatively or additionally use of local knowledge pertaining to the device, the application the application's operation or traffic type therein at the UE, eNB, S-GW MME or any other associated entity within the system.)
    and/or
    b. eNB requests (and receives) either one-off or periodic feedback from the MME/S-GW regarding the following:
        i. While the S1-U connection is being setup between S-GW and eNB for a UE, eNB can request for a periodic or threshold-based traffic activity report from S-GW for the UE. S-GW can subsequently provide the report to the eNB either periodically or based on the thresholds. Each report can be for a particular UE or for a group of UEs for which the report is solicited. The traffic activity report can contain details like data volumes and trends, active/inactive period statistics and traffic forecast related to each UE or other related entity such as per Radio Bearer or application as supported by the UE.
  ii. Alternatively S-GW can autonomously send periodic or threshold based reports to the eNB for every UE with a S1-U connection at a specified rate.
  iii. Alternatively when the criteria being maintained by eNB is met for a UE, it can request a one-off traffic activity report from the S-GW and make a suspension decision after evaluating the report from S-GW.
5. eNB prepares the source RAN to target RAN containers as it would do for an Intra-RAT handover, in order to establish the RRC parameters to store for the UE RRC connection suspension
6. eNB optionally stores these containers with appropriate UE identities attached so that it can be retrieved when required
7. eNB optionally sends the prepared containers to MME in a similar way as would be performed during an existing handover-via-S1 preparation stage with this additional UE identity (and or indication of use for RRC Connection suspension)[2]. These can be sent in a newly proposed explicit message 'UE Context Suspend Request' along with the eNB and MME UE identities to uniquely identify the UE.
  a. eNB can alternatively use one of the existing S1 messages for handover preparation with a special Information Element (IE) to indicate that the purpose of the message is for UE RRC connection suspension
8. MME stores the containers along with attached UE identities. MME either deletes the user plane session at S-GW or suspends it. S-GW acknowledges MME accordingly
9. MME acknowledges the UE context suspension to eNB
10. eNB optionally prepares the other eNBs in the vicinity or all eNBs in the tracking area over the X2-interface with the UEs context information. This is similar to the existing procedures defined in [3] for X2 handover preparation. Alternatively a new X2 message can be defined or an existing message used for handover can be modified for suspension purposes e.g. by the additional inclusion of UE identity or an indicator to show that the container is used for UE suspension.
  This step enables the neighbouring eNBs to be prepared for fast re-establishment of the UE RRC context should the UE move in to their coverage areas. During this preparation stage, it is proposed that eNBs shall also be provided with the suspension validity max timer (proposed in section 6.1.6) so that they can delete the stored UE context at the timer expiry.
11. eNB sends a newly proposed 'RRC connection suspend' message to the UE and releases the UE RRC radio resources after receiving a lower layer L2 RLC acknowledgement from the UE.
12. UE receives the connection suspend message and backs up and stores the same AS configuration as the eNB including the security configuration and releases the RRC connected state resources and entities. UE considers itself to be in an RRC_SUSPENDED state and configures its RRC protocol as if in RRC_IDLE (but with the stored RRC context) and follows RRC_IDLE procedures including monitoring paging occasions and using UE based mobility procedures. In an amended embodiment of this proposal the paging cycle used by the UE in RRC_SUSPENDED may be different to that of RRC_IDLE. This may, for example, be to ensure the UE detects a page indicating user plane data sooner, by using a shorter paging occasion, this is in order to satisfy the application QoS for the delivery latency of these packets.
13. In one alternative embodiment, the UE would transmit a flag in the UE capabilities message (this message is described in 3GPP TS 36.331) to indicate that the UE prefers an RRC Connection to be released in case the eNB chooses not to suspend the RRC connection. If acceptable to the eNB, it can then follow the RRC Connection Release procedure (refer section 5.3.8 of TS 36.331) instead of suspending the RRC Connection by way of the RRC Connection Suspension procedure or leaving the UE with some or all of its RRC Context whilst behaving as if in RRC IDLE or alternatively as if not in RRC Connected.

Example Scenario 5

Figure 24:
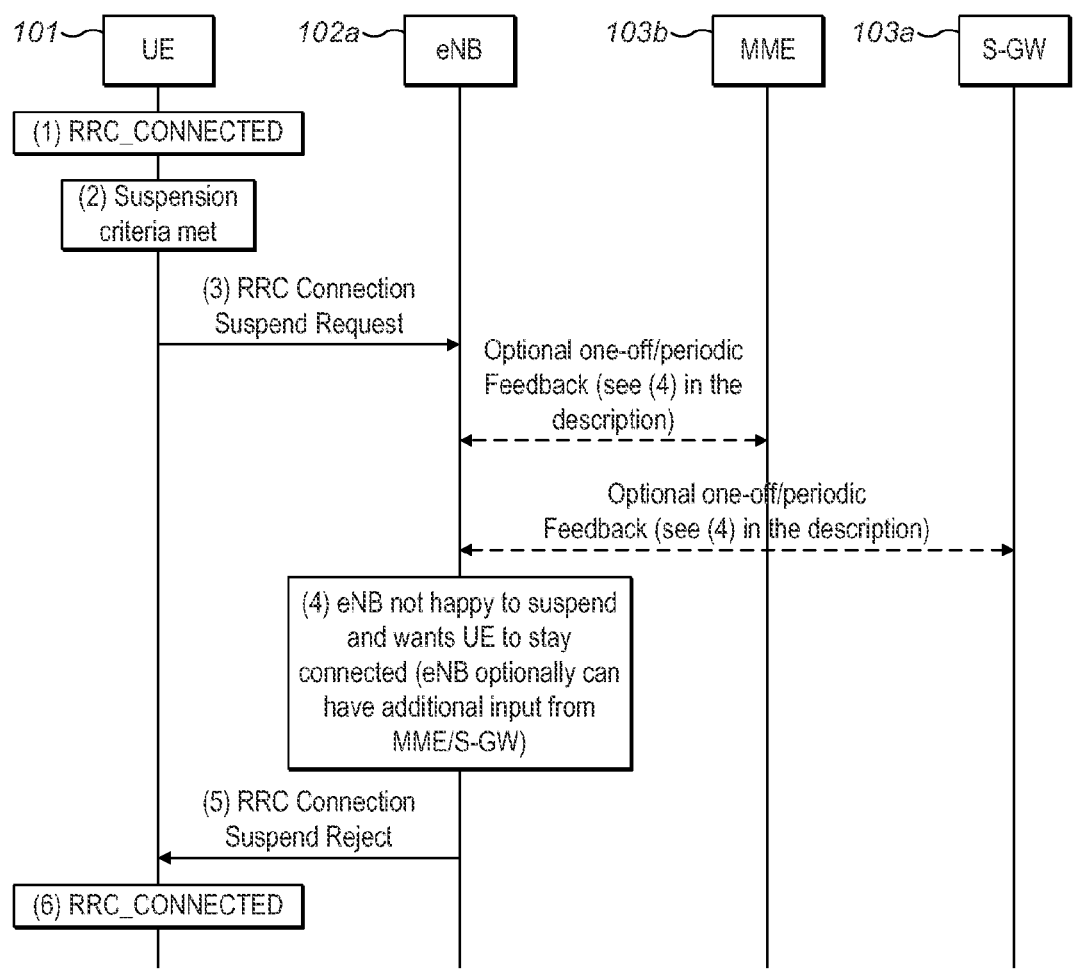
FIG. 24 shows a message sequence chart illustrating the method of handling an RRC connection suspension in Example Scenario 5.

FIG. 24 shows a message sequence chart representing a possible handling of a suspension request made by the UE 101 of an RRC connection between UE 101 and a RAN 102. In this example suspension is not accepted by the network and the network decides to keep the UE in connected mode.

With reference to FIG. 24, the following describes the processing that occurs when the suspension request is made by the UE 101.
1. Initially the UE is assumed to be in RRC_CONNECTED state with security activated.
2. The UE detects that the RRC connection suspension criteria were met (e.g. either at higher layers, NAS or AS (e.g. RRC) based on the inputs from user plane entities and application entities or based on inactivity timer expiry)
3. The UE RRC sends a newly proposed message RRC Connection Suspend Request (other message names may be used but the intent of the message is the same) to the eNB. In an alternative embodiment the UE sends the request message using MAC CE (control element) signalling.
4. It is not acceptable for eNB to suspend the RRC connection. This could result because of one or more of the following reasons:
  a. eNB is independently maintaining a suspension criteria (as described in section 6.1.1 for step 4a) which is not met; and
  b. eNB requests (and receives) either one-off or periodic traffic report feedback from MME/S-GW.
5. The eNB sends an RRC Connection suspend reject message
  a. Optionally the eNB can indicate a back-off or prohibit timer to the UE so that the UE should not retry the suspension request whilst the timer is running
  b. In an alternative embodiment the eNB sends no response message to the UE, in which case the UE may have a hard coded back off or prohibit timer which, whilst running, prevents a further transmission of an RRC Connection Suspend Request
6. The UE continues to remain in RRC_CONNECTED state Example Scenario 6

Figure 25:
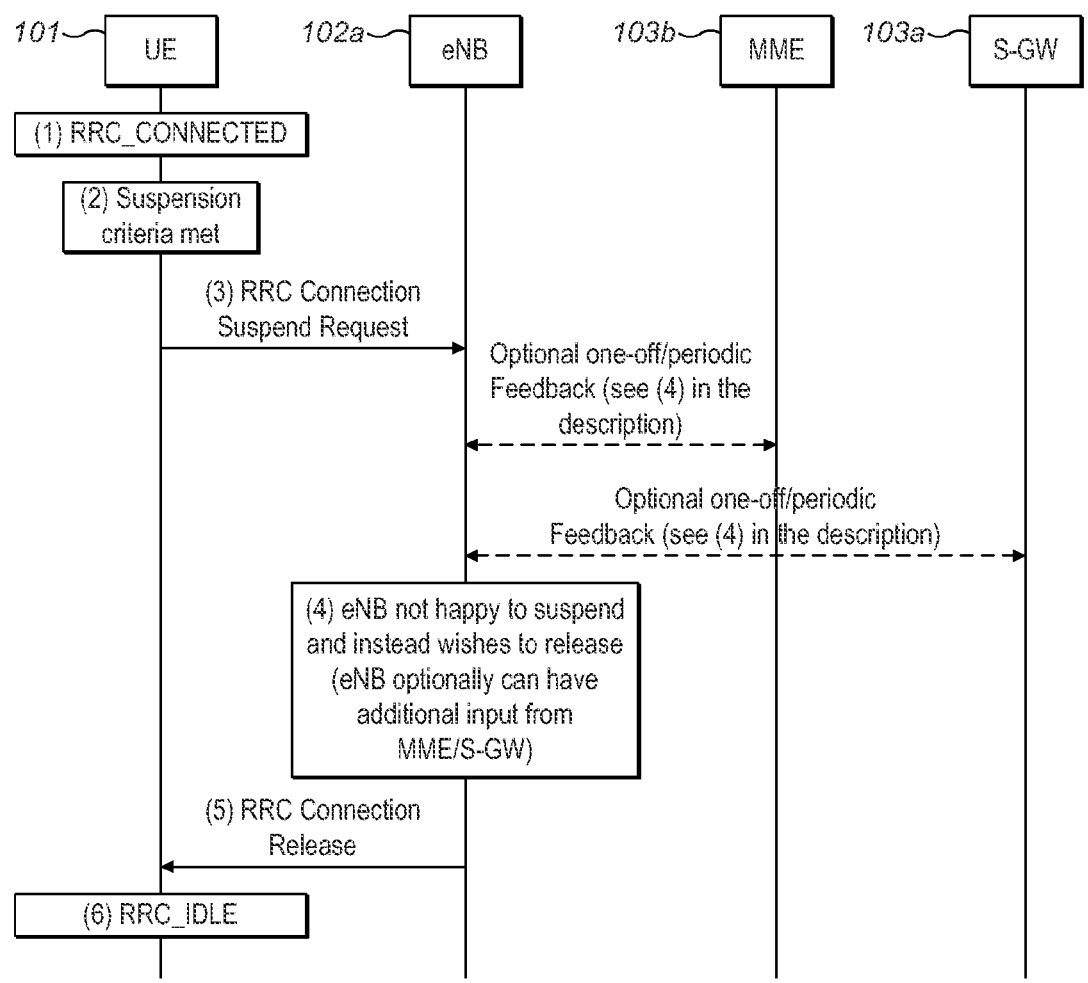
FIG. 25 shows a message sequence chart illustrating the method of handling an RRC connection suspension in Example Scenario 6.

FIG. 25 shows a message sequence chart representing a possible handling of a suspension request made by the UE 101 of an RRC connection between UE 101 and a RAN 102. In this example suspension is not accepted by the network and the network decides to transition the UE to idle mode.

With reference to FIG. 25, the following describes the processing that occurs when the suspension request is made by the UE 101.

1. Initially the UE is assumed to be in RRC_CONNECTED state with security activated.
2. The UE detects that the RRC connection suspension criteria were met (e.g. either at higher layers, NAS or AS (e.g. RRC) based on the inputs from user plane entities and application entities or based on inactivity timer expiry)
3. The UE RRC sends a newly proposed message RRC Connection Suspend Request to the eNB. In an alternative embodiment the UE sends the request message using MAC CE (control element) signalling.
4. It is not acceptable for eNB to suspend the RRC connection and instead the eNB chooses to release the RRC connection, this could result because of one or more of the following reasons:
    a. The eNB is independently maintaining release criteria which are met;
    b. The eNB requests and gets either one-off or periodic traffic report feedback from MME/S-GW;
    c. The eNB determines that it does not want the UE to go to RRC_SUSPENDED for example due to impending DL user plane data transmission or by way of internal Radio Resource Management (RRM) policy; and
    d. The eNB does not support the functionality and has a policy to release the RRC connection when incomprehensible messages are received from the UE.
5. The eNB sends an RRC Connection Release message
6. The UE receives the message and leaves RRC_CONNECTED state moving to RRC_IDLE state.

Example Scenario 7

Figure 26:
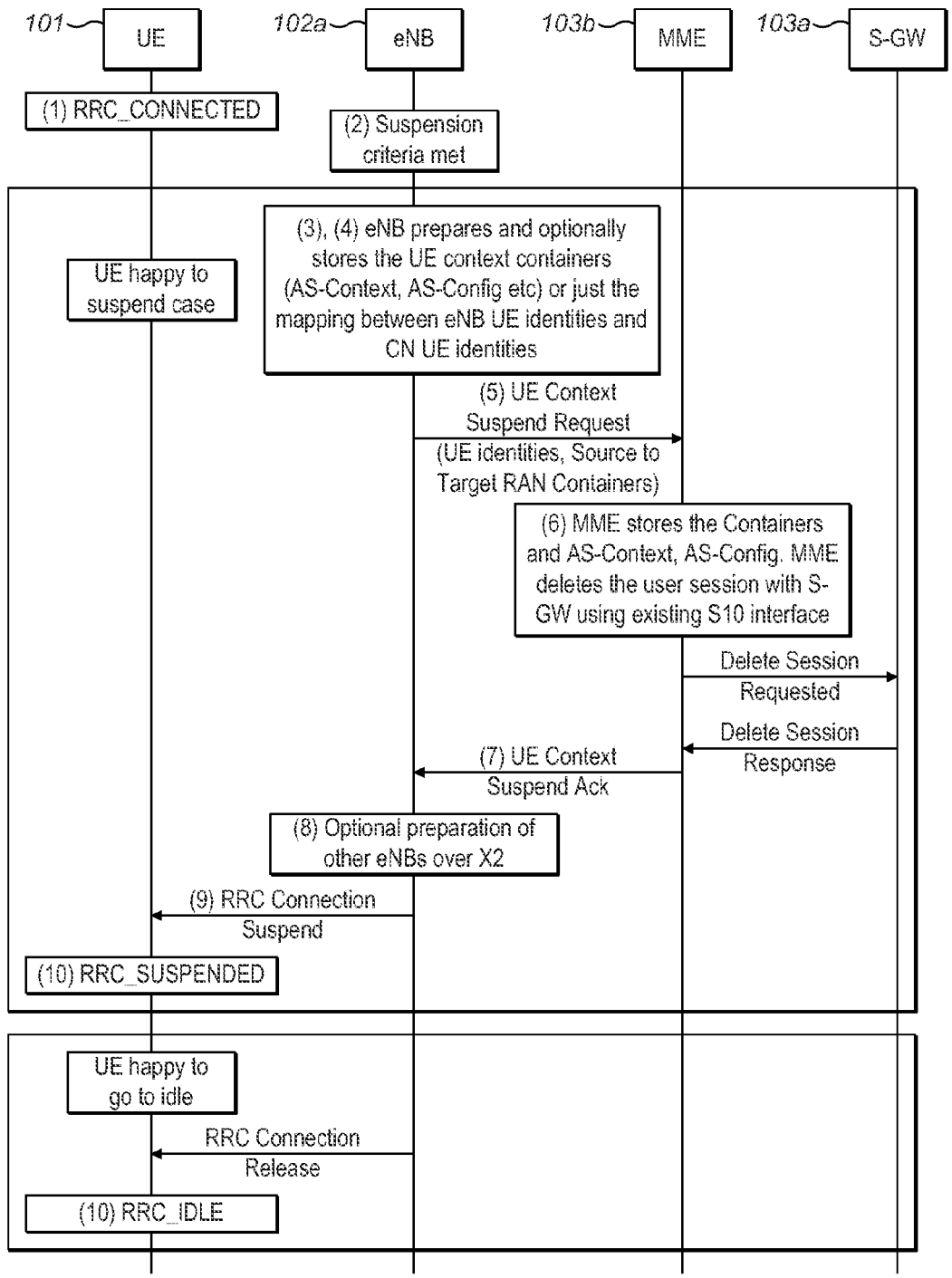
FIG. 26 shows a message sequence chart illustrating the method of handling an RRC connection suspension in Example Scenario 7.

FIG. 26 shows a message sequence chart representing a possible handling of a suspension request made by the eNB 102a of an RRC connection between UE 101 and a RAN 102. In this example the UE 101 agrees to have the connection suspended.

With reference to FIG. 26, the following describes the processing that occurs when the suspension request is made by the UE 101.

1. Initially the UE is assumed to be in RRC_CONNECTED state with security activated.
2. The eNB detects that the RRC connection suspension criteria were met, this could result for example because:
    a. The eNB is independently maintaining suspension criteria which are met and/or
    b. The eNB requests (and receives) either one-off or periodic feedback from MME/S-GW
3. The eNB prepares the source RAN to target RAN containers as it would do for an Intra-RAT handover
4. The eNB would optionally store these containers with appropriate UE identities attached so that it can be retrieved when required
5. The eNB optionally sends the prepared containers to the MME in a similar way as would be performed during an existing handover-via-S1 preparation stage. These can be sent in a newly proposed explicit message 'UE Context Suspend Request' along with the eNB and MME UE identities to uniquely identify the UE.
    a. The eNB can alternatively use one of the existing S1 messages for handover preparation with a special IE to indicate that the purpose is for UE RRC connection suspension
6. The MME stores the containers along with attached UE identities. The MME either deletes the user plane session at the S-GW or suspends it. The S-GW sends an acknowledgement to the MME accordingly
7. The MME acknowledges the UE context suspension to the eNB
8. The eNB 102a optionally prepares the other eNBs in the vicinity or all eNBs in the tracking area with the UEs context information over the X2-interface. This is similar to the existing procedures for X2 handover preparation. Alternatively a new X2 message can be defined or an existing message for handover sequence can be modified for suspension purposes. During this preparation stage, it is proposed that eNBs shall also be provided with the suspension validity max timer (proposed in section 6.1.6) so that they can delete the stored UE context at the timer expiry.
9. The eNB sends a newly proposed 'RRC Connection Suspend' message to the UE and releases the UE context from the connected state after receiving a lower layer L2 RLC acknowledgement from the UE.
10. The UE receives the RRC Connection Suspend message and based on its internal criteria check is happy to suspend the RRC connection. UE backs up and stores the same AS configuration as the eNB including the security configuration and releases the RRC connected state resources and entities. The UE considers itself to be in an RRC_SUSPENDED state and configures its RRC protocol as if in RRC_IDLE (but with the stored RRC context) and follows RRC_IDLE procedures including monitoring paging occasions and using UE based mobility procedures.
    In an amended embodiment of this proposal the paging cycle used by the UE in RRC_SUSPENDED may be different to that of RRC_IDLE. This may, for example, be to ensure the UE detects a page indicating user plane data sooner, by using a shorter paging occasion, in order to satisfy the application QoS for the delivery latency of these packets.
11. In an alternative embodiment of this proposal, a scenario is envisaged wherein UE prefers RRC Connection Release in case of eNB initiated RRC connection suspension. It is proposed that the UE would transmit a flag in the UE capabilities that indicates whether UE prefers a RRC connection to be suspended or released if the suspension criteria are met on the network side. The eNB would then suspend/release the RRC connection accordingly.

Example Scenario 8

One possible alternative scenario to scenario 7 would be where upon receiving an RRC connection suspend message from the eNB, the UE does not want to comply with the eNB signal and instead decides to release the existing RRC connection and go to RRC_IDLE. This needs additional signalling between the UE and the eNB in the form of a subsequent 'RRC Connection Release Request' or "RRC Connection Release Indication". Alternatively the UE may send an RRC Connection Suspend Confirmation message with an additional indicator to indicate transition to RRC_IDLE and release of the RRC connection. An alternative embodiment would be for the UE to transmit a flag in the UE capabilities message to indicate that the UE prefers either an RRC connection to be suspended or released if the suspension criteria are met on the network side. The eNB would then suspend/release the connection accordingly (as shown in FIG. 26).

A further alternative upon receiving an RRC connection suspend message from the eNB is where the UE determines that it wants to stay in RRC connected. This UE based response to the network initiated RRC connection suspend is considered possible although does not adhere to the commonly-applied system principle of network-oriented control (i.e. alternative procedures instead allow the UE itself to determine the final outcome of the RRC state decision).

Although the UE 101 indicates its preference for suspension or release of the RRC connection in an indicator in a RRC Connection Release Request message or as a flag or some other form of indicator in a UE capabilities message, the eNB 102a does not have to follow this request. The eNB 102a can choose to ignore the request and choose another action instead.

Example Scenario 9

In one embodiment it is proposed that the MME acts as the anchor for RRC connection suspension and that a registered tracking area (TA) or groups of tracking areas (TAs) act as the boundary for suspension validity. Within the validity area, the UE would treat its suspended RRC connection context to be valid and the UE or network may initiate a reactivation. However other validity areas may be possible. These other validity areas may be explicitly configured by eNB or other network entities, either prior to or at the time of RRC connection suspension, additional signalling may also be required to inform the UEs of the parameters concerning a validity area (for example, a group of Cell global identities).

The reason for choosing registered TA (or TAs) as the suspension validity area may be multi-fold:

a. Any signalling related to RRC connection suspension continuation/resumption/release can be combined with the Tracking area update signalling which will anyway take place at a TA boundary. The additional signalling can be carried either by modifying the existing messages involved in the TAU procedure or additional new or existing RRC messages can be piggybacked over the same RRC connection established for TAU purposes.

b. The concept of a TA is already defined in the existing specifications and therefore adoption of TA requires no additional specification in terms of validity area definition at this time. Other validity boundaries may result in some increase in over the air signalling at the validity area boundaries. This is in addition to the mandatory TAU signalling that will anyway happen at TA boundaries.

c. A TAU procedure involves the UE, the eNB and the MME and hence will help the refresh of security configuration and other UE configuration (eg. Measurement configuration, dedicated configuration) at all the relevant entities, thus making it easy to continue with suspension based on the new configuration at the end of the TAU
   i. The base security used for deriving the Access stratum integrity protection and ciphering are based on Kenb which is derived at the UE and the MME and differs from eNB to eNB. Every time there is a connected state cell change (due to handover or reestablishment or now as proposed for suspension resumption) keys need to be derived for the new-eNB. The new keys will not be dependent on the new-eNB but also on the Kenb used on the source eNB and a network chaining counter. So a UE simply cannot resume a connection on any eNB by reusing the security context at the time of suspension. Instead the security context has to be refreshed in both the UE and the network entities. Thus refreshing of the security context (either with a new AS security context if new connection establishment is needed or with a modified AS security context if connection reestablishment was used) will allow the further connection resumption to be accomplished with lower signalling overhead.

To avoid UEs with suspended connections requesting for reactivation too quickly, it is also proposed to have an optional inhibit timer such as a 'Minimum Suspension Timer' which should be obeyed once the UE suspends an RRC connection. Whilst the timer is running, the UE is prevented from initiating a reactivation of the suspended connection. This parameter can be specified by eNB in UE dedicated signalling on a per UE basis or for all UEs simultaneously by sending common signalling in a system broadcast message. Alternatively this timer shall be configurable by the eNB semi-statically (from time to time) via a new RRC Information Element (IE) within an existing message or new RRC message, the value of which may be dependant on the QoS delay requirements of the sessions that were active at the time of suspension. However the UE need not respect this timer for all instances, for example the timer may be overridden when initiating an emergency call.

In a similar way, an optional maximum timer can be specified after which a suspended connection ceases to be active. Upon expiry of such a timer, the UE and/or eNB could delete the stored UE context information and consider the suspended connection to be released, and the UE to be in normal RRC IDLE mode.

The UE may indicate its support for connection suspension in a UE capabilities message transferred from the UE to the network where as the network will indicate its support for connection suspension in the broadcast system information.

S1-U Behaviour

In the case of both UE-initiated and eNB initiated RRC suspension procedures, the MME may request the S-GW to either suspend or delete the S1-U for the UE between S-GW and the serving eNB. In either of these cases, the downlink traffic destined for the UE will be buffered at the S-GW which will then have to request the MME to page the UE. In response to the paging, once the UE contacts the MME, it will then have to create or resume the S1-U session for the UE between the S-GW and the now-serving eNB.

If the MME is responsible for paging the UE then it would potentially need to page the UE in all the cells belonging to the registered tracking area of the UE. This can increase the paging load of the system as a whole. To manage the paging load there are several schemes as known to those expert in the field such as:

the shortest-distance-first scheme (MME first pages in the last known eNB location of the UE and other locations will be paged if it elicits no response from the UE), sequential paging (Paging for the UE sequentially in a different sub-set of eNBs each time).

Two solutions are proposed here to manage the paging load of the system.

In a first solution, the MME stores the identity of the eNB which informed the UE context suspension. As proposed previously, the S1-U session would subsequently be suspended or deleted. If a need to page the UE arises, the MME can resort to the shortest-distance-first paging scheme, by using the stored eNB identity as the last known location of the UE. If this elicits a response from the UE that would save the MME from performing a blanket paging for the UE, in all cells of the TA.

In a second solution, it is proposed that at the time of RRC Connection Suspension, the MME shall keep the S1-U session of the UE active between the S-GW and the eNB. In this scenario the downlink user data reaches the eNB on which the RRC Connection was originally suspended. on arrival of the downlink data, this eNB then pages the UE thus reducing the system paging load. If the eNB does not receive any response for the paging, it may then escalate the paging requirement to the MME which will then page the UE across all the other eNBs.

Mobility Procedures

Upon suspension of the UE's RRC connection, the UE may perform mobility procedures as if it is an idle mode UE. For cell reselections within the validity area, the UE may not be required to perform any additional signalling until the UE, eNB or MME wishes to resume (or reactivate or re-establish) the RRC connection.

The terminology of new-MME and new-eNB is used herein to indicate an MME and an eNB respectively on which a UE with a suspended RRC context initiates signalling either for mobility purposes or for RRC connection reactivation purposes. These new-MME and new-eNB may be the same as the MME or eNB serving the UE when the RRC connection was suspended or may be a different eNB and/or MME.

Figure 27:
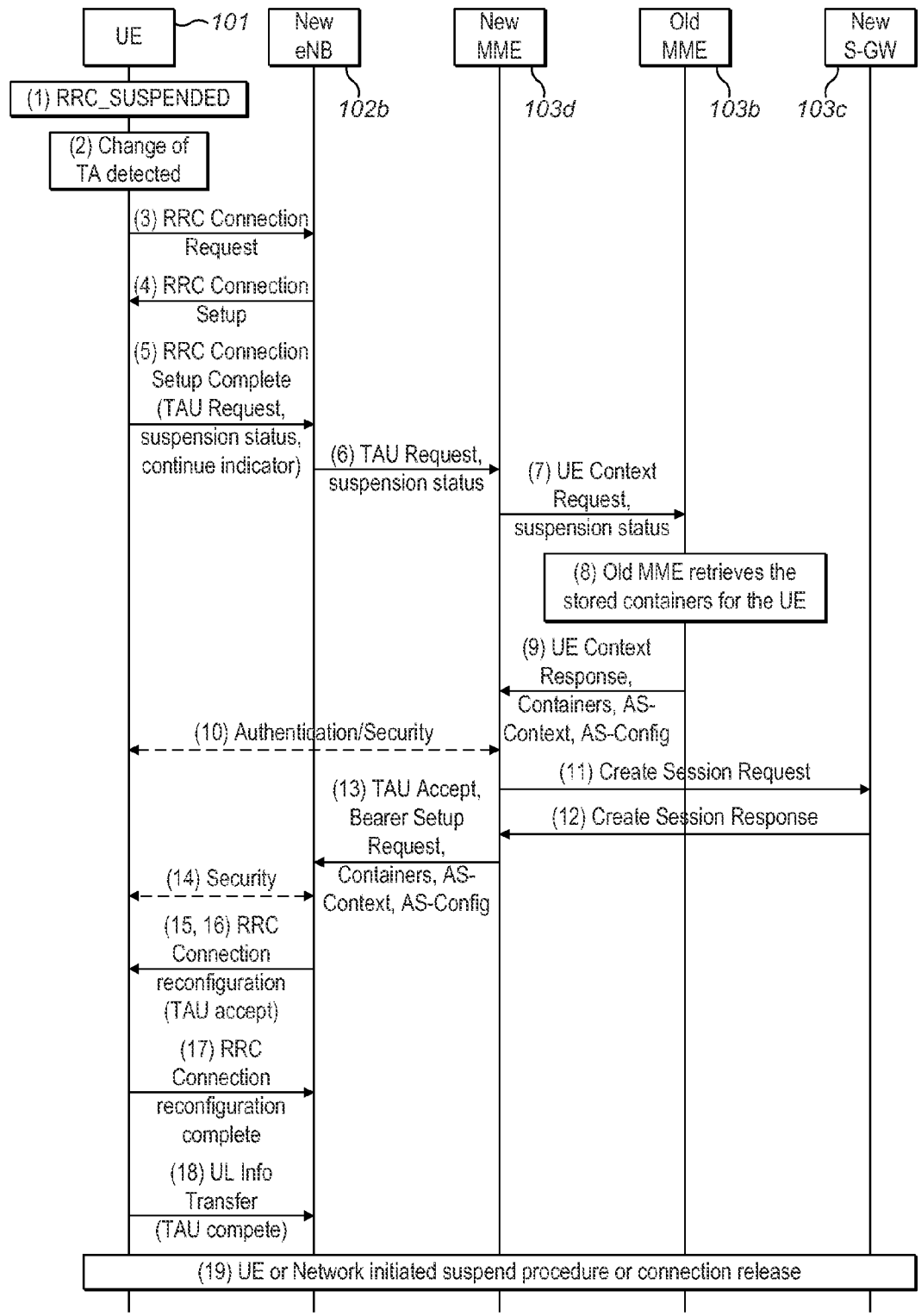
FIG. 27 shows a message sequence chart illustrating an example of a representative scenario for mobility procedures.

If a UE 101 finds itself outside of the suspension validity area boundary (e.g. one or more TAs), the UE shall perform a tracking area update as per the existing specifications. One representative scenario is depicted in FIG. 27. The details of possible actions in the above sequence are as follows:

1. The UE 101 has a valid suspended RRC connection (e.g. the UE is located in the TA(s) where the RRC connection suspension took place) and is following idle state mobility procedures.
2. Due to its mobility, the UE detects that it is on a cell which requires a TAU procedure to be performed. The UE also detects that the suspended RRC connection is no longer valid and hence locally invalidates the stored RRC context.
3. The UE 101 sends an RRC connection request with cause Mobile-Originated (MO) signalling
4. The eNB 102b sends an RRC connection setup in order to establish the Signalling Radio Bearer (SRB1)
5. The UE 101 sends an RRC connection setup complete message within which an initial NAS message is contained. The initial NAS message in this case will be a TAU request.
   a. Optionally a flag may also be included such as 'RRC connection suspension status' indicating that the UE previously had a suspended connection. This flag may either be added as a part of RRC signalling (e.g. RRC Connection Setup Complete) or as part of NAS signalling (e.g. TAU).
   b. Optionally, along with or instead of the IE 'RRC connection suspension status', the UE may include another flag such as 'RRC suspension continue' to indicate the desire to remain suspended after the TAU. The eNB can initiate the suspension procedure accordingly.
6. The eNB 102b forwards the TAU request to a new MME 103d and optionally the 'RRC connection suspension status'.
   a. The new eNB 102b will include the suspension status, if it wishes to retrieve the suspended RRC configuration from the old MME 103a. This suspended RRC configuration may help the new-eNB to minimize the Over-The-Air (OTA) signalling by transmitting only a differential configuration to the UE.
   b. The new eNB 102b will not include the suspension status if it wishes to provide a completely new RRC configuration to the UE, independent of the previous suspended configuration.
7. As is the case for a normal TAU, the new MME 103d retrieves the UE context from the old MME 103b using a UE Context Request message.
   a. If received from the UE the new eNB 102b may send a corresponding 'RRC connection suspension status' flag which will optionally be added to this UE Context Request as sent to the old MME 103b from the new-MME 103d
8. The old MME retrieves the UE context as requested by the new MME. If the 'RRC connection suspension status' flag indicates a previously suspended RRC connection, it will also retrieve the stored container available for this UE. Either after a guard timer expiry or upon confirmation from HSS that the UE location has changed, the old MME 103b will indicate to the old S-GW (not shown) to delete the S1-U session of the UE 101. Upon the deletion confirmation from the old S-GW, the UE context will be deleted at the old MME 103b.
9. The old MME 103b provides the suspended UE context and optionally the containers to the new MME 103d as a part of 'UE context response'
   a. The existing 'UE context response' message (as used during TAU) has to be extended to accommodate the newly proposed optional containers related to the previously suspended RRC connection.
10. The new MME optionally performs NAS level authentication and security procedures.
11. The new eNB 102b creates a UE session with a new S-GW 103c using a 'Create session request' message. If there is no change of S-GW, it will instead be modifying an existing session.
12. The new S-GW 103c acknowledges the session creation
13. The new MME 103d provides the new eNB 102b with the TAU accept as well as the newly proposed optional containers received from the old MME. The MME also provides the security configuration required to derive the keys for the AS security procedure. A Bearer setup request may also optionally be issued by the new MME to the new eNB requiring it to setup a user plane data bearer for the UE.
14. The new eNB performs an AS security activation procedure with the UE
15. The eNB optionally decodes the containers containing the suspended configuration and will deduce the new differential reconfiguration that needs to be issued to the UE
    a. Optionally the eNB may ignore the suspended configuration and may independently derive a full new configuration that needs to be issued to the UE.
16. The eNB sends an RRC reconfiguration message to the UE which contains the measurement configuration and the dedicated radio resource configuration. The TAU accept can be piggybacked onto this message
    a. Optionally the eNB may locally refresh the RRC configuration and perform the remaining TAU procedure on SRB1 itself.

b. Optionally the eNB may include a newly proposed flag in the RRC reconfiguration message to indicate whether the configuration being provided is 'full-config' or 'differential config'. Accordingly the UE is able to understand whether it should delete the suspended configuration or reuse it (along with the differential updates) to derive the new configuration.

c. Optionally a mandatory default behaviour can be specified in the standard as to whether the received configuration from the eNB should be treated as a full-config or differential-config.

17. The UE applies the received configuration and sends an RRC connection reconfiguration complete message to the eNB.
18. The UE sends a TAU complete message to the eNB which gets forwarded to the new-MME.
19. From this point onwards the RRC connection can again be suspended based on the suspension procedures described above. For example, the eNB may initiate a suspension based on the 'RRC suspension continue' flag provided in step 5 above.

Example Scenario 10

UE initiated RRC Connection reactivation within a validity area (either autonomously or in response to receipt of a paging signal for downlink data) may be achieved by means of RRC Connection Reestablishment signalling. RRC Reestablishment signalling procedures are currently defined for E-UTRAN for quickly resuming the RRC connection and restarting the AS security in the case of handover failures or radio link failures (RLF). The reestablishment procedures allow cells with prepared UE RRC connection data or RRC contexts (the UE context is provided by the previous serving eNB over the X2 interface) to resume signalling and dedicated radio bearers (SRBs and DRBs) in the UE based on its previously configured UE context. Modification to the SRBs, DRBs, measurement configuration and security configuration by the new-eNB, before resumption, is also possible by means of the reestablishment procedure.

Because the RRC Connection Reestablishment procedure does not involve NAS level signalling and optionally security activation signalling over the air, it is much lighter in terms of required signalling than a regular idle to connected mode transition. The other advantage is that a eNB on which the connection is being resumed can make use of the optionality of various fields and hence minimize the size of the over the air signalling for the measurement and radio resource configurations during the reestablishment procedure.

With reference to FIG. 28, to extend this procedure for RRC connection resumption the following enhancements need to be made.

1. At the time of RRC connection suspension, the serving eNB either,
   a. Stores a full back-up of the containers it has sent to the MME along with the corresponding eNB and MME identities associated to the UE at the time the suspension took place, or
   b. stores the eNB and MME identities of the UE, associate a suspension status with them and forward the actual containers along with the eNB and MME identities of the UE to the MME.
2. The serving eNB can optionally prepare either some eNBs in the vicinity (as it does for the case of X2-handover) or possibly all the eNBs under the MME (or within the validity area such as the Tracking Area (TA)) with the UE context and any other information required for a connection reestablishment on any one of those eNBs. The preparation is tagged with a 'suspension indicator' flag to indicate to the target eNB that the preparation is actually for a suspended RRC connection.
3. Optionally the X2 interface protocol may be enhanced such that based on the old eNB credentials provided in the 'RRC connection reestablishment request', the new-eNB will be able to identity and query the old eNB for the UE context. If available the Old eNB may provide the UE context to the new-eNB in a similar manner as used during a X2 handover preparation. Alternatively the Old eNB may be able to query the MME for the UE context as it does during a TAU using the UE identities and the suspension indicator. The new-eNB may indicate to the old eNB that this is for a suspended RRC connection.

The details of possible actions in the reestablishment procedure sequence for the purposes of connection reactivation are as follows:

1. Initially the UE considers its suspended RRC connection to be valid
2. The UE detects the need to resume the RRC connection either due to the arrival of data pending uplink transmission or due to reception of paging from the network.
3. On its current camped cell within the validity area, UE sends an RRC connection reestablishment request with a new cause indicating reactivate' or new IE to indicate the reactivation of a suspended RRC Connection or context. It may include some or all the details as per the regular reestablishment request message structure (3GPP TS 36.331). The details of C-RNTI and Source PhysicalCellIdentity shall be those that relate to the cell/eNB on which the RRC connection was originally suspended. Short MAC-I derivation is as per the usual procedure (refer to section 5.3.7.4 of 3GPP TS 36.331) however using the parameters relating to the cell/eNB on which the RRC connection was originally suspended.
4. The new-eNB detects the reestablishment cause as 'reactivate' (or the RRC Connection Reestablishment request message includes a new IE to request the reactivation of a suspended RRC connection)
   a. Either it has a stored UE context available (the new-eNB 102b may be the same as the old eNB on which the connection was originally suspended or may be one of the eNBs that have been prepared by the old eNB 102a) or
   b. Based on the source cell details provided by the UE, the new-eNB 102b is able to retrieve the suspended UE context from the old eNB 102a over an X2 interface using a new or modified message.
5. The old eNB 102a has either the stored UE context available or it is able to retrieve this context from the MME 103b using the stored UE identities (in the same way as it retrieves UE context for S1 handovers).
6. The old eNB 102a provides to the new eNB 102b the UE context (containers with AS-Config containing the suspended RRC context and AS-Context containing the information to re-establish the RRC connection on the new-eNB).
7. The new-eNB 102b uses the received information to validate the security context of the UE 101 and sends an RRC Connection Reestablishment message to the UE for SRB1 resumption and new security key derivation.
8. The UE resumes SRB1, derives new security keys and sends an RRC Connection Reestablishment Complete message to the new-eNB.

9. The new-eNB 102b sets up the UE session with the MME 103b following the S1 path switch as it would do in case of a regular RRC connection reestablishment.
   a. The MME 103b in turn creates a user plane session for the UE with the S-GW 103a if the S1-U was deleted earlier
   b. The MME facilitates a regular S1 path switch if the S1-U was kept active between the S-GW and the old-eNB on which the connection was originally suspended
   c. The MME may facilitate a S1 path switch but with an additional reactivate indicator to the S-GW if the S1-U was suspended at the time of suspension
10. The new-eNB sets up SRB2 and DRB configurations and measurement configuration and sends an RRC Connection Reconfiguration message to the UE.
11. The UE applies the received configuration, reactivates SRB2 and DRB, and transmits an RRC Connection Reconfiguration Complete to the eNB. Thereafter the UE may proceed with any user plane date transfer as usual.

As an alternative to reuse of the reestablishment procedure for reactivation of a suspended connection, an equivalent procedure may be employed but which uses different messages or message definitions For example, a new RACH message3 and message 4 (see 3GPP TS 36.331) may be defined for the purposes of RRC connection reactivation request and RRC connection reactivation respectively and which could follow the same principles as those of reestablishment.

A further alternative option could be to resort to the regular RRC Connection Establishment procedure within the validity area too, thereby following the reactivation procedure described below (Example Scenario 12) in the validity area change case.

Example Scenario 11

Figure 29:
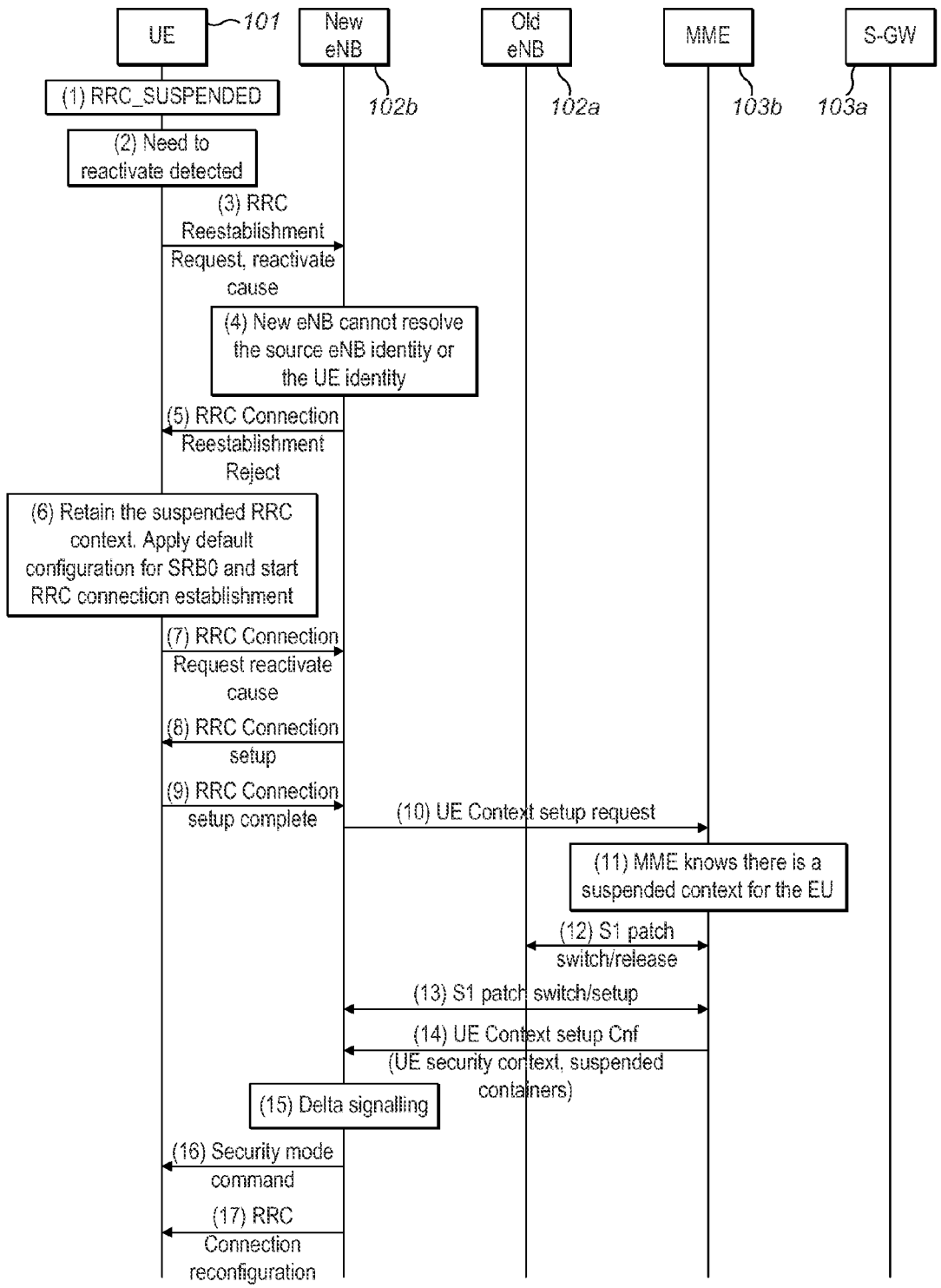
FIG. 29 shows a message sequence chart illustrating the method of handling an RRC connection suspension in Example Scenario 11.

FIG. 29 shows a message sequence chart describing the details of possible actions if the reestablishment procedure fails during the connection reactivation. The steps of FIG. 29 include:
1. Initially the UE 101 has a suspended RRC connection associated with a cell under the control of old eNB 102a.
2. The UE detects the need to reactivate the RRC connection either due to the arrival of data pending uplink transmission or due to reception of paging from the network.
3. The UE 101 is camped on a cell under the control of new eNB 102b and which lies within the validity area. The UE sends an RRC connection reestablishment request with a new cause indicating 'reactivate' or a new IE to indicate the reactivation of a suspended RRC Connection or context towards a new eNB 102b. It may include some or all of the details that would be included within a regular reestablishment request message structure. The details of C-RNTI and Source PhysicalCellIdentity shall be those that relate to the cell/eNB 102a on which the RRC connection originally was suspended. Short MAC-I derivation is as per the usual procedure. However using the parameters relating to the cell/eNB 102a on which the RRC connection originally was suspended.
4. The new-eNB 102b either fails to resolve the UE identity to retrieve the prepared context or fails to uniquely identity the source eNB from which the UE context has to be retrieved.
5. The new-eNB 102b rejects the reestablishment request.
6. The UE 101 applies the default configuration for SRB0 whilst retaining the rest of the suspended UE context and starts a RRC connection establishment procedure.
7. The UE 101 transmits a RRC connection request message optionally identifying the setup cause as resume.
8. The new-eNB 102b sets up SRB1 for the UE and transmits RRC connection setup message to the UE.
9. The UE configures SRB1 and transmits a RRC connection setup complete message including an initial NAS message, for example: Service Request. UE also includes the UE identifiers and MME identifiers related allocated when the RRC connection got suspended.
10. The new-eNB 102b requests the designated MME 103b to setup a S1 context for the UE.
11. From the context request, MME 103b knows that it has stored containers pertaining to the suspended RRC context for this UE and retrieves the same.
12. MME 103b switches the S1 path from the old eNB 102a on which the connection was originally suspended to the new-eNB 102b.
13. If the S1 path switch is not possible, the S1 connection is released with old eNB 102a and is setup with the new-eNB 102b.
14. The MME 103b forwards the security context for the UE and the stored containers related to the suspended RRC connection.
15. The New-eNB 102b can now derive a delta configuration that needs to be signalled to the UE by comparing the known current configuration at the UE with the configuration desired by the new eNB 102b. Alternatively, new eNB 102b may also instruct the UE to throw away the suspended configuration and adopt a new configuration by setting the 'full config' IE.
16. The New eNB 102b transmits a security mode command to the UE and RRC connection reconfiguration message to the UE which will lead to the reactivation of SRB2 and other DRBs at the UE.

Example Scenario 12

Reactivation at a change in validity area boundary is based on the TAU procedure outlined above in the mobility procedures. The RRC connection required for performing the TAU procedure may be established following a normal RRC connection establishment approach.

The advantages of a regular RRC connection establishment procedure are that this allows:
   a. NAS and AS security to anyway be activated based on the base key of the new MME
   b. Bearer mappings and channel configurations to be modified as suited for the new MME/new-eNB
   c. Measurement contexts to be refreshed with the neighbour cell configurations suited for the new MME/new-eNB.

Thus this approach of reactivating the connection during a TAU procedure comprises:
   a. Invalidating the suspended RRC connection and
   b. Setting up a new RRC connection (with full new-config or differential new config) via the TAU
   c. Retaining/suspending/releasing the new connection as desired once ongoing data transfer and signalling is considered complete The details of this approach are described above as part of the mobility procedures.

However, if establishment of a new RRC connection is deemed to be inefficient at TA boundaries (for example when UEs move between the TAs), the RRC connection reestablishment procedure may need to be modified to incorporate NAS signalling between SRB1 reactivation and SRB2/DRB reactivation. This procedure is similar to the reestablishment procedure described in scenario 11 above except that in this case the new-eNB is connected to an MME different to that to which the old-eNB is connected. Therefore during the initial reestablishment, the new-eNB will retrieve the UE RRC context from the old eNB via the X2 interface if available or from the old-MME via the new MME. New signalling messages to retrieve this context will be required between the MMEs and between the eNB and MME. Once the security activation and SRB1 reactivation phase of the reestablishment procedure is successful, regular TAU signalling can take place over the resumed SRB1. The TAU signalling can be used to reactivate/release/suspend the RRC connection at the end of the TAU in the same way as described above.

Example Scenario 13

There are numerous possible embodiments of the RRC suspend concept. In this scenario, an embodiment is described in which the objective is to maximise compatibility with existing system procedures and signalling messages, and thereby to minimise the specification work necessary to integrate the scheme within 3GPP LTE specifications.

The embodiment is based upon the following guiding principles:

Procedures for reactivation of a suspended RRC context are largely based on existing procedures for RRC re-establishment (and which are currently used for recovery from Radio Link Failure The S1 connection is not suspended during a Uu suspension. This avoids the need for signalling between the Radio Access Network and the Core Network each time a Uu connection is suspended or resumed (i.e. from the CN point of view, the UE remains in connected mode).

The UE always informs the RAN in the event that it reselects another cell whilst suspended. This avoids the need for paging escalation (via other eNBs, or via a wide area spanning multiple cells/eNBs) in the event that downlink data arrives at the eNB of the suspension cell, but the UE has since moved to another cell without notifying the network. There are two potential variants concerning this cell location notification:

i) The first alternative is for the UE to move to idle and to send a TAU via the new cell following a reselection. On receipt of the TAU, the MME is made aware that the UE is now idle and can initiate the release of the S1 to the old cell. If new data arrives for the UE beyond this point, a new RRC connection (and S1 connection) will be established (following network paging of the UE in the case of DL data arrival)

ii) The second alternative is for the UE to send a re-establishment request in the new cell following a reselection. The eNB of the new cell may then decide to perform operations similar to those used during handover in order to prevent the UE from moving back to full idle mode. If the eNB of the new cell is the same as that of the old cell, the UE context information is readily available within the eNB, hence the eNB can complete the re-establishment procedure with the UE without contacting other network nodes. If the eNB of the new cell is different to that of the old cell, the new eNB may attempt to fetch the UE context from the old eNB using existing X2 'forward handover' procedures ("RLF indication message" of 3GPP TS 36.423) introduced in 3GPP Release 9 for RLF recovery and the new eNB can complete the re-establishment procedure with the UE and can initiate an S1 path switch request to the MME per the normal handover procedure.

If re-establishment procedures fail (either when accessing the suspension cell or a new cell), or if they are rejected by the network, the UE resorts to NAS-based RLF recovery as per existing procedures, and hence returns to idle and sends a TAU via the currently camped cell. This will result in the establishment of a new RRC connection.

In order to implement the above embodiment, the following changes are required to the specifications:

1) A new "Suspend Request" message may be defined for uplink communications, thereby allowing the UE to request or initiate a suspension of the RRC connection. If suspension is purely network-triggered (without UE input to the decision), definition of this message is not required. The message may be a new RRC message, or may comprise a modification to an existing RRC message. The message may alternatively be conveyed at a MAC layer for example within a MAC control element (CE).

2) A "Suspend Command" message may be defined for downlink communications in order to allow the network to command a suspension of the UEs present RRC connection. In order to provide this functionality, an existing message (such as RRC release, or RRC reconfiguration) may be modified, or a new message may be defined. Alternatively the message may be conveyed at a MAC layer for example within a MAC CE.

Figure 30:
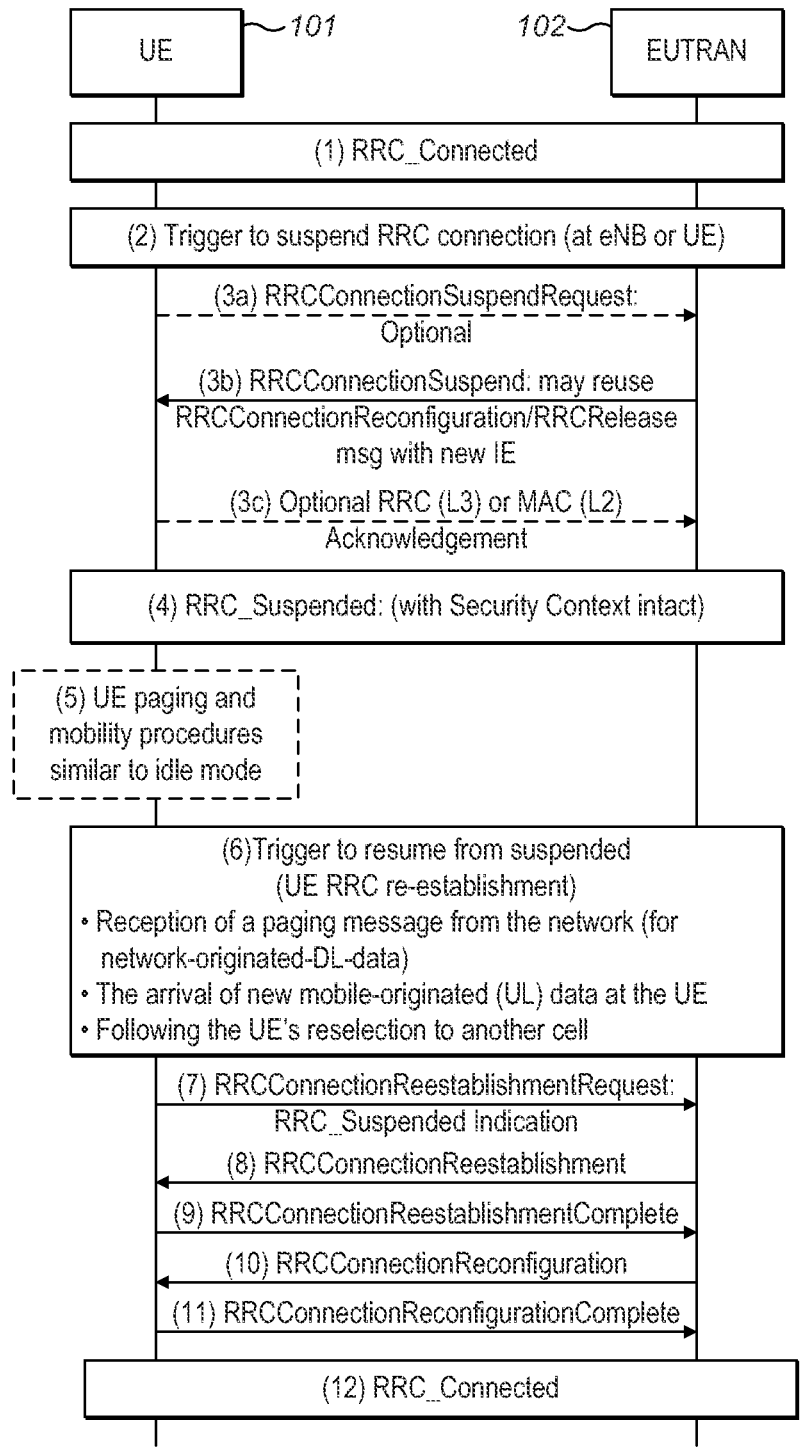
FIG. 30 shows a message sequence chart illustrating the method of handling an RRC connection suspension in Example Scenario 13.

3) New triggers for initiating RRC re-establishment are defined. When the UE's RRC connection is currently suspended, these include one or more of:
   a. Reception of a paging message from the network (for network-originated—DL—data)
   b. The arrival of new mobile-originated (UL) data at the UE
   c. Following the UE's reselection to any other cell FIG. 30 is a message sequence chart showing an over view of the above steps for RRC Connection Suspension followed by RRC Connection Re-establishment between a UE 101 and a EUTRAN 102.

1. Initially the UE 101 has an active (non-suspended) RRC connection with EUTRAN 102.

2. A trigger is generated at either the UE 101 or the EUTRAN 102 indicating that it would be preferable to suspend the RRC connection. This trigger may be generated by a suspension criterion or criteria being met at the UE or the EUTRAN, as discussed in the above examples.

3a. If the trigger is generated at the UE, the UE sends a connection suspend request message. In this example, the UE uses a new message (e.g. an RRC Connection Suspend Request message) to the EUTRAN. Other new or existing 3GPP messages could also be used for this purpose. If the trigger is generated at the EUTRAN the connection suspend request message is not sent by the EU and this step is omitted.

3b. On receipt of the RRC Connection Suspend Request message by the EUTRAN or the if the trigger is generated at the EUTRAN, the EUTRAN sends a connection suspend command message to the UE. In this example, the EUTRAN uses a new message (e.g. a RRC Connection Suspend command message) to the UE. In another example, the EUTRAN could use a modified form of an RRC Connection Reconfiguration message or a modified form of an RRC Release message as a connection suspend command message. In these cases the modified RRC Connection Reconfiguration message or modified RRC Release message would be modified so that the effect at the UE would be for the RRC connection to be suspended rather than reconfigured or released. This modification could for example include a new information element (IE) to indicate that the purpose is to suspend the RRC connection. For example, this new IE may be labelled 'Suspend RRC Connection', 'Suspend Command', 'Suspension Command', 'Suspend Indicator', 'Suspension Indicator' or something different. The new IE may be optionally present in the message and the presence of the IE in the message may cause the UE to suspend the RRC connection. Alternatively the new IE may be a Boolean value and the setting of the IE to TRUE may cause the UE to suspend the RRC connection. Other new or existing 3GPP messages could also be used for this purpose.

- 3c. Optionally, the UE may then send a RRC(L3) acknowledgement or a MAC(L2) acknowledgement to the EUTRAN
- 4. The RRC connection is then suspended with at least the security context being stored at the UE and/or the EUTRAN.
- 5. After the RRC connection has been suspended, paging reception and mobility procedures at the UE are similar to the procedures adopted by the UE when the UE is in idle mode (the UE monitors downlink signals for paging messages and performs UE-based mobility procedures (e.g cell reselection)).
- 6. To re-establish a suspended RRC connection a trigger to resume from suspend is generated at the UE or the EUTRAN. Typically, the trigger is generated at the UE and may be one of (i) reception of a paging message from the EUTRAN for network-originating downlink data for the UE; (ii) the generation at the UE of new mobile-originated uplink data; or (iii) following the UE's reselection to another cell. Other triggers as described above are possible as well.
- 7. On generation of the trigger, the UE sends a connection re-establishment request message. In this example, the UE sends a RRC Connection Reestablishment Request message with a RRC Suspended Indication to the EUTRAN. The RRC Suspended Indication may be contained within a reestablishment cause field of the RRC Connection Reestablishment Request message.
- 8. The EUTRAN then responds with a connection re-establishment command message. In this example, the EUTRAN sends a RRC Connection Reestablishment command message to the UE.
- 9. When the RRC connection has been re-established, the UE sends a connection re-establishment complete message to confirm the RRC connection has been re-established. If a RRC Connection Reestablishment command message is used as the connection re-establishment command message, the UE sends a RRC Connection Reestablishment Complete message to the EUTRAN. Optionally (and possibly as an alternative to using a RRC Connection Reestablishment command message shown in step 8 above), the EUTRAN may also respond with a RRC Connection Reconfiguration message. In a scenario where, the EUTRAN would use the RRC Connection Reconfiguration message instead of a RRC Connection Reestablishment command message as the connection reestablishment command message. In that example, the EUTRAN could use a modified form of the RRC Connection Reconfiguration so that the effect at the UE would be for the RRC connection to be re-established. This modification could for example include a new information element (IE) to indicate that the purpose is to re-establish the RRC connection. For example, this new IE may be labelled 'Suspended RRC Connection', 'Suspend Indicator', 'Suspension Indicator' or something different. The new IE may be optionally present in the message and the presence of the IE in the message may cause the UE to re-establish the RRC connection. Alternatively the new IE may be a Boolean value and the setting of the IE to TRUE may cause the UE to suspend the RRC connection. Other new or existing 3GPP messages could also be used for this purpose.
- 11. If a RRC Connection Reconfiguration message is received at the UE, the UE then responds to that message with a RRC Connection Reconfiguration Complete message. The UE would use the RRC Connection Reconfiguration Complete message as a connection reestablishment complete message. Other new or existing 3GGPP messages could also be used for this purpose.
- 12. At this point, the RRC connection is fully re-established and user plane data communication with the UE may be initiated or resumed.

Figure 31:
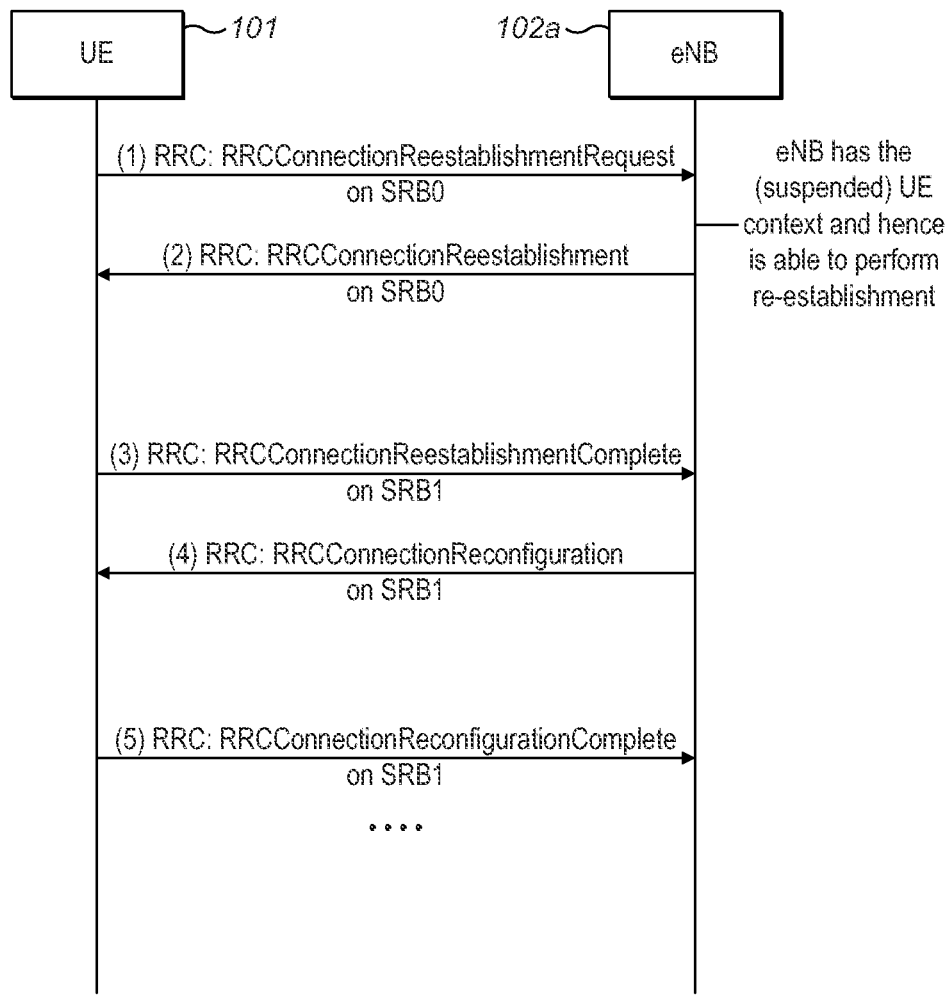
FIG. 31 shows a message sequence chart illustrating the method of handling an RRC connection suspension in Example Scenario 14.
Figure 32:
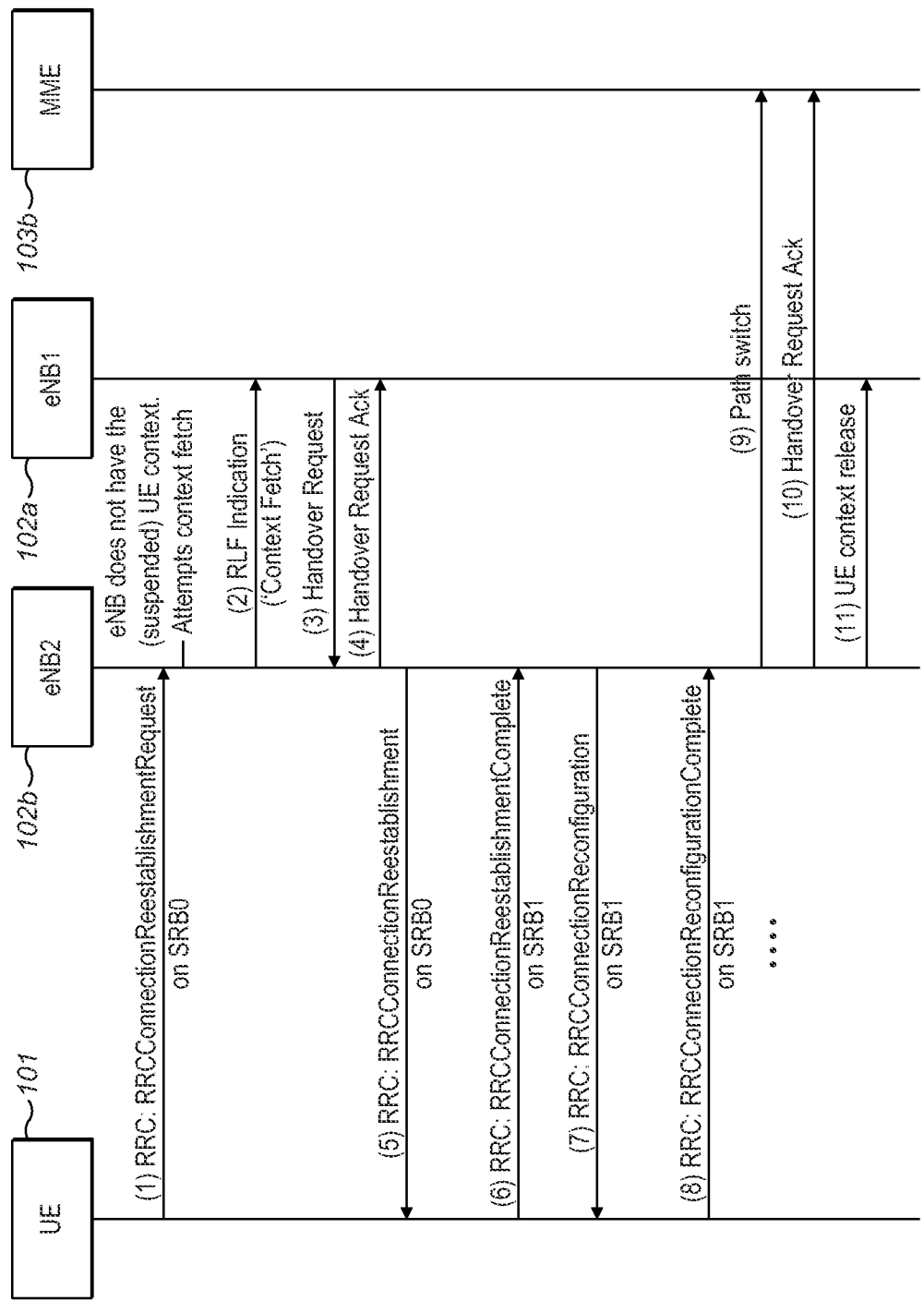
FIG. 32 shows a message sequence chart illustrating the method of handling an RRC connection suspension in Example Scenario 15.
Figure 33:
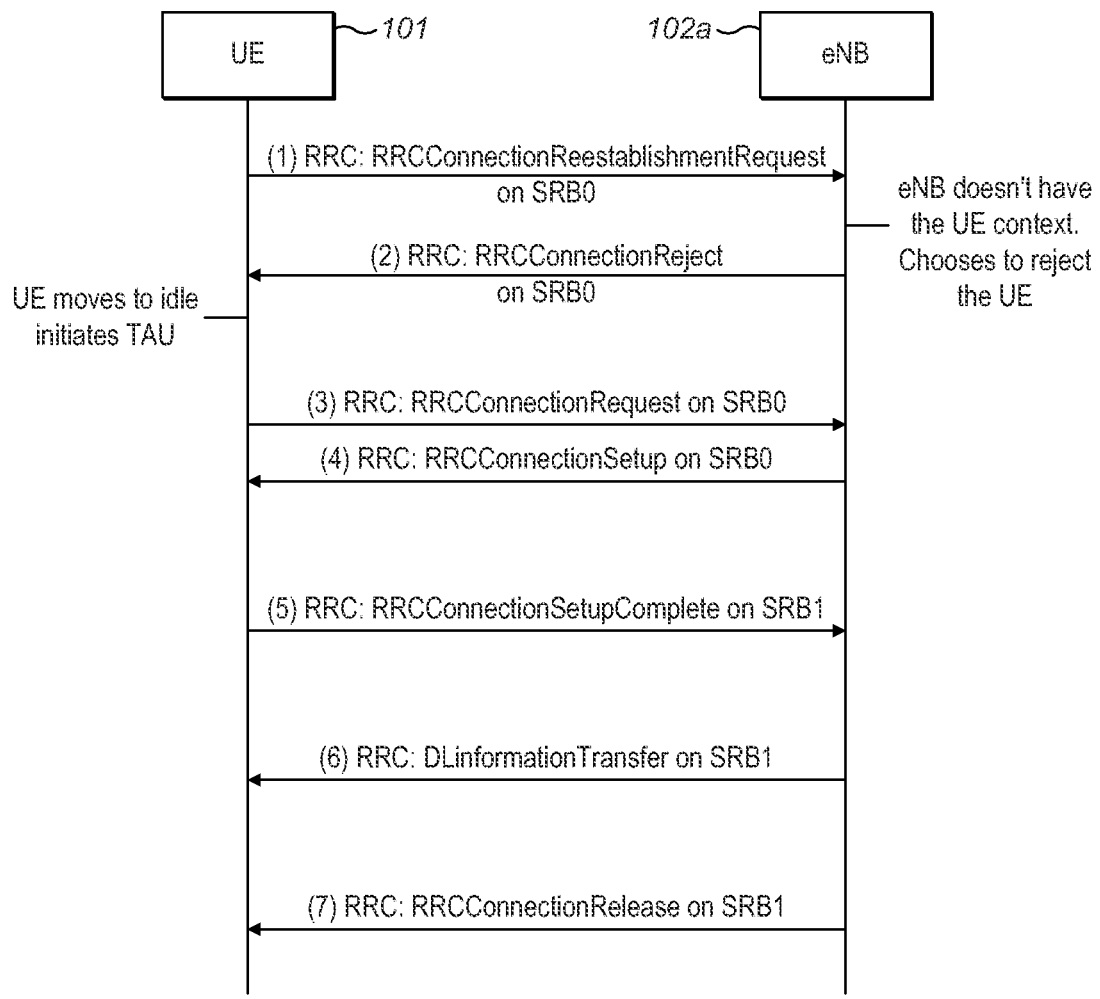
FIG. 33 shows a message sequence chart illustrating the method of handling an RRC connection suspension in Example Scenario 16.

The example scenarios 14 to 16 below and the respective FIGS. 31 to 33 give more detailed examples of specific scenarios within the general scenario discussed above in scenario 13 and shown in FIG. 30.

Example Scenario 14

FIG. 31 shows a message sequence chart for re-establishment of a UE 101 from suspend on an eNB 102a that has the RRC connection information or context for the UE 101. The eNB 102a may be the eNB that suspended the RRC connection or it could be a different eNB.

- 1. When a trigger is generated at the UE 101 for re-establishment of a suspended RRC connection, the UE sends a RRC Connection Reestablishment Request message to the eNB 102a. The Reestablishment Request message may contain a reestablishment cause field allowing the UE 101 to indicate to eNB 102a that the reason for the reestablishment is to reactivate a previously-suspended RRC connection.
- 2. When the eNB 102a receives the request message, the eNB 102a retrieves the stored RRC connection information for UE 101 and sends a RRC Connection Reestablishment command message to the UE 101.
- 3. The UE performs re-establishment of the suspended RRC connection and sends a RRC Connection Reestablishment Complete message to the eNB.
- 4. The eNB then sends a RRC Connection Reconfiguration message to the UE.
- 5. The UE completes the RRC connection reconfiguration and sends an RRC Connection Reconfiguration Complete message to the eNB to complete the re-establishment of the RRC connection.

Example Scenario 15

FIG. 32 shows a message sequence chart for re-establishment of a suspended RRC connection for a UE 101 that is camped on an eNB 102b that does not have the RRC connection information or context.

- 1. When a trigger is generated at the UE 101 for re-establishment of a suspended RRC connection, the UE sends a RRC Connection Reestablishment Request message to the eNB 102b. The Reestablishment Request message may contain a reestablishment cause field allowing the UE 101 to indicate to eNB 102b that the reason for the reestablishment is to reactivate a previously-suspended RRC connection. The Reestablishment Request message may also contain information enabling eNB 102b to identify the eNB (eNB1 102a) that originally suspended the UE's RRC connection.
2. eNB 102b does not have the RRC connection information for UE 101 and so sends a RLF Indication message (context fetch) to the old eNB 102a that suspended the RRC connection.
3. The old eNB responds by sending a handover request to the new eNB 102b including the RRC connection connection information for the UE 101.
4. The new eNB 102b responds with a handover request acknowledgement to the old eNB.
5. The new eNB 102b then sends a RRC Connection Reestablishment message to the UE 101.
6. The UE 101 performs re-establishment of the suspended RRC connection and responds with an RRC Connection Reestablishment Complete message to the new eNB 102b.
7. The new eNB then sends an RRC Connection Reconfiguration message to the UE.
8. The UE completes the RRC connection reconfiguration and sends an RRC Connection Reconfiguration Complete message to the new eNB to complete the re-establishment of the RRC connection.
9. The new eNB 102b then completes an S1 path switch with MME 103b.
10. The MME 103b sends the new eNB a handover request acknowledgement.
11. The new eNB 102b then sends a message to the old eNB 102a to cause the old eNB 102a to release the RRC connection configuration or context for the UE 102.

Example Scenario 16

FIG. 33 shows a message sequence chart for failure of re-establishment from suspend for a UE 101 followed by a NAS recovery procedure using Tracking Area Update (TAU).
1. When a trigger is generated at the UE 101 for re-establishment of a suspended RRC connection, the UE sends an RRC Connection Reestablishment Request message to the eNB 102a.
2. When the eNB 102a receives the request message, the eNB 102a determines that it does not have the RRC connection information for UE 101 and decides to reject the request for re-establishment. The eNB 102a then sends a RRC Connection Reject command message to the UE 101.
3. The UE then sends a RRC Connection Request message to the eNB for a new RRC connection with the eNB.
4. The eNB 102a then sends an RRC Connection Setup message to the UE 101.
5. The UE completes the RRC connection setup and sends a RRC Connection Setup Complete message to the eNB 102a.
6. eNB 102a then sends a DL Information Transfer message to the UE.
7. This is followed by the eNB 102a sending a RRC connection release message to the UE 101.

Additional aspects of the present disclosure relating to the operation of a UE to suspend an RRC connection will now be set out in the following numbered clauses.

1. A method, implemented in a user equipment (UE) for use with a Radio Access Network (RAN), comprising:
   the UE suspending an established RRC connection with the RAN;
   the UE monitoring, whilst the RRC connection is suspended, for at least one of: paging and notifications of downlink data for the UE; and
   the UE storing RRC connection data related to the suspended RRC connection, said RRC connection data being usable by the UE to reactivate the suspended RRC connection.
2. A method as set out in clause 1, wherein RRC connection data comprises data representing one or more of:
   the configuration of radio bearers in the established RRC connection;
   security parameters relating to the established RRC connection;
   temporary cell identifiers;
   MAC configuration;
   Physical Layer configuration.
3. A method as set out in clause 1 or 2, further comprising marking the stored RRC connection data to indicate the suspension of the RRC connection.
4. A method as set out in clause 1, 2 or 3, wherein the UE suspends the established RRC connection in response to an RRC connection suspension criterion being met.
5. A method as set out in clause 4, the RRC connection suspension criteria comprising one or more of:
   the expiry of a timer at the UE;
   reception of a message at the UE.
6. A method as set out in any preceding clause, wherein the RAN has an established user plane connection with a Core Network (CN) for the UE, the method further comprising maintaining the established user plane connection between the RAN and the CN while the RRC Connection is suspended.
7. A method as set out in clause 6, wherein when the RAN node for which the suspended RRC connection is valid receives from the CN downlink data for the UE, the RAN node buffers the downlink data and pages the UE a transmits a notification of downlink data for the UE.
8. A method as set out in clause 7, wherein, in response to the RAN node receiving no response from the UE to the paging or to the notification of downlink data, the RAN node sends to the CN a paging escalation message.
9. A method as set out in any of clauses 1-5, further comprising the UE or a RAN node sending a message to inform any node in the Core Network (CN) that the RRC connection is suspended.
10. A method as set out in clause 9, wherein the RAN has an established user plane connection with the CN for the UE, the method further comprising suspending the established user plane connection between the CN and the RAN.
11. A method as set out in clause 10, wherein the message sent to the CN includes an identification of the UE, the method of suspending the established user plane connection between the CN and the RAN comprising the RAN or one or more nodes in the CN or both:
   discontinuing transmission and reception of user plane data for the UE over the established user plane connection between the RAN and the CN; and
   storing CN-RAN connection data representing the established user plane connection, said CN-RAN connection data being usable to later resume transmission and reception of user plane data to the UE by reactivating said user plane connection between the RAN and the CN as the result of an RRC connection reactivation process.

12. A method as set out in clauses 10 or 11, wherein when downlink data for the UE is received at the CN, a node of the CN buffers the downlink data and the CN initiates the paging of the UE by one or more cells of the RAN.

13. A method as set out in clauses 10, 11 or 12, further comprising a node of the CN maintaining a validity indicator for the UE, said validity indicator being usable in checking the validity of the said RRC connection as part of the RRC connection reactivation process.

14. A method as set out in clause 13, wherein the value of the validity indicator is dependent on one or more of: the location of the UE; a timer.

15. A method as set out in any preceding clauses, further comprising:
   the UE performing autonomous mobility control by cell selection or reselection processes during the time that the RRC connection is suspended and the UE relinquishing mobility control to the RAN as a result of the reactivation of the suspended RRC connection or a normal RRC connection process to establish a new RRC connection with the UE.

16. A method as set out in clause 15, wherein when the UE selects a cell of the RAN in which the suspended RRC Connection represented by the stored RRC connection data is invalid, the UE continues to store the RRC connection data and omits to perform any communication with the CN to inform the CN of the mobility of the UE.

17. A method as set out in clause 15, wherein when the UE selects a cell of the RAN in which the suspended RRC Connection represented by the stored RRC connection data is invalid, the UE transmits a message informing the RAN or the CN of this event.

18. A method as set out in clause 17, wherein the UE also releases the RRC connection and enters idle mode as the result of selecting a cell of the RAN in which the suspended RRC Connection represented by the stored RRC connection data is invalid.

19. A method as set out in clause 17 or 18, wherein receipt by the RAN or the CN of the message sent by the UE causes the RAN or CN to perform one or more of: release the invalid RRC Connection; initiate a normal RRC connection process to establish a new RRC connection with the UE; release an established user plane connection for the UE between the CN and RAN.

20. A method as set out in clause 15, wherein when the UE selects a cell of the RAN in which the suspended RRC Connection represented by the stored RRC connection data is invalid, the UE continues to store the RRC connection data and transmits a message informing the RAN or the CN of this event.

21. A method as set out in any preceding clause, further comprising:
   the UE determining whether or not the suspended RRC connection is still valid by reference to the stored RRC connection data; and
   in response to the UE determining that the suspended RRC connection is still valid, the UE sending an RRC connection reactivation request message to the RAN.

22. A method as set out in clause 21, further comprising:
   in response to receiving an RRC connection reactivation complete message from the RAN, the UE resuming user plane data transfer with the RAN over the reactivated RRC connection.

23. A method as set out in clause 22, further comprising:
   in response to receiving an RRC connection reactivation reject message from the RAN, the UE releasing the suspended RRC connection and entering idle mode; and
   the UE thereafter initiating a normal RRC connection establishment process to establish a new RRC connection with the RAN.

24. A method of clause 23, wherein a RAN node transmits the RRC connection reactivation reject message to the UE in response to the RAN node determining that it does not have a valid suspended RRC connection for the UE.

25. A method as set out in any preceding clause, further comprising:
   the UE determining whether or not the suspended RRC connection is still valid by reference to the stored RRC connection data;
   in response to the UE determining that the suspended RRC connection is invalid, the UE releasing the suspended RRC connection and entering idle mode; and
   the UE thereafter initiating a normal RRC connection establishment process to establish a new RRC connection with the RAN.

26. A method of any of clauses 21 to 25, wherein the UE determining whether or not the suspended RRC connection is still valid comprises at least one of:
   determining whether the UE is currently in a cell of the RAN in which the suspended RRC Connection represented by the stored RRC connection data is still valid; and
   determining whether a timer has not expired.

27. A method of clauses 21-26, further comprising the UE relinquishing mobility control of the UE to the RAN as a result of the reactivation of the suspended RRC connection or the establishment of a new RRC connection.

28. A method of any preceding clause, further comprising initiating the reactivation of the suspended RRC connection in response to:
   the UE generating uplink data via the user plane of an RRC connection; or
   reception at the UE paging; or
   reception at the UE of a notification that the RAN or the CN has downlink data buffered to send to the UE.

29. A method as set out in any preceding clause, wherein the UE is configured to communicate with the RAN in accordance with the LTE or LTE Advanced protocols.

30. A method as set out in any preceding clause, wherein the RAN is configured to communicate with the UE in accordance with the LTE or LTE Advanced protocols.

31. A method as set out in any preceding clause, wherein the RAN node or nodes is/are eNode B(s).

32. A User Equipment (UE) for use with a Radio Access Network (RAN), the UE being configured to:
   suspend an established RRC connection with the RAN;
   monitor, whilst the RRC connection is suspended, for at least one of: paging and notifications of downlink data for the UE; and
   store RRC connection data representing the suspended RRC connection, said RRC connection data being usable by the UE to reactivate the suspended RRC connection.

33. A UE as set out in clause 32, wherein RRC connection data comprises data representing one or more of:
   the configuration of radio bearers in the established RRC connection;
   security parameters relating to the established RRC connection;
   temporary cell identifiers;
   MAC configuration;
   Physical Layer configuration.

34. A UE as set out in clause 32 or 33, further comprising the UE being configured to mark the stored RRC connection data to indicate the suspension of the RRC connection.

35. A UE as set out in clause 32, 33 or 34, further comprising the UE being configured to suspend the established RRC connection in response to an RRC connection suspension criterion being met.

36. A UE as set out in clause 35, wherein the RRC connection suspension criteria comprise one or more of:
    the expiry of a timer at the UE;
    reception of a message at the UE.

37. A UE as set out in any of clauses 32-36, further comprising:
    the UE being configured to perform autonomous mobility control by cell selection or reselection processes during the time that the RRC connection is suspended and the UE relinquishing mobility control to the RAN as a result of an the reactivation of the suspended RRC connection or a normal RRC connection process to establish a new RRC connection with the UE.

38. A UE as set out in clause 37, the UE being configured such that, when the UE selects a cell of the RAN in which the suspended RRC Connection represented by the stored RRC connection data is invalid, the UE continues to store the RRC connection data and omits to perform any communication with the CN to inform the CN of the mobility of the UE.

39. A UE as set out in clause 37, the UE being configured such that, when the UE selects a cell of the RAN in which the suspended RRC Connection represented by the stored RRC connection data is invalid, the UE transmits a message informing the RAN or the CN of this event.

40. A UE as set out in clause 39, the UE being configured such that the UE also releases the RRC connection and enters idle mode as the result of selecting a cell of the RAN in which the suspended RRC Connection represented by the stored RRC connection data is invalid.

41. A UE as set out in clause 39 or 40, wherein receipt by the RAN or the CN of the message sent by the UE causes the RAN or CN to perform one or more of: releasing the invalid RRC Connection; initiating a normal RRC connection process to establish a new RRC connection with the UE; releasing an established user plane connection for the UE between the CN and RAN.

42. A UE as set out in clause 37, the UE being configure such that, when the UE selects a cell of the RAN in which the suspended RRC Connection represented by the stored RRC connection data is invalid, the UE continues to store the RRC connection data and transmits a message informing the RAN or the CN of this event.

43. A UE as set out in any of clauses 32-42, further comprising the UE being configured such that, as part of the RRC connection reactivation process:
    the UE determines whether or not the suspended RRC connection is still valid by reference to the stored RRC connection data; and
    in response to the UE determining that the suspended RRC connection is still valid, the UE sends an RRC connection reactivation request message to the RAN.

44. A UE as set out in clause 43, further comprising:
    the UE being configured such that, in response to receiving an RRC connection reactivation complete message from the RAN, the UE resumes user plane data transfer with the RAN over the reactivated RRC connection.

45. A UE as set out in clause 43, further comprising:
    the UE being configured such that, in response to receiving an RRC connection reactivation reject message from the RAN, the UE releases the suspended RRC connection and entering idle mode; and
    the UE configured to thereafter initiate a normal RRC connection establishment process to establish a new RRC connection with the RAN.

46. A UE as set out in clause 43, wherein a RAN node transmits the RRC connection reactivation reject message to the UE in response to the RAN node determining that it does not have a valid suspended RRC connection for the UE.

47. A UE as set out in any of clauses 32-46, further comprising the UE being configured to:
    determine whether or not the suspended RRC connection is still valid by reference to the stored RRC connection data;
    in response to the UE determining that the suspended RRC connection is invalid, release the suspended RRC connection and enters idle mode; and
    thereafter initiate a normal RRC connection establishment process to establish a new RRC connection with the RAN.

48. A UE as set out in any of clauses 43-47, further comprising the UE being configured to, as part of determining whether or not the suspended RRC connection is still valid, determine at least one of:
    whether the UE is currently in a cell of the RAN in which the suspended RRC Connection represented by the stored RRC connection data is still valid; and
    whether a timer has not expired.

49. A UE as set out in any of clauses 43-48, further comprising the UE being configured to relinquish mobility control of the UE to the RAN as a result of the reactivation of the suspended RRC connection or the establishment of a new RRC connection.

50. A UE as set out in any of clauses 32-49, further comprising the UE being configured to initiate the reactivation of the suspended RRC connection reactivation process in response to at least one of:
    the UE generating uplink data via the user plane of an RRC connection;
    reception at the UE of paging; and
    reception at the UE of a message indicating that the RAN or the CN has downlink data buffered to send to the UE over the user plane of an RRC connection.

51. A UE as set out in any of clauses 32-50, wherein the UE is configured to communicate with the RAN in accordance with the LTE or LTE Advanced protocols.

52. A wireless communications system comprising a UE as set out in any of clauses 32-51, and a RAN having an established user plane connection with a Core Network (CN) for the UE, the system being configured to maintain the established user plane connection between the RAN and the CN while the RRC Connection is suspended.

53. A wireless communications system as set out in clause 52, further comprising the RAN node for which the suspended RRC connection is valid being configured such that when the RAN node receives from the CN downlink data for the UE, the RAN node buffers the downlink data and pages the UE or transmits a notification of downlink data for the UE.

54. A wireless communications system as set out in clause 53, further comprising the RAN node being configured such that, in response to the RAN node receiving no response from the UE to the paging or to the notification of downlink data, the RAN node sends to the CN a paging escalation message.

55. A wireless communications system comprising a UE as set out in any of clauses 32-51, and a RAN, the wireless communications system being configured such that the UE or a RAN node sends a message to inform any node in the Core Network (CN) that the RRC connection is suspended.

56. A wireless communications system as set out in clause 55, wherein the RAN has an established user plane connection with the CN for the UE, the wireless communications system being configured such that the wireless communications system suspends the established user plane connection between the CN and the RAN.

57. A wireless communications system as set out in clause 56, further comprising the wireless communications system being configured such that the message sent to the CN includes an identification of the UE, and such that, to suspend the established user plane connection between the CN and the RAN, the RAN or one or more nodes in the CN or both:
  discontinue transmission and reception of user plane data for the UE over the user plane connection between the RAN and the CN; and
  store CN-RAN connection data representing the established user plane connection, said CN-RAN connection data being usable to later resume transmission and reception of user plane data to the UE by resuming said user plane connection between the RAN and the CN as the result of an RRC connection reactivation process.

58. A wireless communications system as set out in clauses 56 or 57, further comprising the wireless communications system being configured such that, when downlink data for the UE is received at the CN, a node of the CN buffers the downlink data and the CN initiates the paging of the UE by one or more cells of the RAN.

59. A wireless communications system as set out in clauses 56, 57 or 58, further comprising the wireless communications system being configured such that a node of the CN maintains a validity indicator for the UE, said validity indicator being usable in checking the validity of the said RRC connection as part of the RRC connection reactivation process.

60. A wireless communications system as set out in clause 59, wherein the value of the validity indicator is dependent on one or more of: the location of the UE; a timer.

61. A wireless communications system as set out in any of clauses 52-60, wherein the RAN is configured to communicate with the UE in accordance with the LTE or LTE Advanced protocols.

62. A wireless communications system as set out in any of clauses 52-60, wherein the RAN node or nodes is/are eNode B(s).

63. A computer program product having instructions which when carried out by a processor of User Equipment (UE) for use with a Radio Access Network (RAN) cause the UE to be configured to operate in accordance with a method as set out in any of clauses 1-31.

64. A computer program product having instructions which when carried out by a processor of a node of a Radio Access Network (RAN) for use with a user equipment (UE) cause the RAN node to be configured to operate in accordance with a method as set out in any of clauses 1-31.

Additional aspects of the present disclosure relating to the operation of a RAN node to suspend an RRC connection will now be set out in the following numbered clauses.

1. A method, implemented in a node of a Radio Access Network (RAN) for use with a user equipment (UE), comprising:
  the RAN node suspending an established RRC connection with the UE;
  the RAN node thereafter being operable, whilst the RRC connection is suspended, to page the UE paging or transmit notification of downlink data for the UE or both; and
  the RAN node storing RRC connection data related to the suspended RRC connection, said RRC connection data being usable by the RAN node to reactivate the suspended RRC connection.

2. A method as set out in clause 1, wherein RRC connection data comprises data representing one or more of:
  the configuration of radio bearers in the established RRC connection;
  security parameters relating to the established RRC connection;
  temporary cell identifiers;
  MAC configuration;
  Physical Layer configuration.

3. A method as set out in clause 1 or 2, further comprising marking the stored RRC connection data to indicate the suspension of the RRC connection.

4. A method as set out in clause 1, 2 or 3, wherein the RAN node suspends the established RRC connection in response to an RRC connection suspension criterion being met.

5. A method as set out in clause 4, the RRC connection suspension criteria comprising one or more of:
  the expiry of a timer at the RAN Node;
  transmission of a message by the RAN node to the UE to instruct suspension of the established RRC connection.

6. A method as set out in any of clauses 1-5, wherein the RAN node has an established user plane connection with a Core Network (CN) for the UE, the method further comprising maintaining the established user plane connection between the RAN node and the CN while the RRC Connection is suspended.

7. A method as set out in clause 6, wherein when the RAN node receives from the CN downlink data for the UE, the RAN node buffers the downlink data and pages the UE a or transmits a notification of downlink data for the UE.

8. A method as set out in clause 7, wherein, in response to the RAN node receiving no response from the UE to the paging or to the notification of downlink data, the RAN node sends to the CN a paging escalation message.

9. A method as set out in any of clauses 1-5, further comprising the UE or the RAN node sending a message to inform any node in the Core Network (CN) that the RRC connection is suspended.

10. A method as set out in clause 9, wherein the RAN node has an established user plane connection with a CN for the UE, the method further comprising suspending the established user plane connection between the CN and the RAN for the UE.

11. A method as set out in clause 10, wherein the message sent to the CN includes an identification of the UE, the method further comprising the RAN node or one or more CN nodes or both:
  discontinuing transmission and reception of user plane data for the UE over the established user plane connection between the CN and the RAN node; and
  storing CN-RAN connection data representing the established user plane connection with the CN, said CN-RAN connection data being usable to later resume transmission and reception of user plane data to the UE by reactivating said user plane connection between the CN and the RAN node as the result of an RRC connection reactivation process.

12. A method as set out in clauses 10 or 11, wherein when downlink data for the UE is received at the CN, a node of the CN buffers the downlink data and the CN initiates the paging of the UE by one or more cells of the RAN.

13. A method as set out in clauses 10, 11 or 12, further comprising a node of the CN maintaining a validity indicator for the UE, said validity indicator being usable in checking the validity of the said RRC connection as part of the RRC connection reactivation process.

14. A method as set out in clause 13, wherein the value of the validity indicator is dependent on one or more of: the location of the user; a timer.

15. A method as set out in any preceding clause, further comprising:
the RAN relinquishing to the UE, mobility control of the UE until the RAN resumes mobility control of the UE as the result of the reactivation of the suspended RRC connection or a normal RRC connection process to establish a new RRC connection with the UE.

16. A method as set out in clause 15, wherein when the UE selects a cell of the RAN in which the suspended RRC Connection represented by the stored RRC connection data is invalid, the RAN receiving a message informing the RAN of this event.

17. A method as set out in clause 16, wherein receipt by the RAN of the message sent by the UE causes the RAN to perform one or more of: release the invalid suspended RRC Connection; initiate a new RRC connection with the UE; release an established user plane connection for the UE between the CN and RAN.

18. A method as set out in clause 15, 16 or 17, further comprising the RAN resuming mobility control of the UE as a result of reactivation of the suspended RRC connection or a normal RRC connection process to establish a new RRC connection with the UE.

19. A method as set out in any preceding clause, wherein the RAN node, in response to receiving an RRC connection reactivation request message from the UE:
determining whether or not the suspended RRC connection is still valid by reference to the stored RRC connection data; and
in response to the RAN node determining that the suspended RRC connection is still valid, sending a reactivation request complete message to the UE and thereafter resuming user plane data transfer with the UE over the reactivated RRC connection; or
in response to the RAN node determining that the suspended RRC connection is invalid, sending a reactivation request reject message to the UE.

20. A method as set out in clause 19, wherein the RAN node determining whether or not the suspended RRC connection is still valid comprises at least one of:
determining that a timer has not expired; and
determining that the RRC connection has not been released.

21. A method as set out in any preceding clause, wherein the UE is configured to communicate with the RAN in accordance with the LTE or LTE Advanced protocols.

22. A method as set out in any preceding clause, wherein the RAN is configured to communicate with the UE in accordance with the LTE or LTE Advanced protocols.

23. A method as set out in any preceding clause, wherein the RAN node or nodes is/are eNode B(s).

24. A node of a Radio Access Network (RAN) for use with a user equipment (UE), the RAN node being configured to:
suspend an established RRC connection with the UE;
thereafter be operable, whilst the RRC connection is suspended, to page the UE or transmit notification of downlink data for the UE or both; and
store RRC connection data related to the suspended RRC connection, said RRC connection data being usable by the RAN node reactivate the suspended RRC connection.

25. A RAN node as set out in clause 24, wherein RRC connection data comprises data representing one or more of:

the configuration of radio bearers in the established RRC connection;
security parameters relating to the established RRC connection;
temporary cell identifiers;
MAC configuration;
Physical Layer configuration.

26. A RAN node as set out in clause 24 or 25, further comprising marking the stored RRC connection data to indicate the suspension of the RRC connection.

27. A RAN node as set out in clause 24, 25 or 26, further comprising the RAN node being configured to suspend the established RRC connection in response to an RRC connection suspension criterion being met 28. A RAN node as set out in clause 27, wherein the RRC connection suspension criteria comprises one or more of:
the expiry of a timer at the RAN Node;
transmission of a message by the RAN node to the UE to instruct suspension of the established RRC connection.

29. A RAN node as set out in any of clauses 24-28, further comprising the RAN node being configure to, in response to receiving an RRC connection reactivation request message from the UE:
determine whether or not the suspended RRC connection is still valid by reference to the stored RRC connection data;
in response to the RAN node determining that the suspended RRC connection is still valid, send a reactivation request complete message to the UE and thereafter resuming user plane data transfer with the UE over the reactivated RRC connection; and
in response to the RAN node determining that the suspended RRC connection is invalid, send a reactivation request reject message to the UE.

30. A RAN node as set out in clause 29, the RAN node being configured such that the RAN node determining whether or not the suspended RRC connection is still valid comprises at least one of:
determining that a timer has not expired; and
determining that the RRC connection has not been released.

31. A RAN node as set out in clause 29 or 30, further comprising the RAN resuming mobility control of the UE as a result of reactivation of the suspended RRC connection or a normal RRC connection process to establish a new RRC connection with the UE.

32. A RAN node as set out in any of clauses 24-31, wherein the RAN node is configured to communicate with the UE in accordance with the LTE or LTE Advanced protocols.

33. A RAN node as set out in any preceding clause, wherein the RAN node is an eNode B.

34. A RAN node as set out in any of clauses 24-33, wherein the RAN node has an established user plane connection with a Core Network (CN) for the UE, further comprising maintaining the established user plane connection between the RAN node and the CN while the RRC Connection is suspended.

35. A RAN node as set out in clause 34, the RAN node being configured such that, when the RAN node receives from the CN downlink data for the UE, the RAN node buffers the downlink data and pages the UE or transmits a notification of downlink data for the UE.

36. A RAN node as set out in clause 35, the RAN node being configured such that, in response to the RAN node receiving no response from the UE to the paging or to the notification of downlink data, the RAN node sends to the CN a paging escalation message.

37. A RAN node as set out in any of clauses 24-33, further comprising the UE or the RAN node sending a message to inform any node in the Core Network (CN) that the RRC connection is suspended.

38. A RAN node as set out in clause 37, wherein the RAN node has an established user plane connection with a CN for the UE, further comprising suspending the established user plane connection between the CN and the RAN for the UE.

39. A RAN node as set out in clause 38, wherein the message sent to the CN includes an identification of the UE, the RAN node or one or more CN nodes or both being configured to:

discontinue transmission and reception of user plane data for the UE over the established user plane connection between the CN and the RAN node; and store CN-RAN connection data representing the established user plane connection with the CN, said CN-RAN connection data being usable to later resume transmission and reception of user plane data to the UE by resuming said user plane connection between the CN and the RAN node as the result of an RRC connection reactivation process.

40. A wireless communication system comprising a RAN node as set out in clauses 38 or 39 and a CN, wherein the CN is configured such that when downlink data for the UE is received at the CN, a node of the CN buffers the downlink data and the CN initiates the paging of the UE by one or more cells of the RAN.

41. A wireless communication system comprising a RAN node as set out in clauses 38 or 39 and a CN or a wireless communication system as set out in clause 40, further comprising the wireless communication system being configured such that a node of the CN maintains a validity indicator for the UE, said validity indicator being usable in checking the validity of the said RRC connection as part of the RRC connection reactivation process.

42. A wireless communication system as set out in clause 41, wherein the value of the validity indicator is dependent on one or more of: the location of the user; a timer.

43. A RAN including a RAN node as set out in any of clauses 24-39, further comprising:

the RAN being configured to relinquish to the UE, mobility control of the UE until the RAN resumes mobility control of the UE as the result of an RRC connection reactivation process or a normal RRC connection process to establish a new RRC connection with the UE.

44. A RAN as set out in clause 43, wherein when the UE selects a cell of the RAN in which the suspended RRC Connection represented by the stored RRC connection data is invalid, the RAN receives a message informing the RAN of this event.

45. A RAN as set out in clause 44, wherein the RAN is configured such that receipt by the RAN of the message sent by the UE causes the RAN to perform one or more of: release the invalid suspended RRC Connection; initiate a new RRC connection with the UE; release an established user plane connection for the UE between the CN and RAN.

46. A computer program product having instructions which when carried out by a processor of a node of a Radio Access Network (RAN) for use with a user equipment (UE) cause the RAN node to be configured to operate in accordance with a method as set out in any of clauses 1-23.

Additional aspects of the present disclosure relating to the operation of a CN node to suspend an RRC connection will now be set out in the following numbered clauses.

1. A method, implemented in a node of a Core Network (CN) for use with a node of a Radio Access Network (RAN), comprising, in response to the CN receiving a message indicating that an RRC connection between the RAN and a user equipment (UE) is suspended:

the CN node discontinuing transmission and reception of user plane data for the UE over an established user plane CN-RAN connection between the CN and the RAN node; and storing CN-RAN connection data representing the established user plane connection with the CN, said CN-RAN connection data being usable to later resume transmission and reception of user plane data to the UE by resuming said user plane connection between the CN and the RAN node as the result of the RRC connection being reactivated.

2. A method as set out in clause 1, wherein when downlink data for the UE is received at the CN, the method further comprising buffering the downlink data in a node of the CN and initiating the paging of the UE by one or more cells of the RAN.

3. A method as set out in clause 1 or 2, further comprising, in response to receiving a CN-RAN connection reactivation message at a node of the CN, resuming user plane data transfer between the CN and the RAN.

4. A method as set out in any preceding clause, wherein the CN node is part of an Evolved Packet Core (EPC) configured to communicate in accordance with the LTE or LTE Advanced protocols.

5. A node of a Core Network (CN) for use with a Radio Access Network (RAN), the node of the CN being configured to, in response to the CN receiving a message indicating that an RRC connection between the RAN and a user equipment (UE) is suspended:

discontinue transmission and reception of user plane data for the UE over an established user plane CN-RAN connection between the CN and the RAN node; and store CN-RAN connection data representing the established user plane connection with the CN, said CN-RAN connection data being usable to later resume transmission and reception of user plane data to the UE by resuming said user plane connection between the CN and the RAN node as the result of the RRC connection being reactivated.

6. A CN node as set out in clause 5, the CN node being configured such that, when downlink data for the UE is received at the CN, the CN node buffers the downlink data and initiates the paging of the UE by one or more cells of the RAN.

7. A CN node as set out in clause 5 or 6, further comprising the CN node, in response to receiving a CN-RAN connection reactivation message at a node of the CN, resuming user plane data transfer with the RAN.

8. A CN node as set out in clause 5, 6 or 7, wherein the CN node is part of an Evolved Packet Core (EPC) configured to communicate in accordance with the LTE or LTE Advanced protocols.

9. A computer program product having instructions which when carried out by a processor of a node of a Core Network (CN) for use with a Radio Access Network (RAN) cause the node of the CN to be configured to operate in accordance with a method as set out in any of clauses 1-4.

Additional aspects of the present disclosure relating to the operation of a UE or a RAN node for assessing the validity of a suspended RRC connection and reactivating a suspended RRC connection will now be set out in the following numbered clauses.

1. A method, implemented in a node of a Radio Access Network (RAN) for use with a user equipment (UE), an established RRC connection between the RAN node and a UE having been suspended and RRC connection data related to the suspended RRC connection having been stored by the RAN node, the method comprising:

receiving at the RAN node an RRC connection reactivation request message from the UE;

determining whether or not the suspended RRC connection is still valid by reference to the stored RRC connection data; and in response to the RAN node determining that the suspended RRC connection is still valid, the RAN node sending a reactivation request complete message to the UE and thereafter resuming user plane data transfer with the UE over the reactivated RRC connection; or in response to the RAN node determining that the suspended RRC connection is invalid, the RAN node sending a reactivation request reject message to the RAN.

2. A method as set out in clause 1, wherein the RAN node determining whether or not the suspended RRC connection is still valid comprises at least one of:

determining that a timer has not expired; and determining that the RRC connection has not been released.

3. A method as set out in clause 1 or 2, further comprising the RAN resuming mobility control of the UE from the UE as a result of reactivation of the suspended RRC connection or a normal RRC connection process to establish a new RRC connection with the UE.

4. A method as set out in any preceding clause, wherein the RAN node or nodes is/are configured to communicate with the UE in accordance with the LTE or LTE Advanced protocols.

5. A method as set out in any preceding clause, wherein the RAN node or nodes is/are eNode B(s).

6. A node of a Radio Access Network (RAN) for use with a user equipment (UE), the RAN node being configured such that when an established RRC connection between the RAN node and a UE has been suspended and RRC connection data related to the suspended RRC connection has been stored by the RAN node, in response to receiving at the RAN node an RRC connection reactivation request message from the UE:

the RAN node determines whether or not the suspended RRC connection is still valid by reference to the stored RRC connection data;

in response to the RAN node determining that the suspended RRC connection is still valid, the RAN node sends a reactivation request complete message to the UE and thereafter resuming user plane data transfer with the UE over the reactivated RRC connection; and in response to the RAN node determining that the suspended RRC connection is invalid, the RAN node sends a reactivation request reject message to the RAN.

7. A RAN node as set out in clause 6, further comprising the RAN node being configured to determine whether or not the suspended RRC connection is still valid by at least one of the RAN node:

determining that a timer has not expired; and determining that the RRC connection has not been released.

8. A RAN comprising a RAN node as set out in clause 5 or 6, the RAN being configured to resume mobility control of the UE from the UE as a result of reactivation of the suspended RRC connection or a normal RRC connection process to establish a new RRC connection with the UE.

9. A RAN node as set out in any of clauses 5-8, the RAN node or nodes being configured to communicate with the UE in accordance with the LTE or LTE Advanced protocols.

10. A RAN node as set out in any of clauses 5-9, wherein the RAN node or nodes is/are eNode B(s).

11. A computer program product having instructions which when carried out by a processor of a node of a Radio Access Network (RAN) for use with a user equipment (UE) cause the RAN node to be configured to operate in accordance with a method as set out in any of clauses 1-5.

12. A method, implemented in a user equipment (UE) for use with a Radio Access Network (RAN), an established RRC connection between a node of the RAN and the UE having been suspended and RRC connection data related to the suspended RRC connection having been stored by the UE, the method comprising:

the UE determining whether or not the suspended RRC connection is still valid by reference to the stored RRC connection data; and in response to the UE determining that the suspended RRC connection is still valid, the UE: transmitting to the RAN node an RRC connection reactivation request message; and, in response to receiving from the RAN node an RRC connection reactivation accept message, the UE thereafter resuming user plane data transfer with the RAN node over the reactivated RRC connection, or in response to receiving from the RAN node an RRC connection reactivation reject message, the UE releasing the RRC connection; or in response to the UE determining that the suspended RRC connection is invalid, the UE releasing the RRC connection.

13. A method as set out in clause 12, wherein the UE determining whether or not the suspended RRC connection is still valid comprises at least one of:

determining whether the UE is currently in a cell of the RAN in which the suspended RRC Connection represented by the stored RRC connection data is still valid; and determining whether a timer has not expired.

14. A method as set out in clause 12 or 13, further comprising, in response to receiving RRC connection reactivation reject message or the UE determining that the suspended RRC connection is invalid, the UE also entering idle mode and thereafter initiating a normal RRC connection establishment process to establish a new RRC connection with the RAN.

15. A method as set out in clause 12, 13 or 14, further comprising the UE relinquishing mobility control of the UE to the RAN as a result of reactivation of the suspended RRC connection or a normal RRC connection process to establish a new RRC connection with the RAN.

16. A method as set out in any of clauses 12-15, wherein the UE is configured to communicate with the RAN in accordance with the LTE or LTE Advanced protocols.

17. A User Equipment (UE) for use with a Radio Access Network (RAN), the UE being configured such that when an established RRC connection between a node of the RAN and the UE has been suspended and RRC connection data representing configuration information and state information related to the suspended RRC connection has been stored by the UE:

the UE determines whether or not the suspended RRC connection is still valid by reference to the stored RRC connection data;

in response to the UE determining that the suspended RRC connection is still valid, the UE transmits to the RAN node an RRC connection reactivation request message; and, in response to receiving from the RAN node an RRC connection reactivation accept message, the UE thereafter resumes user plane data transfer with the RAN node over the reactivated RRC connection, or in response to receiving from the RAN node an RRC connection reactivation reject message, the UE releases the RRC connection; and in response to the UE determining that the suspended RRC connection is invalid, the UE releases the RRC connection.

18. A UE set out in clause 17, further comprising the UE being configured to determine whether or not the suspended RRC connection is still valid by at least one of the UE:
   determining whether the UE is currently in a cell of the RAN in which the suspended RRC Connection represented by the stored RRC connection data is still valid; and
   determining whether a timer has not expired.

19. A UE as set out in clause 17 or 18, further comprising the UE being configured such that, in response to receiving RRC connection reactivation reject message or the UE determining that the suspended RRC connection is invalid, the UE also enters idle mode and thereafter initiates a normal RRC connection establishment process to establish a new RRC connection with the RAN.

20. A UE as set out in clause 17, 18 or 19, further comprising the UE being configured to relinquish mobility control of the UE to the RAN as a result of the reactivation of the suspended RRC connection or a normal RRC connection process to establish a new RRC connection with the RAN.

21. A UE as set out in any of clauses 17-20, wherein the UE is configured to communicate with the RAN in accordance with the LTE or LTE Advanced protocols.

22. A computer program product having instructions which when carried out by a processor of User Equipment (UE) for use with a Radio Access Network (RAN) connection cause the UE to be configured to operate in accordance with a method as set out in any of clauses 12-16.

Additional aspects of the present disclosure relating to the operation of a CN node or a RAN node for handling downlink data while an RRC connection is suspended will now be set out in the following numbered clauses.

1. A method, implemented in a node of a Radio Access Network (RAN) for use with a user equipment (UE), an established RRC connection between a RAN node and a UE having been suspended and RRC connection data related to the suspended RRC connection having been stored by the RAN node, the method comprising:
   the RAN node receiving downlink data for the UE;
   the RAN node buffering the downlink data; and
   the RAN node paging the UE or transmitting notification of downlink data for the UE.

2. A method as set out in clause 1, wherein, in response to the RAN node receiving no response from the UE to the paging or to the notification of downlink data, the RAN node sends to the CN a paging escalation message.

3. A method as set out in clause 2, further comprising:
   receiving at the RAN node an RRC connection reactivation request message from the UE;
   determining whether or not the suspended RRC connection is still valid by reference to the stored RRC connection data; and
   in response to the RAN node determining that the suspended RRC connection is still valid, the RAN node sending a reactivation request complete message to the UE and thereafter resuming user plane data transfer with the UE over the reactivated RRC connection; or
   in response to the RAN node determining that the suspended RRC connection is invalid, the RAN node sending a reactivation request reject message to the RAN.

4. A method as set out in any preceding clause, wherein the RAN node is configured to communicate with the UE in accordance with the LTE or LTE Advanced protocols.

5. A method as set out in any preceding clause, wherein the RAN node is an eNode B.

6. A node of a Radio Access Network (RAN) for use with a user equipment (UE), the RAN node being configured such that when an established RRC connection between the RAN node and a UE has been suspended and RRC connection data related to the suspended RRC connection has been stored by the RAN node, in response to the RAN node receiving downlink data for the UE:
   the RAN node buffers the downlink data; and
   the RAN node pages the UE or transmits a message giving notification of downlink data.

7. A RAN node as set out in clause 6, the RAN node being configured such that, in response to the RAN node receiving no response from the UE to the paging message or to the message giving notification of downlink data, the RAN node sends to the CN a paging escalation message.

8. A RAN node as set out in clause 6, further comprising the RAN node being configured such that, in response to the RAN node receiving an RRC connection reactivation request message from the UE:
   the RAN node determines whether or not the suspended RRC connection is still valid by reference to the stored RRC connection data;
      in response to the RAN node determining that the suspended RRC connection is still valid, the RAN node sends a reactivation request complete message to the UE and thereafter resuming user plane data transfer with the UE over the reactivated RRC connection; and
      in response to the RAN node determining that the suspended RRC connection is invalid, the RAN node sends a reactivation request reject message to the RAN.

9. A RAN node as set out in any of clauses 6-8, wherein the RAN node is configured to communicate with the UE in accordance with the LTE or LTE Advanced protocols.

10. A method as set out in any of clauses 6-9, wherein the RAN node is an eNode B.

11. A computer program product having instructions which when carried out by a processor of a node of a Radio Access Network (RAN) for use with a user equipment (UE) cause the RAN node to be configured to operate in accordance with a method as set out in any of clauses 1-5.

12. A method, implemented in a node of a Core Network (CN) for use with a node of a Radio Access Network (RAN), the transmission and reception of user plane data for a user equipment (UE) over an established user plane CN-RAN connection for the UE between the CN and the RAN node having been discontinued in response to the CN receiving a message indicating that an RRC connection between the RAN and the UE is suspended and CN-RAN connection data representing the extant user plane connection between the CN and the RAN having been stored, the method comprising:
   receiving downlink data for the UE;
   the CN node buffering the downlink data;
   the CN node initiating the paging of the UE by one or more cells of the RAN.

13. A method as set out in clause 12, further comprising a node of the CN maintaining a validity indicator for the UE, said validity indicator being usable in checking the validity of the said RRC connection as part of a RRC connection reactivation process.

14. A method as set out in clause 13, wherein the value of the validity indicator is dependent on one or more of: the location of the user; a timer.

15. A method as set out in any of clauses 12-14, wherein the CN node is part of an Evolved Packet Core (EPC) configured to communicate in accordance with the LTE or LTE Advanced protocols.

16. A node of a Core Network (CN) for use with a node of a Radio Access Network (RAN), the CN node being configured such that when the transmission and reception of user plane data for a user equipment (UE) over an established user plane CN-RAN connection for the UE between the CN and the RAN node has been discontinued in response to the CN receiving a message indicating that an RRC connection between the RAN and the UE is suspended and CN-RAN connection data representing the extant user plane connection between the CN and the RAN has been stored, in response to receiving downlink data for the UE:

the CN node buffers the downlink data;
the CN node initiates the paging of the UE by one or more cells of the RAN.

17. A CN node as set out in clause 16, further comprising a node of the CN maintaining a validity indicator for the UE, said validity indicator being usable in checking the validity of the said RRC connection as part of a RRC connection reactivation process.

18. A CN node as set out in clause 17, wherein the value of the validity indicator is dependent on one or more of: the location of the user; a timer.

19. A CN node as set out in any of clauses 16-18, wherein the CN node is part of an Evolved Packet Core (EPC) configured to communicate in accordance with the LTE or LTE Advanced protocols.

20. A computer program product having instructions which when carried out by a processor of a node of a Core Network (CN) for communicating with a Radio Access Network (RAN) via a CN-RAN connection cause the node of the CN to be configured to operate in accordance with a method as set out in any of clauses 12-15.

Additional aspects of the present disclosure relating to the operation of a UE for handling mobility of the UE while an RRC connection is suspended will now be set out in the following numbered clauses.

1. A method, implemented in a user equipment (UE) for use with a Radio Access Network (RAN), an established RRC connection between a node of the RAN and the UE having been suspended and RRC connection data related to the suspended RRC connection having been stored by the UE, the method comprising:

the UE performing autonomous mobility control by cell selection or reselection processes during the time that the RRC connection is suspended and the UE relinquishing mobility control of the UE to the RAN as a result of reactivation of the suspended RRC connection or a normal RRC connection process to establish a new RRC connection with the UE.

2. A method as set out in clause 1, wherein when the UE selects a cell of the RAN in which the suspended RRC connection represented by the RRC connection data is invalid, the UE continues to store the RRC connection data and omits to perform any communication with the CN to inform the CN of the mobility of the UE.

3. A method as set out in clause 1, wherein when the UE selects a cell of the RAN in which the suspended RRC connection represented by the stored RRC connection data is invalid, the UE transmits a message informing the RAN or a core network (CN) of this event.

4. A method as set out in clause 3, wherein the UE also releases the suspended RRC connection and enters idle mode as the result of selecting a cell of the RAN in which the RRC connection represented by the stored RRC connection data is invalid.

5. A method as set out in any preceding clause, wherein the UE is configured to communicate with the RAN in accordance with the LTE or LTE Advanced protocols.

6. A User Equipment (UE) for communicating with a Radio Access Network (RAN), the UE being configured such that when an established RRC connection between a node of the RAN and the UE has been suspended and RRC connection data related to the suspended RRC connection has been stored by the UE:

the UE performs autonomous mobility control by cell selection or reselection processes during the time that the RRC connection is suspended; and the UE relinquishes mobility control of the UE to the RAN as a result of the reactivation of the suspended RRC connection or a normal RRC connection process to establish a new RRC connection with the UE.

7. A UE as set out in clause 6, further comprising the UE being configured such that, when the UE selects a cell of the RAN in which the suspended RRC connection represented by the RRC connection data is invalid, the UE continues to store the RRC connection data and omits to perform any communication with the CN to inform the CN of the mobility of the UE.

8. A UE as set out in clause 6, further comprising the UE being configured such that, when the UE selects a cell of the RAN in which the suspended RRC connection represented by the stored RRC connection data is invalid, the UE transmits a message informing the RAN or a core network (CN) of this event.

9. A UE as set out in clause 8, further comprising the UE being configured such that the UE also releases the suspended RRC connection and enters idle mode as the result of selecting a cell of the RAN in which the RRC connection represented by the stored RRC connection data is invalid.

10. A UE as set out in any of clauses 6-9, wherein the UE is configured to communicate with the RAN in accordance with the LTE or LTE Advanced protocols.

11. A computer program product having instructions which when carried out by a processor of User Equipment (UE) for use with a Radio Access Network (RAN) connection cause the UE to be configured to operate in accordance with a method as set out in any of clauses 1-5.

What is claimed is:

1. A method implemented in a node of a Radio Access Network (RAN) for use with a mobile device, the method comprising:

receiving a message from the mobile device that a suspension criterion has been met;

determining to suspend a radio resource control (RRC) connection based on the suspension criterion, wherein the suspension criterion is based on data activity of one or more applications running on the mobile device; and in response to the determining, suspending, by the RAN node, the RRC connection with the mobile device;

transmitting, by the RAN node, RRC connection data to at least one other network component after the suspending, the RRC connection data transmitted independent of a request for the RRC connection data from the at least one other network component, and the RRC connection data relating to the RRC connection with the mobile device before suspension; and transmitting a connection suspend command message to the mobile device, the connection suspend command message causing the mobile device to store the RRC connection data, and wherein the mobile device is configured to re-establish the suspended RRC connection based on the stored RRC connection data.

2. A method according to claim 1, wherein the at least one other network component comprises at least one other RAN node.

3. A method according to claim 1, wherein the at least one other network component comprises a mobility management entity (MME).

4. A method according to claim 1, wherein the RRC connection data is also stored at the RAN node.

5. A method according to claim 1, wherein the RRC connection data transmitted to the other network component is usable by the RAN node or another RAN node to re-establish the suspended RRC connection.

6. A method according to claim 1, wherein the RRC connection data comprises data representing at least one of a configuration of radio bearers in the RRC connection, security parameters relating to the RRC connection, temporary cell identifiers, MAC configuration, Physical Layer configuration, or Measurement and reporting configuration.

7. A method according to claim 1, further comprising marking the RRC connection data to indicate the suspension of the RRC connection.

8. A method according to claim 1, wherein the RRC connection data comprises an identification of the mobile device.

9. A method according to claim 1, wherein the RRC connection data comprises an identification of a cell serving the mobile device when the RRC connection is suspended.

10. A method according to claim 1, further comprising the RAN node sending a message to inform any other RAN node or a Core Network (CN) node that the RRC connection has been suspended and the RRC connection data stored in the other network component.

11. A method according to claim 1, wherein the RRC connection data is transmitted to the other network component for storage at the other network component.

12. A method as claimed in claim 1, wherein the mobile device is configured to communicate with the RAN in accordance with a Long Term Evolution (LTE) or a LTE Advanced protocol.

13. A method as claimed in claim 1, wherein the RAN is configured to communicate with the mobile device in accordance with the LTE or LTE Advanced protocol.

14. A method as claimed in claim 1, wherein the RAN node or nodes is/are eNode B(s).

15. A node of a Radio Access Network (RAN) for use with a mobile device, comprising:
a receiver configured to:
receive a message from the mobile device that a suspension criterion has been met;
one or more processors configured to:
determine to suspend a radio resource control (RRC) connection based on the suspension criterion, wherein the suspension criterion is based on data activity of one or more applications running on the mobile device; and
in response to the determining, suspend the RRC connection with the mobile device; and
a transmitter configured to:
transmit RRC connection data to at least one other network component after the suspending, the RRC connection data transmitted independent of a request for the RRC connection data from the at least one other network component, and the RRC connection data relating to the RRC connection with the mobile device before suspension; and
transmit a connection suspend command message to the mobile device, the connection suspend command message causing the mobile device to store the RRC connection data, and wherein the mobile device is configured to re-establish the suspended RRC connection based on the stored RRC connection data.

16. A RAN node according to claim 15, wherein the at least one other network component comprises at least one other RAN node.

17. A RAN node according to claim 15, wherein the at least one other network component comprises a mobility management entity (MME).

18. A RAN node according to claim 15, wherein the RRC connection data is also stored at the RAN node.

19. A RAN node according to claim 15, wherein the RRC connection data transmitted to the other network component is usable by the RAN node or another RAN node to re-establish the suspended RRC connection.

20. A RAN node according to claim 15, wherein the RRC connection data comprises data representing at least one of a configuration of radio bearers in the established RRC connection, security parameters relating to the established RRC connection, temporary cell identifiers, MAC configuration, Physical Layer configuration, or measurement and reporting configuration.

21. A RAN node according to claim 15, the one or more processors further configured to mark the RRC connection data to indicate the suspension of the RRC connection.

22. A RAN node according to claim 15, wherein the RRC connection data comprises an identification of the mobile device.

23. A RAN node according to claim 15, wherein the RRC connection data comprises an identification of a cell serving the mobile device when the RRC connection is suspended.

24. A RAN node according to claim 15, further comprising the RAN node sending a message to inform any other RAN node or a Core Network (CN) that the RRC connection has been suspended and the RRC connection data stored in the other network component.

25. A RAN node as claimed in claim 15, the one or more processors configured to communicate with the mobile device in accordance with a LTE or a LTE Advanced protocol.

26. A RAN node as claimed in claim 15, wherein the RAN node or nodes is/are eNode B(s).

27. A computer program product encoded on a tangible, non-transitory storage medium, the product comprising computer readable instructions for causing one or more processors of a Radio Access Network (RAN) node to perform operations comprising:
receiving a message from a mobile device that a suspension criterion has been met;
determining to suspend a radio resource control (RRC) connection based on the suspension criterion, wherein the suspension criterion is based on data activity of one or more applications running on the mobile device; and
in response to the determining,
suspending the RRC connection with the mobile device;
transmitting RRC connection data to at least one other network component after the suspending, the RRC connection data transmitted independent of a request for the RRC connection data from the at least one other network component, and the RRC connection data relating to the RRC connection with the mobile device before suspension; and transmitting a connection suspend command message to the mobile device, the connection suspend command message causing the mobile device to store the RRC connection data, and wherein the mobile device is configured to re-establish the suspended RRC connection based on the stored RRC connection data.

28. A method according to claim 1, further comprising:

receiving, by the RAN node, a request from the mobile device to re-establish the RRC connection suspended by the RAN node;

in response to receiving the request, transmitting, by the RAN node, a connection re-establishment command message to the mobile device; and in response to transmitting the connection re-establishment command message, receiving, by the RAN node, a connection re-establishment complete message from the mobile device.

29. A RAN node according to claim 15:

the receiver configured to receive a request from the mobile device to re-establish the RRC connection suspended by the RAN node, the transmitter configured to transmit a connection re-establishment command message to the mobile device in response to the receiver receiving the request, and the receiver further configured to receive a connection re-establishment complete message from the mobile device in response to the transmitter transmitting the connection re-establishment command message.

30. A computer program product according to claim 27, wherein the operations further comprising:

receiving a request from the mobile device to re-establish the RRC connection suspended by the RAN node;

in response to receiving the request, transmitting a connection re-establishment command message to the mobile device; and in response to transmitting the connection re-establishment command message, receiving a connection re-establishment complete message from the mobile device.

\* \* \* \* \*